US006975848B2

(12) United States Patent
Rawlins et al.

(10) Patent No.: US 6,975,848 B2
(45) Date of Patent: Dec. 13, 2005

(54) METHOD AND APPARATUS FOR DC OFFSET REMOVAL IN A RADIO FREQUENCY COMMUNICATION CHANNEL

(75) Inventors: Gregory S. Rawlins, Heathrow, FL (US); Kevin Brown, Clermont, FL (US); Michael W. Rawlins, Lake Mary, FL (US); David F. Sorrells, Middleburg, FL (US)

(73) Assignee: ParkerVision, Inc., Jacksonville, FL (US)

( * ) Notice: Subject to any disclaimer, the term of this patent is extended or adjusted under 35 U.S.C. 154(b) by 125 days.

(21) Appl. No.: 10/290,323

(22) Filed: Nov. 8, 2002

(65) Prior Publication Data

US 2003/0224752 A1 Dec. 4, 2003

Related U.S. Application Data

(60) Provisional application No. 60/384,834, filed on Jun. 4, 2002.

(51) Int. Cl.[7] .............................. H04B 1/10; H04B 1/06; H03F 3/26

(52) U.S. Cl. ................. 455/307; 455/232.1; 455/234.1; 455/240.1; 455/250.1; 327/553; 327/559; 330/270; 330/303

(58) Field of Search ................................ 455/307, 340, 455/232.1, 234.1, 239.1, 240.1, 242.1, 248.1, 249.1, 250.1, 126, 127.2, 136, 138; 327/553, 558, 559; 375/319; 330/252, 259, 270, 303; 333/172

(56) References Cited

U.S. PATENT DOCUMENTS

| 2,057,613 | A | 10/1936 | Gardner |
| 2,241,078 | A | 5/1941 | Vreeland |
| 2,270,385 | A | 1/1942 | Skillman |
| 2,283,575 | A | 5/1942 | Roberts |
| 2,358,152 | A | 9/1944 | Earp |

(Continued)

FOREIGN PATENT DOCUMENTS

| DE | 35 41 031 A1 | 5/1986 |
| DE | 42 37 692 C1 | 3/1994 |
| DE | 196 27 640 A1 | 1/1997 |
| DE | 196 48 915 A1 | 6/1998 |
| DE | 197 35 798 C1 | 7/1998 |
| EP | 0 035 166 A1 | 9/1981 |
| EP | 0 087 336 A1 | 8/1983 |
| EP | 0 099 265 A1 | 1/1984 |
| EP | 0 087 336 B1 | 7/1986 |
| EP | 0 254 844 A2 | 2/1988 |
| EP | 0 276 130 A3 | 7/1988 |
| EP | 0 276 130 A2 | 7/1988 |
| EP | 0 193 899 B1 | 6/1990 |

(Continued)

OTHER PUBLICATIONS

G. A. Hellwarth, G. D. Jones, "Automatic conditioning of Speech Signals", IEEE Transactions on audio and Electroacoustics, vol. AU–16, No. 2, Jun. 1968.*

(Continued)

*Primary Examiner*—Duc M. Nguyen
(74) *Attorney, Agent, or Firm*—Sterne, Kessler, Goldstein & Fox PLLC

(57) ABSTRACT

A filter module for reducing a DC offset voltage in a radio frequency communication channel is described. A first capacitor is coupled between a first differential input node and a first differential output node. A second capacitor is coupled between a second differential input node and a second differential output node. An active variable resistor is coupled between the first differential output node and the second differential output node. The active variable resistor receives a control signal. The control signal adjusts the value of the active variable resistor, which adjusts the frequency response of the filter module. The rate at which the filter module reduces DC offset voltages is thereby adjusted. The filter module is also adaptable to single-ended applications.

15 Claims, 54 Drawing Sheets

U.S. PATENT DOCUMENTS

| | | | |
|---|---|---|---|
| 2,410,350 A | 10/1946 | Labin et al. | |
| 2,451,430 A | 10/1948 | Barone | |
| 2,462,069 A | 2/1949 | Chatterjea et al. | |
| 2,462,181 A | 2/1949 | Grosselfinger | |
| 2,472,798 A | 6/1949 | Fredendall | |
| 2,497,859 A | 2/1950 | Boughtwood et al. | |
| 2,499,279 A | 2/1950 | Peterson | |
| 2,802,208 A | 8/1957 | Hobbs | |
| 2,985,875 A | 5/1961 | Grisdale et al. | |
| 3,023,309 A | 2/1962 | Foulkes | |
| 3,069,679 A | 12/1962 | Sweeney et al. | |
| 3,104,393 A | 9/1963 | Vogelman | |
| 3,114,106 A | 12/1963 | McManus | |
| 3,118,117 A | 1/1964 | King et al. | |
| 3,226,643 A | 12/1965 | McNair | |
| 3,246,084 A | 4/1966 | Kryter | |
| 3,258,694 A | 6/1966 | Shepherd | |
| 3,383,598 A | 5/1968 | Sanders | |
| 3,384,822 A | 5/1968 | Miyagl | |
| 3,454,718 A | 7/1969 | Perreault | |
| 3,523,291 A | 8/1970 | Pierret | |
| 3,548,342 A | 12/1970 | Maxey | |
| 3,555,428 A | 1/1971 | Perreault | |
| 3,614,627 A | 10/1971 | Runyan et al. | |
| 3,614,630 A | 10/1971 | Rorden | |
| 3,617,892 A | 11/1971 | Hawley et al. | |
| 3,621,402 A | 11/1971 | Gardner | |
| 3,622,885 A | 11/1971 | Oberdorf et al. | |
| 3,623,160 A | 11/1971 | Giles et al. | |
| 3,626,417 A | 12/1971 | Gilbert | |
| 3,629,696 A | 12/1971 | Bartelink | |
| 3,662,268 A | 5/1972 | Gans et al. | |
| 3,689,841 A | 9/1972 | Bello et al. | |
| 3,702,440 A | 11/1972 | Moore | |
| 3,714,577 A | 1/1973 | Hayes | |
| 3,716,730 A | 2/1973 | Cerny, Jr. | |
| 3,717,844 A | 2/1973 | Barret et al. | |
| 3,735,048 A | 5/1973 | Tomsa et al. | |
| 3,736,513 A | 5/1973 | Wilson | |
| 3,767,984 A | 10/1973 | Shinoda et al. | |
| 3,806,811 A | 4/1974 | Thompson | |
| 3,852,530 A | 12/1974 | Shen | |
| 3,868,601 A | 2/1975 | MacAfee | |
| 3,940,697 A | 2/1976 | Morgan | |
| 3,949,300 A | 4/1976 | Sadler | |
| 3,967,202 A | 6/1976 | Batz | |
| 3,980,945 A | 9/1976 | Bickford | |
| 3,987,280 A | 10/1976 | Bauer | |
| 3,991,277 A | 11/1976 | Hirata | |
| 4,003,002 A | 1/1977 | Snijders et al. | |
| 4,013,966 A | 3/1977 | Campbell | |
| 4,016,366 A | 4/1977 | Kurata | |
| 4,017,798 A | 4/1977 | Gordy et al. | |
| 4,019,140 A | 4/1977 | Swerdlow | |
| 4,032,847 A | 6/1977 | Unkauf | |
| 4,035,732 A | 7/1977 | Lohrmann | |
| 4,045,740 A | 8/1977 | Baker | |
| 4,047,121 A | 9/1977 | Campbell | |
| 4,051,475 A | 9/1977 | Campbell | |
| 4,066,841 A | 1/1978 | Young | |
| 4,066,919 A | 1/1978 | Huntington | |
| 4,080,573 A | 3/1978 | Howell | |
| 4,081,748 A | 3/1978 | Batz | |
| 4,115,737 A | 9/1978 | Hongu et al. | |
| 4,130,765 A | 12/1978 | Arakelian et al. | |
| 4,130,806 A | 12/1978 | Van Gerwen et al. | |
| 4,132,952 A | 1/1979 | Hongu et al. | |
| 4,142,155 A | 2/1979 | Adachi | |
| 4,170,764 A | 10/1979 | Salz et al. | |
| 4,204,171 A | 5/1980 | Sutphin, Jr. | |
| 4,210,872 A | 7/1980 | Gregorian | |
| 4,220,977 A | 9/1980 | Yamanaka | |
| 4,245,355 A | 1/1981 | Pascoe et al. | |
| 4,250,458 A | 2/1981 | Richmond et al. | |
| 4,253,066 A | 2/1981 | Fisher et al. | |
| 4,253,067 A | 2/1981 | Caples et al. | |
| 4,253,069 A | 2/1981 | Nossek | |
| 4,308,614 A | 12/1981 | Fisher et al. | |
| 4,320,361 A | 3/1982 | Kikkert | |
| 4,320,536 A | 3/1982 | Dietrich | |
| 4,334,324 A | 6/1982 | Hoover | |
| 4,346,477 A | 8/1982 | Gordy | |
| 4,355,401 A | 10/1982 | Ikoma et al. | |
| 4,356,558 A | 10/1982 | Owen et al. | |
| 4,360,867 A | 11/1982 | Gonda | |
| 4,363,132 A | 12/1982 | Collin | |
| 4,365,217 A | 12/1982 | Berger et al. | |
| 4,369,522 A | 1/1983 | Cerny, Jr. et al. | |
| 4,370,572 A | 1/1983 | Cosand et al. | |
| 4,384,357 A | 5/1983 | deBuda et al. | |
| 4,389,579 A | 6/1983 | Stein | |
| 4,392,255 A | 7/1983 | Del Giudice | |
| 4,393,395 A | 7/1983 | Hacke et al. | |
| 4,430,629 A | 2/1984 | Betzl et al. | |
| 4,441,080 A * | 4/1984 | Saari | 330/86 |
| 4,446,438 A | 5/1984 | Chang et al. | |
| 4,456,990 A | 6/1984 | Fisher et al. | |
| 4,470,145 A | 9/1984 | Williams | |
| 4,472,785 A | 9/1984 | Kasuga | |
| 4,479,226 A | 10/1984 | Prabhu et al. | |
| 4,481,490 A | 11/1984 | Huntley | |
| 4,481,642 A | 11/1984 | Hanson | |
| 4,483,017 A | 11/1984 | Hampel et al. | |
| 4,484,143 A | 11/1984 | French et al. | |
| 4,485,488 A | 11/1984 | Houdart | |
| 4,488,119 A | 12/1984 | Marshall | |
| 4,504,803 A | 3/1985 | Lee et al. | |
| 4,510,467 A | 4/1985 | Chang et al. | |
| 4,517,519 A | 5/1985 | Mukaiyama | |
| 4,517,520 A | 5/1985 | Ogawa | |
| 4,518,935 A | 5/1985 | van Roermund | |
| 4,521,892 A | 6/1985 | Vance et al. | |
| 4,563,773 A | 1/1986 | Dixon, Jr. et al. | |
| 4,577,157 A | 3/1986 | Reed | |
| 4,583,239 A | 4/1986 | Vance | |
| 4,591,736 A | 5/1986 | Hirao et al. | |
| 4,602,220 A | 7/1986 | Kurihara | |
| 4,603,300 A | 7/1986 | Welles, II et al. | |
| 4,612,464 A | 9/1986 | Ishikawa et al. | |
| 4,612,518 A | 9/1986 | Gans et al. | |
| 4,616,191 A | 10/1986 | Galani et al. | |
| 4,621,217 A | 11/1986 | Saxe et al. | |
| 4,628,517 A | 12/1986 | Schwarz et al. | |
| 4,633,510 A | 12/1986 | Suzuki et al. | |
| 4,634,998 A | 1/1987 | Crawford | |
| 4,648,021 A | 3/1987 | Alberkrack | |
| 4,651,034 A | 3/1987 | Sato | |
| 4,653,117 A | 3/1987 | Heck | |
| 4,660,164 A | 4/1987 | Leibowitz | |
| 4,675,882 A | 6/1987 | Lillie et al. | |
| 4,688,253 A | 8/1987 | Gumm | |
| 4,716,376 A | 12/1987 | Daudelin | |
| 4,716,388 A | 12/1987 | Jacobs | |
| 4,718,113 A | 1/1988 | Rother et al. | |
| 4,726,041 A | 2/1988 | Prohaska et al. | |
| 4,733,403 A | 3/1988 | Simone | |
| 4,734,591 A | 3/1988 | Ichitsubo | |
| 4,737,969 A | 4/1988 | Steel et al. | |
| 4,740,675 A | 4/1988 | Brosnan et al. | |
| 4,743,858 A | 5/1988 | Everard | |
| 4,745,463 A | 5/1988 | Lu | |

| Patent | Date | Name |
|---|---|---|
| 4,751,468 A | 6/1988 | Agoston |
| 4,757,538 A | 7/1988 | Zink |
| 4,761,798 A | 8/1988 | Griswold, Jr. et al. |
| 4,768,187 A | 8/1988 | Marshall |
| 4,769,612 A | 9/1988 | Tamakoshi et al. |
| 4,772,853 A | 9/1988 | Hart |
| 4,785,463 A | 11/1988 | Janc et al. |
| 4,789,837 A | 12/1988 | Ridgers |
| 4,791,584 A | 12/1988 | Greivenkamp, Jr. |
| 4,801,823 A | 1/1989 | Yokoyama |
| 4,806,790 A | 2/1989 | Sone |
| 4,810,904 A | 3/1989 | Crawford |
| 4,810,976 A | 3/1989 | Cowley et al. |
| 4,811,362 A | 3/1989 | Yester, Jr. et al. |
| 4,816,704 A | 3/1989 | Fiori, Jr. |
| 4,819,252 A | 4/1989 | Christopher |
| 4,833,445 A | 5/1989 | Buchele |
| 4,841,265 A | 6/1989 | Watanabe et al. |
| 4,855,894 A | 8/1989 | Asahi et al. |
| 4,857,928 A | 8/1989 | Gailus et al. |
| 4,862,121 A | 8/1989 | Hochschild et al. |
| 4,868,654 A | 9/1989 | Juri et al. |
| 4,870,659 A | 9/1989 | Oishi et al. |
| 4,871,987 A | 10/1989 | Kawase |
| 4,873,492 A * | 10/1989 | Myer .......................... 330/86 |
| 4,885,587 A | 12/1989 | Wiegand et al. |
| 4,885,756 A | 12/1989 | Fontanes et al. |
| 4,888,557 A | 12/1989 | Puckette, IV et al. |
| 4,890,302 A | 12/1989 | Muilwijk |
| 4,893,316 A | 1/1990 | Janc et al. |
| 4,893,341 A | 1/1990 | Gehring |
| 4,894,766 A | 1/1990 | De Agro |
| 4,896,152 A | 1/1990 | Tiemann |
| 4,902,979 A | 2/1990 | Puckette, IV |
| 4,908,579 A | 3/1990 | Tawfik et al. |
| 4,910,752 A | 3/1990 | Yester, Jr. et al. |
| 4,914,405 A | 4/1990 | Wells |
| 4,920,510 A | 4/1990 | Senderowicz et al. |
| 4,922,452 A | 5/1990 | Larsen et al. |
| 4,931,921 A | 6/1990 | Anderson |
| 4,943,974 A | 7/1990 | Motamedi |
| 4,944,025 A | 7/1990 | Gehring et al. |
| 4,955,079 A | 9/1990 | Connerney et al. |
| 4,965,467 A | 10/1990 | Bilterijst |
| 4,967,160 A | 10/1990 | Quievy et al. |
| 4,970,703 A | 11/1990 | Hariharan et al. |
| 4,972,436 A | 11/1990 | Halim et al. |
| 4,982,353 A | 1/1991 | Jacob et al. |
| 4,984,077 A | 1/1991 | Uchida |
| 4,995,055 A | 2/1991 | Weinberger et al. |
| 5,003,621 A | 3/1991 | Gailus |
| 5,005,169 A | 4/1991 | Bronder et al. |
| 5,006,810 A | 4/1991 | Popescu |
| 5,010,585 A | 4/1991 | Garcia |
| 5,012,245 A | 4/1991 | Scott et al. |
| 5,014,304 A | 5/1991 | Nicollini et al. |
| 5,015,963 A | 5/1991 | Sutton |
| 5,016,242 A | 5/1991 | Tang |
| 5,017,924 A | 5/1991 | Guiberteau et al. |
| 5,020,149 A | 5/1991 | Hemmie |
| 5,020,154 A | 5/1991 | Zierhut |
| 5,052,050 A | 9/1991 | Collier et al. |
| 5,058,107 A | 10/1991 | Stone et al. |
| 5,065,409 A | 11/1991 | Hughes et al. |
| 5,083,050 A | 1/1992 | Vasile |
| 5,091,921 A | 2/1992 | Minami |
| 5,095,533 A | 3/1992 | Loper et al. |
| 5,095,536 A | 3/1992 | Loper |
| 5,111,152 A | 5/1992 | Makino |
| 5,113,094 A | 5/1992 | Grace et al. |
| 5,113,129 A | 5/1992 | Hughes |
| 5,115,409 A | 5/1992 | Stepp |
| 5,122,765 A | 6/1992 | Pataut |
| 5,124,592 A | 6/1992 | Hagino |
| 5,126,682 A | 6/1992 | Weinberg et al. |
| 5,136,267 A | 8/1992 | Cabot |
| 5,140,705 A | 8/1992 | Kosuga |
| 5,150,124 A | 9/1992 | Moore et al. |
| 5,151,661 A | 9/1992 | Caldwell et al. |
| 5,157,687 A | 10/1992 | Tymes |
| 5,159,710 A | 10/1992 | Cusdin |
| 5,170,414 A | 12/1992 | Silvian |
| 5,172,070 A | 12/1992 | Hiraiwa et al. |
| 5,179,731 A | 1/1993 | Tränkle et al. |
| 5,191,459 A | 3/1993 | Thompson et al. |
| 5,204,642 A | 4/1993 | Asghar et al. |
| 5,212,827 A | 5/1993 | Meszko et al. |
| 5,214,787 A | 5/1993 | Karkota, Jr. |
| 5,218,562 A | 6/1993 | Basehore et al. |
| 5,220,583 A | 6/1993 | Solomon |
| 5,220,680 A | 6/1993 | Lee |
| 5,222,144 A | 6/1993 | Whikehart |
| 5,230,097 A | 7/1993 | Currie et al. |
| 5,239,496 A | 8/1993 | Vancraeynest |
| 5,239,686 A | 8/1993 | Downey |
| 5,241,561 A | 8/1993 | Barnard |
| 5,249,203 A | 9/1993 | Loper |
| 5,251,218 A | 10/1993 | Stone et al. |
| 5,251,232 A | 10/1993 | Nonami |
| 5,260,970 A | 11/1993 | Henry et al. |
| 5,260,973 A | 11/1993 | Watanabe |
| 5,263,194 A | 11/1993 | Ragan |
| 5,263,196 A | 11/1993 | Jasper |
| 5,267,023 A | 11/1993 | Kawasaki |
| 5,278,826 A | 1/1994 | Murphy et al. |
| 5,282,023 A | 1/1994 | Scarpa |
| 5,282,222 A | 1/1994 | Fattouche et al. |
| 5,287,516 A | 2/1994 | Schaub |
| 5,293,398 A | 3/1994 | Hamao et al. |
| 5,303,417 A | 4/1994 | Laws |
| 5,307,517 A | 4/1994 | Rich |
| 5,315,583 A | 5/1994 | Murphy et al. |
| 5,319,799 A | 6/1994 | Morita |
| 5,321,852 A | 6/1994 | Seong |
| 5,325,204 A | 6/1994 | Scarpa |
| 5,337,014 A | 8/1994 | Najle et al. |
| 5,339,054 A | 8/1994 | Taguchi |
| 5,339,459 A | 8/1994 | Schiltz et al. |
| 5,345,239 A | 9/1994 | Madni et al. |
| 5,353,306 A | 10/1994 | Yamamoto |
| 5,355,114 A | 10/1994 | Sutterlin et al. |
| 5,361,408 A | 11/1994 | Watanabe et al. |
| 5,369,404 A | 11/1994 | Galton |
| 5,369,789 A | 11/1994 | Kosugi et al. |
| 5,369,800 A | 11/1994 | Takagi et al. |
| 5,375,146 A | 12/1994 | Chalmers |
| 5,379,040 A | 1/1995 | Mizomoto et al. |
| 5,379,141 A | 1/1995 | Thompson et al. |
| 5,388,063 A | 2/1995 | Takatori et al. |
| 5,389,839 A | 2/1995 | Heck |
| 5,390,364 A | 2/1995 | Webster et al. |
| 5,400,084 A | 3/1995 | Scarpa |
| 5,404,127 A | 4/1995 | Lee et al. |
| 5,410,270 A | 4/1995 | Rybicki et al. |
| 5,410,541 A | 4/1995 | Hotto |
| 5,410,743 A | 4/1995 | Seely et al. |
| 5,412,352 A | 5/1995 | Graham |
| 5,416,449 A | 5/1995 | Joshi |
| 5,416,803 A | 5/1995 | Janer |
| 5,422,909 A | 6/1995 | Love et al. |
| 5,422,913 A | 6/1995 | Wilkinson |
| 5,423,082 A | 6/1995 | Cygan et al. |

| | | | | | |
|---|---|---|---|---|---|
| 5,428,638 A | 6/1995 | Cioffi et al. | 5,628,055 A | 5/1997 | Stein |
| 5,428,640 A | 6/1995 | Townley | 5,630,227 A | 5/1997 | Bella et al. |
| 5,434,546 A | 7/1995 | Palmer | 5,633,815 A | 5/1997 | Young |
| 5,438,329 A | 8/1995 | Gastouniotis et al. | 5,634,207 A | 5/1997 | Yamaji et al. |
| 5,438,692 A | 8/1995 | Mohindra | 5,636,140 A | 6/1997 | Lee et al. |
| 5,440,311 A | 8/1995 | Gallagher et al. | 5,638,396 A | 6/1997 | Klimek |
| 5,444,415 A | 8/1995 | Dent et al. | 5,640,415 A | 6/1997 | Pandula |
| 5,444,416 A | 8/1995 | Ishikawa et al. | 5,640,424 A | 6/1997 | Banavong et al. |
| 5,444,865 A | 8/1995 | Heck et al. | 5,640,428 A | 6/1997 | Abe et al. |
| 5,446,421 A | 8/1995 | Kechkaylo | 5,640,698 A | 6/1997 | Shen et al. |
| 5,446,422 A | 8/1995 | Mattila et al. | 5,642,071 A | 6/1997 | Sevenhans et al. |
| 5,448,602 A | 9/1995 | Ohmori et al. | 5,648,985 A | 7/1997 | Bjerede et al. |
| 5,451,899 A | 9/1995 | Lawton | 5,650,785 A | 7/1997 | Rodal |
| 5,454,007 A | 9/1995 | Dutta | 5,661,424 A | 8/1997 | Tang |
| 5,454,009 A | 9/1995 | Fruit et al. | 5,663,878 A | 9/1997 | Walker |
| 5,463,356 A | 10/1995 | Palmer | 5,663,986 A | 9/1997 | Striffler |
| 5,463,357 A | 10/1995 | Hobden | 5,668,836 A | 9/1997 | Smith et al. |
| 5,465,071 A | 11/1995 | Kobayashi et al. | 5,675,392 A | 10/1997 | Nayebi et al. |
| 5,465,410 A | 11/1995 | Hiben et al. | 5,678,220 A | 10/1997 | Fournier |
| 5,465,415 A | 11/1995 | Bien | 5,678,226 A | 10/1997 | Li et al. |
| 5,465,418 A | 11/1995 | Zhou et al. | 5,680,078 A | 10/1997 | Ariie |
| 5,471,162 A | 11/1995 | McEwan | 5,680,418 A | 10/1997 | Croft et al. |
| 5,471,665 A | 11/1995 | Pace et al. | 5,682,099 A | 10/1997 | Thompson et al. |
| 5,479,120 A | 12/1995 | McEwan | 5,689,413 A | 11/1997 | Jaramillo et al. |
| 5,479,447 A | 12/1995 | Chow et al. | 5,694,096 A | 12/1997 | Ushiroku et al. |
| 5,481,570 A | 1/1996 | Winters | 5,697,074 A * | 12/1997 | Makikallio et al. ......... 455/126 |
| 5,483,193 A | 1/1996 | Kennedy et al. | 5,699,006 A | 12/1997 | Zele et al. |
| 5,483,549 A | 1/1996 | Weinberg et al. | 5,705,949 A | 1/1998 | Alelyunas et al. |
| 5,483,600 A * | 1/1996 | Werrbach ................... 381/106 | 5,705,955 A | 1/1998 | Freeburg et al. |
| 5,483,691 A | 1/1996 | Heck et al. | 5,710,992 A | 1/1998 | Sawada et al. |
| 5,483,695 A * | 1/1996 | Pardoen | 5,710,998 A | 1/1998 | Opas |
| 5,490,173 A | 2/1996 | Whikehart et al. | 5,714,910 A | 2/1998 | Skoczen et al. |
| 5,490,176 A | 2/1996 | Peltier | 5,715,281 A | 2/1998 | Bly et al. |
| 5,493,581 A | 2/1996 | Young et al. | 5,721,514 A | 2/1998 | Crockett et al. |
| 5,493,721 A | 2/1996 | Reis | 5,724,002 A | 3/1998 | Hulick |
| 5,495,200 A | 2/1996 | Kwan et al. | 5,724,653 A | 3/1998 | Baker et al. |
| 5,495,202 A | 2/1996 | Hsu | 5,729,577 A | 3/1998 | Chen |
| 5,495,500 A | 2/1996 | Jovanovich et al. | 5,729,829 A | 3/1998 | Talwar et al. |
| 5,499,267 A | 3/1996 | Ohe et al. | 5,732,333 A | 3/1998 | Cox et al. |
| 5,500,758 A | 3/1996 | Thompson et al. | 5,736,895 A | 4/1998 | Yu et al. |
| 5,513,389 A | 4/1996 | Reeser et al. | 5,737,035 A | 4/1998 | Rotzoll |
| 5,515,014 A | 5/1996 | Troutman | 5,742,189 A | 4/1998 | Yoshida et al. |
| 5,517,688 A | 5/1996 | Fajen et al. | 5,745,846 A | 4/1998 | Myer et al. |
| 5,519,890 A | 5/1996 | Pinckley | 5,748,683 A | 5/1998 | Smith et al. |
| 5,523,719 A | 6/1996 | Longo et al. | 5,751,154 A | 5/1998 | Tsugai |
| 5,523,726 A | 6/1996 | Kroeger et al. | 5,757,858 A | 5/1998 | Black et al. |
| 5,523,760 A | 6/1996 | McEwan | 5,757,870 A | 5/1998 | Miya et al. |
| 5,539,770 A | 7/1996 | Ishigaki | RE35,829 E | 6/1998 | Sanderford, Jr. |
| 5,555,453 A | 9/1996 | Kajimoto et al. | 5,760,629 A | 6/1998 | Urabe et al. |
| 5,557,641 A | 9/1996 | Weinberg | 5,760,632 A | 6/1998 | Kawakami et al. |
| 5,557,642 A | 9/1996 | Williams | 5,760,645 A | 6/1998 | Comte et al. |
| 5,563,550 A | 10/1996 | Toth | 5,764,087 A | 6/1998 | Clark |
| 5,564,097 A * | 10/1996 | Swanke | 5,767,726 A | 6/1998 | Wang |
| 5,574,755 A | 11/1996 | Persico | 5,768,118 A | 6/1998 | Faulk et al. |
| 5,579,341 A | 11/1996 | Smith et al. | 5,768,323 A | 6/1998 | Kroeger et al. |
| 5,579,347 A | 11/1996 | Lindquist et al. | 5,770,985 A | 6/1998 | Ushiroku et al. |
| 5,584,068 A | 12/1996 | Mohindra | 5,771,442 A | 6/1998 | Wang et al. |
| 5,589,793 A | 12/1996 | Kassapian | 5,777,692 A | 7/1998 | Ghosh |
| 5,592,131 A | 1/1997 | Labreche et al. | 5,777,771 A | 7/1998 | Smith |
| 5,600,680 A | 2/1997 | Mishima et al. | 5,778,022 A | 7/1998 | Walley |
| 5,602,847 A | 2/1997 | Pagano et al. | 5,784,689 A * | 7/1998 | Kobayashi ................... 455/126 |
| 5,602,868 A | 2/1997 | Wilson | 5,786,844 A | 7/1998 | Rogers et al. |
| 5,604,592 A | 2/1997 | Kotidis et al. | 5,790,587 A | 8/1998 | Smith et al. |
| 5,604,732 A | 2/1997 | Kim et al. | 5,793,801 A | 8/1998 | Fertner |
| 5,606,731 A | 2/1997 | Pace et al. | 5,793,817 A | 8/1998 | Wilson |
| 5,608,531 A | 3/1997 | Honda et al. | 5,793,818 A | 8/1998 | Claydon et al. |
| 5,610,946 A | 3/1997 | Tanaka et al. | 5,801,654 A | 9/1998 | Traylor |
| RE35,494 E | 4/1997 | Nicollini | 5,802,463 A | 9/1998 | Zuckerman |
| 5,617,451 A | 4/1997 | Mimura et al. | 5,809,060 A | 9/1998 | Cafarella et al. |
| 5,619,538 A | 4/1997 | Sempel et al. | 5,812,546 A | 9/1998 | Zhou et al. |
| 5,621,455 A | 4/1997 | Rogers et al. | 5,818,582 A | 10/1998 | Fernandez et al. |

| | | | | | | |
|---|---|---|---|---|---|---|
| 5,818,869 A | 10/1998 | Miya et al. | 6,031,217 A | | 2/2000 | Aswell et al. |
| 5,825,254 A | 10/1998 | Lee | 6,041,073 A | | 3/2000 | Davidovici et al. |
| 5,834,979 A | 11/1998 | Yatsuka | 6,047,026 A | | 4/2000 | Chao et al. |
| 5,834,985 A | 11/1998 | Sundegård | 6,049,573 A | | 4/2000 | Song |
| 5,841,324 A | 11/1998 | Williams | 6,049,706 A | | 4/2000 | Cook et al. |
| 5,841,811 A | 11/1998 | Song | 6,054,889 A | | 4/2000 | Kobayashi |
| 5,844,449 A | 12/1998 | Abeno et al. | 6,057,714 A | | 5/2000 | Andrys et al. |
| 5,844,868 A | 12/1998 | Takahashi et al. | 6,061,551 A | | 5/2000 | Sorrells et al. |
| 5,859,878 A | 1/1999 | Phillips et al. | 6,061,555 A | | 5/2000 | Bultman et al. |
| 5,864,754 A | 1/1999 | Hotto | 6,064,054 A | | 5/2000 | Waczynski et al. |
| 5,870,670 A | 2/1999 | Ripley et al. | 6,067,329 A | | 5/2000 | Kato et al. |
| 5,872,446 A | 2/1999 | Cranford, Jr. et al. | 6,073,001 A | * | 6/2000 | Sokoler |
| 5,881,375 A | 3/1999 | Bonds | 6,076,015 A | | 6/2000 | Hartley et al. |
| 5,883,548 A | 3/1999 | Assard et al. | 6,078,630 A | | 6/2000 | Prasanna |
| 5,892,380 A | 4/1999 | Quist | 6,081,691 A | | 6/2000 | Renard et al. |
| 5,894,239 A | 4/1999 | Bonaccio et al. | 6,084,465 A | | 7/2000 | Dasgupta |
| 5,894,496 A | 4/1999 | Jones | 6,084,922 A | | 7/2000 | Zhou et al. |
| 5,896,304 A | 4/1999 | Tiemann et al. | 6,085,073 A | * | 7/2000 | Palermo et al. |
| 5,896,562 A | 4/1999 | Heinonen | 6,091,289 A | * | 7/2000 | Song et al. .................. 327/558 |
| 5,898,912 A | 4/1999 | Heck et al. | 6,091,939 A | | 7/2000 | Banh |
| 5,900,747 A | 5/1999 | Brauns | 6,091,940 A | | 7/2000 | Sorrells et al. |
| 5,901,054 A | 5/1999 | Leu et al. | 6,091,941 A | | 7/2000 | Moriyama et al. |
| 5,901,187 A | 5/1999 | Iinuma | 6,094,084 A | | 7/2000 | Abou-Allam et al. |
| 5,901,344 A | 5/1999 | Opas | 6,098,046 A | * | 8/2000 | Cooper et al. |
| 5,901,347 A | 5/1999 | Chambers et al. | 6,098,886 A | | 8/2000 | Swift et al. |
| 5,901,348 A | 5/1999 | Bang et al. | 6,121,819 A | | 9/2000 | Traylor |
| 5,901,349 A | 5/1999 | Guegnaud et al. | 6,125,271 A | | 9/2000 | Rowland er al. |
| 5,903,178 A | 5/1999 | Miyatsuji et al. | 6,144,236 A | | 11/2000 | Vice et al. |
| 5,903,187 A | 5/1999 | Claverie et al. | 6,144,331 A | | 11/2000 | Jiang |
| 5,903,196 A | 5/1999 | Salvi et al. | 6,144,846 A | | 11/2000 | Durec |
| 5,903,421 A | 5/1999 | Furutani et al. | 6,147,340 A | | 11/2000 | Levy |
| 5,903,553 A | 5/1999 | Sakamoto et al. | 6,147,763 A | | 11/2000 | Steinlechner |
| 5,903,595 A | 5/1999 | Suzuki | 6,150,890 A | | 11/2000 | Damgaard et al. |
| 5,903,609 A | 5/1999 | Kool et al. | 6,151,354 A | | 11/2000 | Abbey |
| 5,903,827 A | 5/1999 | Kennan et al. | 6,160,280 A | | 12/2000 | Bonn et al. |
| 5,903,854 A | 5/1999 | Abe et al. | 6,169,733 B1 | | 1/2001 | Lee |
| 5,905,449 A | 5/1999 | Tsubouchi et al. | 6,175,728 B1 | | 1/2001 | Mitama |
| 5,907,149 A | 5/1999 | Marckini | 6,178,319 B1 | | 1/2001 | Kashima |
| 5,907,197 A | 5/1999 | Faulk | 6,204,789 B1 | | 3/2001 | Nagata |
| 5,909,447 A | 6/1999 | Cox et al. | 6,208,636 B1 | | 3/2001 | Tawil et al. |
| 5,911,116 A | 6/1999 | Nosswitz | 6,211,718 B1 | | 4/2001 | Souetinov |
| 5,911,123 A | 6/1999 | Shaffer et al. | 6,212,369 B1 | | 4/2001 | Avasarala |
| 5,914,622 A | 6/1999 | Inoue | 6,215,475 B1 | | 4/2001 | Meyerson et al. |
| 5,915,278 A | 6/1999 | Mallick | 6,225,848 B1 | | 5/2001 | Tilley et al. |
| 5,920,199 A | 7/1999 | Sauer | 6,230,000 B1 | * | 5/2001 | Tayloe |
| 5,926,065 A | 7/1999 | Wakai et al. | 6,266,518 B1 | | 7/2001 | Sorrells et al. |
| 5,926,513 A | 7/1999 | Suominen et al. | 6,307,894 B2 | | 10/2001 | Eidson et al. |
| 5,933,467 A | 8/1999 | Sehier et al. | 6,308,058 B1 | | 10/2001 | Souetinov et al. |
| 5,937,013 A | 8/1999 | Lam et al. | 6,313,685 B1 | | 11/2001 | Rabii |
| 5,943,370 A | 8/1999 | Smith | 6,314,279 B1 | | 11/2001 | Mohindra |
| 5,945,660 A | 8/1999 | Nakasuji et al. | 6,317,589 B1 | | 11/2001 | Nash |
| 5,949,827 A | 9/1999 | DeLuca et al. | 6,321,073 B1 | | 11/2001 | Luz et al. |
| 5,952,895 A | 9/1999 | McCune, Jr. et al. | 6,327,313 B1 | | 12/2001 | Traylor et al. |
| 5,953,642 A | 9/1999 | Feldtkeller et al. | 6,330,244 B1 | | 12/2001 | Swartz et al. |
| 5,955,992 A | 9/1999 | Shattil | 6,335,656 B1 | * | 1/2002 | Goldfarb et al. ............ 327/559 |
| 5,959,850 A | 9/1999 | Lim | 6,353,735 B1 | | 3/2002 | Sorrells et al. |
| 5,960,033 A | 9/1999 | Shibano et al. | 6,363,262 B1 | | 3/2002 | McNicol |
| 5,970,053 A | 10/1999 | Schick et al. | 6,366,622 B1 | | 4/2002 | Brown et al. |
| 5,982,315 A | 11/1999 | Bazarjani et al. | 6,370,371 B1 | | 4/2002 | Sorrells et al. |
| 5,982,329 A | 11/1999 | Pittman et al. | 6,385,439 B1 | | 5/2002 | Hellberg |
| 5,994,689 A | 11/1999 | Charrier | 6,400,963 B1 | * | 6/2002 | Glöckler et al. |
| 5,995,030 A | 11/1999 | Cabler | 6,421,534 B1 | | 7/2002 | Cook et al. |
| 5,999,561 A | 12/1999 | Naden et al. | 6,437,639 B1 | * | 8/2002 | Nguyen et al. ............. 327/558 |
| 6,005,903 A | 12/1999 | Mendelovicz | 6,459,721 B1 | | 10/2002 | Mochizuki et al. |
| 6,011,435 A | 1/2000 | Takeyabu et al. | 6,509,777 B1 | | 1/2003 | Razavi et al. |
| 6,014,176 A | 1/2000 | Nayebi et al. | 6,512,544 B1 | | 1/2003 | Merrill et al. |
| 6,014,551 A | 1/2000 | Pesola et al. | 6,516,185 B1 | | 2/2003 | MacNally |
| 6,018,262 A | 1/2000 | Noro et al. | 6,531,979 B1 | | 3/2003 | Hynes |
| 6,018,553 A | 1/2000 | Sanielevici et al. | 6,542,722 B1 | * | 4/2003 | Sorrells et al. |
| 6,026,286 A | 2/2000 | Long | 6,560,301 B1 | * | 5/2003 | Cook et al. |
| 6,028,887 A | 2/2000 | Harrison et al. | 6,580,902 B1 | | 6/2003 | Sorrells et al. |

| | | | |
|---|---|---|---|
| 6,600,795 B1 | 7/2003 | Ohta et al. | |
| 6,600,911 B1 | 7/2003 | Morishige et al. | |
| 6,608,647 B1 | 8/2003 | King | |
| 6,611,569 B1 | 8/2003 | Schier et al. | |
| 6,628,328 B1 | 9/2003 | Yokouchi et al. | |
| 6,633,194 B2 | 10/2003 | Arnborg et al. | |
| 6,634,555 B1 | 10/2003 | Sorrells et al. | |
| 6,647,250 B1 | 11/2003 | Bultman et al. | |
| 6,686,879 B2 | 2/2004 | Shattil | |
| 6,687,493 B1 | 2/2004 | Sorrells et al. | |
| 6,690,232 B2 * | 2/2004 | Ueno et al. | 330/85 |
| 6,694,128 B1 | 2/2004 | Sorrells et al. | |
| 6,697,603 B1 | 2/2004 | Lovinggood et al. | |
| 6,704,549 B1 | 3/2004 | Sorrells et al. | |
| 6,704,558 B1 | 3/2004 | Sorrells et al. | |
| 6,741,139 B2 | 5/2004 | Pleasant et al. | |
| 6,798,351 B1 | 9/2004 | Sorrells et al. | |
| 6,801,253 B1 | 10/2004 | Yonemoto et al. | |
| 6,813,485 B2 | 11/2004 | Sorrells et al. | |
| 6,823,178 B2 | 11/2004 | Pleasant et al. | |
| 6,836,650 B2 | 12/2004 | Sorrells et al. | |
| 6,850,742 B2 | 2/2005 | Fayyaz | |
| 6,853,690 B1 | 2/2005 | Sorrells et al. | |
| 2001/0036818 A1 | 11/2001 | Dobrovolny | |
| 2002/0037706 A1 * | 3/2002 | Ichihara | 455/324 |
| 2003/0081781 A1 | 5/2003 | Jensen et al. | |
| 2003/0103581 A1 | 6/2003 | Rawlins et al. | |
| 2003/0128776 A1 | 7/2003 | Rawlins et al. | |
| 2003/0171107 A1 | 9/2003 | Sorrells et al | |
| 2003/0181186 A1 | 9/2003 | Sorrells et al. | |
| 2003/0181189 A1 | 9/2003 | Sorrells et al. | |
| 2003/0181190 A1 | 9/2003 | Sorrells et al. | |
| 2004/0002321 A1 | 1/2004 | Sorrells et al. | |

FOREIGN PATENT DOCUMENTS

| | | |
|---|---|---|
| EP | 0 380 351 A2 | 8/1990 |
| EP | 0 380 351 A3 | 2/1991 |
| EP | 0 411 840 A2 | 2/1991 |
| EP | 0 423 718 A2 | 4/1991 |
| EP | 0 411 840 A3 | 7/1991 |
| EP | 0 486 095 A1 | 5/1992 |
| EP | 0 423 718 A3 | 8/1992 |
| EP | 0 512 748 A2 | 11/1992 |
| EP | 0 529 836 A1 | 3/1993 |
| EP | 0 548 542 A1 | 6/1993 |
| EP | 0 512 748 A3 | 7/1993 |
| EP | 0 560 228 A1 | 9/1993 |
| EP | 0 632 288 A2 | 1/1995 |
| EP | 0 632 577 A1 | 1/1995 |
| EP | 0 643 477 A3 | 3/1995 |
| EP | 0 643 477 A2 | 3/1995 |
| EP | 0 411 840 B1 | 10/1995 |
| EP | 0 696 854 A1 | 2/1996 |
| EP | 0 632 288 A3 | 7/1996 |
| EP | 0 732 803 A1 | 9/1996 |
| EP | 0 486 095 B1 | 2/1997 |
| EP | 0 782 275 A2 | 7/1997 |
| EP | 0 785 635 A1 | 7/1997 |
| EP | 0 789 449 A2 | 8/1997 |
| EP | 0 789 449 A3 | 8/1997 |
| EP | 0 795 955 A3 | 9/1997 |
| EP | 0 795 978 A2 | 9/1997 |
| EP | 0 817 369 A2 | 1/1998 |
| EP | 0 817 369 A3 | 1/1998 |
| EP | 0 837 565 A1 | 4/1998 |
| EP | 0 862 274 A1 | 9/1998 |
| EP | 0 874 499 A2 | 10/1998 |
| EP | 0 512 748 B1 | 11/1998 |
| EP | 0 877 476 A1 | 11/1998 |
| EP | 0 977 351 A1 | 2/2000 |
| FR | 2 245 130 | 4/1975 |
| FR | 2 669 787 A1 | 5/1992 |
| FR | 2 743 231 A1 | 7/1997 |
| GB | 2 161 344 A | 1/1986 |
| GB | 2 215 945 A | 9/1989 |
| GB | 2 324 949 A | 11/1998 |
| JP | 47-2314 | 2/1972 |
| JP | 55-66057 | 5/1980 |
| JP | 56-114451 | 9/1981 |
| JP | 58-7903 | 1/1983 |
| JP | 58-133004 | 8/1983 |
| JP | 59-144249 | 8/1984 |
| JP | 60-58705 | 4/1985 |
| JP | 60-130203 | 7/1985 |
| JP | 61-30821 | 2/1986 |
| JP | 63-54002 | 3/1988 |
| JP | 63-65587 | 3/1988 |
| JP | 63-153691 | 6/1988 |
| JP | 2-39632 | 2/1990 |
| JP | 2-131629 | 5/1990 |
| JP | 2-276351 | 11/1990 |
| JP | 4-123614 | 4/1992 |
| JP | 4-127601 | 4/1992 |
| JP | 5-175730 | 7/1993 |
| JP | 5-175734 | 7/1993 |
| JP | 5-327356 | 12/1993 |
| JP | 6-237276 | 8/1994 |
| JP | 7-154344 | 6/1995 |
| JP | 7-307620 | 11/1995 |
| JP | 8-23359 | 1/1996 |
| JP | 8-32556 | 2/1996 |
| JP | 8-139524 | 5/1996 |
| JP | 9-36664 | 2/1997 |
| WO | WO 80/01633 A1 | 8/1980 |
| WO | WO 91/18445 A1 | 11/1991 |
| WO | WO 94/05087 A1 | 3/1994 |
| WO | WO 95/01006 A1 | 1/1995 |
| WO | WO 96/02977 A1 | 2/1996 |
| WO | WO 96/08078 A1 | 3/1996 |
| WO | WO 96/39750 A1 | 12/1996 |
| WO | WO 97/08839 A2 | 3/1997 |
| WO | WO 97/08839 A3 | 3/1997 |
| WO | 0 795 955 A2 | 9/1997 |
| WO | WO 97/38490 A1 | 10/1997 |
| WO | WO 98/00953 A1 | 1/1998 |
| WO | WO 98/24201 A1 | 6/1998 |
| WO | WO 98/40968 A3 | 9/1998 |
| WO | WO 98/40968 A2 | 9/1998 |
| WO | WO 99/23755 A1 | 5/1999 |
| WO | WO 00/31659 A1 | 6/2000 |

OTHER PUBLICATIONS

Deboo, Gordon J., *Integrated Circuits and Semiconductor Devices*, 2$^{nd}$ Edition, McGraw–Hill, Inc., pp. 41–45 (1977).

Sorrells et al., U.S. Appl. No. 09/526,041, filed Mar. 14, 2000, entitled "DC Offset, Re–radiation, and I/Q Solutions Using Universal Frequency Translation Technology," 307 pages.

Aghvami, H. et al., "Land Mobile Satellites Using the Highly Elliptic Orbits– The UK T–SAT Mobile Payload," *Fourth International Conference on Satellite Systems for Mobile Communications and Navigation*, IEE, pp. 147–153 (Oct. 17–19, 1988).

Akers, N.P. et al., "RF Sampling Gates: a Brief Review," *IEE Proceedings*, IEE, vol. 133, Part A, No. 1, pp. 45–49 (Jan. 1986).

Al–Ahmad, H.A.M. et al., "Doppler Frequency Correction for a Non–Geostationary Communications Satellite. Techniques for CERS and T–SAT," *Electronics Division Colloquium on Low Noise Oscillators and Synthesizers*, IEE, pp. 4/1–4/5 (Jan. 23, 1986).

Ali, I. et al., "Doppler Characterization for LEO Satellites," *IEEE Transactions on Communications*, IEEE, vol. 46, No. 3, pp. 309–313 (Mar. 1998).

Allan, D.W., "Statistics of Atomic Frequency Standards," *Proceedings Of The IEEE Special Issue on Frequency Stability*, IEEE, pp. 221–230 (Feb. 1966).

Allstot, D.J. et al., "MOS Switched Capacitor Ladder Filters," *IEEE Journal of Solid–State Circuits*, IEEE, vol. SC–13, No. 6, pp. 806–814 (Dec. 1978).

Allstot, D.J. and Black Jr. W.C., "Technological Design Considerations for Monolithic MOS Switched–Capacitor Filtering Systems," *Proceedings of the IEEE*, IEEE, vol. 71, No. 8, pp. 967–986 (Aug. 1983).

Alouini, M. et al., "Channel Characterization and Modeling for Ka–Band Very Small Aperture Terminals," *Proceedings Of the IEEE*, IEEE, vol. 85, No. 6, pp. 981–997 (Jun. 1997).

Andreyev, G.A. and Ogarev, S.A., "Phase Distortions of Keyed Millimeter–Wave Signals in the Case of Propagation in a Turbulent Atmosphere," *Telecommunications and Radio Engineering*, Scripta Technica, vol. 43, No. 12, pp. 87–90 (Dec. 1988).

Antonetti, A. et al., "Optoelectronic Sampling in the Picosecond Range," *Optics Communications*, North–Holland Publishing Company, vol. 21, No. 2, pp. 211–214 (May 1977).

Austin, J. et al., "Doppler Correction of the Telecommunication Payload Oscillators in the UK T–SAT," *18th European Microwave Conference*, Microwave Exhibitions and Publishers Ltd., pp. 851–857 (Sep. 12–15, 1988).

Auston, D.H., "Picosecond optoelectronic switching and gating in silicon," *Applied Physics Letters*, American Institute of Physics, vol. 26, No. 3, pp. 101–103 (Feb. 1, 1975).

Baher, H., "Transfer Functions for Switched–Capacitor and Wave Digital Filters," *IEEE Transactions on Circuits and Systems*, IEEE Circuits and Systems Society, vol. CAS–33, No. 11, pp. 1138–1142 (Nov. 1986).

Baines, R., "The DSP Bottleneck," *IEEE Communications Magazine*, IEEE Communications Society, pp. 46–54 (May 1995).

Banjo, O.P. and Vilar, E., "Binary Error Probabilities on Earth–Space Links Subject to Scintillation Fading," *Electronics Letters*, IEE, vol. 21, No. 7, pp. 296–297 (Mar. 28, 1985).

Banjo, O.P. and Vilar, E., "The Dependence of Slant Path Amplitude Scintillations on Various Meteorological Parameters," *Fifth International Conference on Antennas and Propagation (ICAP 87) Part 2: Propagation*, IEE, pp. 277–280 (Mar. 30–Apr. 2, 1987).

Banjo, O.P. and Vilar, E. "Measurement and Modeling of Amplitude Scintillations on Low–Elevation Earth–Space Paths and Impact on Communication Systems," *IEEE Transactions on Communications*, IEEE Communications Society, vol. COM–34, No. 8, pp. 774–780 (Aug. 1986).

Banjo, O.P. et al., "Tropospheric Amplitude Spectra Due to Absorption and Scattering in Earth–Space Paths," *Fourth International Conference on Antennas and Propagation (ICAP 85)*, IEE, 77–82 (Apr. 16–19, 1985).

Basili,P. et al., "Case Study of Intense Scintillation Events on the OTS Path," *IEEE Transactions on Antennas and Propagation*, IEEE, vol. 38, No. 1, pp. 107–113 (Jan. 1990).

Basili, P. et al., "Observation of High $C^2$ and Turbulent Path Length on OTS Space–Earth Link," *Electronics Letters*, IEE, vol. 24, No. 17, pp. 1114–1116 (Aug. 18, 1988).

Blakey, J.R. et al., "Measurement of Atmospheric Millimetre–Wave Phase Scintillations in an Absorption Region," *Electronics Letters*, IEE, vol. 21, No. 11, pp. 486–487 (May 23, 1985).

Burgueño, A. et al., "Influence of rain gauge integration time on the rain rate statistics used in microwave communications," *annales des télécommunications*, International Union of Radio Science, pp. 522–527 (Sep./Oct. 1988).

Burgueño, A. et al., "Long–Term Joint Statistical Analysis of Duration and Intensity of Rainfall Rate with Application to Microwave Communications," *Fifth International Conference on Antennas and Propagation (ICAP 87) Part 2: Propagation*, IEE, pp. 198–201 (Mar. 30–Apr. 2, 1987).

Burgueño, A. et al., "Long Term Statistics of Precipitation Rate Return Periods in the Context of Microwave Communications," *Sixth International Conference on Antennas and Propagation (ICAP 89) Part 2: Propagation*, IEE, pp. 297–310 (Apr. 4–7, 1989).

Burgueño, A. et al., "Spectral Analysis of 49 Years of Rainfall Rate and Relation to Fade Dynamics," *IEEE Transactions on Communications*, IEEE Communications Society, vol. 38, No. 9, pp. 1359–1366 (Sep. 1990).

Catalan, C. and Vilar, E., "Approach for satellite slant path remote sensing," *Electronics Letters*, IEE, vol. 34, No. 12, pp. 1238–1240 (Jun. 11, 1998).

Chan, P. et al., "A Highly Linear 1–GHz CMOS Downconversion Mixer," *European Solid State Circuits Conference*, IEEE Communication Society, pp. 210–213 (Sep. 22–24, 1993).

Declaration of Michael J. Bultman filed in U.S. Appl. No. 09/176,022, which is directed to related subject matter, 2 pages.

Declaration of Robert W. Cook filed in U.S. Appl. No. 09/176,022, which is directed to related subject matter, 2 pages.

Declaration of Alex Holtz filed in U.S. Appl. No. 09/176,022, which is directed to related subject matter, 3 pages.

Declaration of Richard C. Looke filed in U.S. Appl. No. 09/176,022, which is directed to related subject matter, 2 pages.

Declaration of Charley D. Moses, Jr. filed in U.S. Appl. No. 09/176,022, which is directed to related subject matter, 2 pages.

Declaration of Jeffrey L. Parker and David F. Sorrells, with attachment Exhibit 1, filed in U.S. Appl. No. 09/176,022, which is directed to related subject matter, 130 pages.

Dewey, R.J. and Collier, C.J., "Multi–Mode Radio Receiver," *Electronics Division Colloquium on Digitally Implemented Radios*, IEE, pp. 3/1–3/5 (Oct. 18, 1985).

Dialog File 347 (JAPIO) English Language Patent Abstract for JP 2-276351, 1 page (Nov. 13, 1990—Date of publication of application).

Dialog File 347 (JAPIO) English Language Patent Abstract for JP 2-131629, 1 page (May 21, 1990—Date of publication of application).

Dialog File 347 (JAPIO) English Language Patent Abstract for JP 2-39632, 1 page (Feb. 8, 1990—Date of publication of application).

Dialog File 348 (European Patents) English Language Patent Abstract for EP 0 785 635 A1, 3 pages (Dec. 26, 1996—Date of publication of application).

Dialog File 348 (European Patents) English Language Patent Abstract for EP 35166 A1, 2 pages (Feb. 18, 1981—Date of publication of application).

"DSO takes sampling rate to 1 Ghz," *Electronic Engineering*, Morgan Grampian Publishers, vol. 59, No. 723, pp. 77 and 79 (Mar. 1987).

Erdi, G. and Henneuse, P.R., "A Precision FET–Less Sample–and–Hold with High Charge–to–Droop Current Ratio," *IEEE Journal of Solid–State Circuits*, IEEE, vol. SC–13, No. 6, pp. 864–873 (Dec. 1978).

Faulkner, N.D. and Vilar, E., "Subharmonic Sampling for the Measurement of Short Term Stability of Microwave Oscillators," *IEEE Transactions on Instrumentation and Measurement*, IEEE, vol. IM–32, No. 1, pp. 208–213 (Mar. 1983).

Faulkner, N.D. et al., "Sub–Harmonic Sampling for the Accurate Measurement of Frequency Stability of Microwave Oscillators," *CPEM 82 Digest: Conference on Precision Electromagnetic Measurements*, IEE, pp. M–10 and M–11 (1982).

Faulkner, N.D. and Vilar, E., "Time Domain Analysis of Frequency Stability Using Non–Zero Dead–Time Counter Techniques," *CPEM 84 Digest Conference on Precision Electromagnetic Measurements*, IEEE, pp. 81–82 (1984).

Filip, M. and Vilar, E., "Optimum Utilization of the Channel Capacity of a Satellite Link in the Presence of Amplitude Scintillations and Rain Attenuation," *IEEE Transactions on Communications*, IEEE Communications Society, vol. 38, No. 11, pp. 1958–1965 (Nov. 1990).

Fukahori, K., "A CMOS Narrow–Band Signaling Filter with Q Reduction," *IEEE Journal of Solid–State Circuits*, IEEE, vol. SC–19, No. 6, pp. 926–932 (Dec. 1984).

Fukuchi, H. and Otsu, Y., "Available time statistics of rain attenuation on earth–space path," *IEE Proceedings–H: Microwaves, Antennas and Propagation*, IEE, vol. 135, Pt. H, No. 6, pp. 387–390 (Dec. 1988).

Gibbins, C.J. and Chadha, R., "Millimetre–wave propagation through hydrocarbon flame," *IEE Proceedings*, IEE, vol. 134, Pt. H, No. 2, pp. 169–173 (Apr. 1987).

Gilchrist, B. et al., "Sampling hikes performance of frequency synthesizers," *Microwaves & RF*, Hayden Publishing, vol. 23, No. 1, pp. 93–94 and 110 (Jan. 1984).

Gossard, E.E., "Clear weather meterological effects on propagation at frequencies above 1 Ghz," *Radio Science*, American Geophysical Union, vol. 16, No. 5, pp. 589–608 (Sep.–Oct. 1981).

Gregorian, R. et al., "Switched–Capacitor Circuit Design," *Proceedings of the IEEE*, IEEE, vol. 71, No. 8, pp. 941–966 (Aug. 1983).

Groshong et al., "Undersampling Techniques Simplify Digital Radio," *Electronic Design*, Penton Publishing, pp. 67–68, 70, 73–75 and 78 (May 23, 1991).

Grove, W.M., "Sampling for Oscilloscopes and Other RF Systems: Dc through X–Band," *IEEE Transactions on Microwave Theory and Techniques*, IEEE, pp. 629–635 (Dec. 1966).

Haddon, J. et al., "Measurement of Microwave Scintillations on a Satellite Down–Link at X–Band," *Antennas and Propagation*, IEE, pp. 113–117 (1981).

Haddon, J. and Vilar, E., "Scattering Induced Microwave Scintillations from Clear Air and Rain on Earth Space Paths and the Influence of Antenna Aperture," *IEEE Transactions on Antennas and Propagation*, IEEE, vol. AP–34, No. 5, pp. 646–657 (May 1986).

Hafdallah, H. et al., "2–4 Ghz MESFET Sampler," *Electronics Letters*, IEE, vol. 24, No. 3, pp. 151–153 (Feb. 4, 1988).

Herben, M.H.A.J., "Amplitude and Phase Scintillation Measurements on 8–2 km Line–Of–Sight Path at 30 Ghz," *Electronics Letters*, IEE, vol. 18, No. 7, pp. 287–289 (Apr. 1, 1982).

Hewitt, A. et al., "An 18 Ghz Wideband LOS Multipath Experiment," *International Conference on Measurements for Telecommunication Transmission Systems—MTTS 85*, IEE, pp. 112–116 (Nov. 27–28, 1985).

Hewitt, A. et al., "An Autoregressive Approach to the Identification of Multipath Ray Parameters from Field Measurements," *IEEE Transactions on Communications*, IEEE Communications Society, vol. 37, No. 11, pp. 1136–1143 (Nov. 1989).

Hewitt, A. and Vilar, E., "Selective fading on LOS Microwave Links: Classical and Spread–Spectrum Measurement Techniques," *IEEE Transactions on Communications*, IEEE Communications Society, vol. 36, No. 7, pp. 789–796 (Jul. 1988).

Hospitalier, E., "Instruments for Recording and Observing Rapidly Varying Phenomena," *Science Abstracts*, IEE, vol. VII, pp. 22–23 (1904).

Howard, I.M. and Swansson, N.S., "Demodulating High Frequency Resonance Signals for Bearing Fault Detection," *The Institution of Engineers Australia Vibration and Noise Conference*, Institution of Engineers, Australia, pp. 115–121 (Sep. 18–20, 1990).

Hu, X., *A Switched–Current Sample–and–Hold Amplifier for FM Demodulation*, Thesis for Master of Applied Science, Dept. of Electrical and Computer Engineering, University of Toronto, UMI Dissertation Services, pp. 1–64 (1995).

Hung, H–L. A. et al., "Characterization of Microwave Integrated Circuits Using An Optical Phase–Locking and Sampling System," *IEEE MTT–S Digest*, IEEE, pp. 507–510, (1991).

Hurst, P.J., "Shifting the Frequency Response of Switched–Capacitor Filters by Nonuniform Sampling," *IEEE Transactions on Circuits and Systems*, IEEE Circuits and Systems Society, vol. 38, No. 1, pp. 12–19 (Jan. 1991).

Itakura, T., "Effects of the sampling pulse width on the frequency characteristics of a sample–and–hold circuit," *IEE Proceedings Circuits, Devices and Systems*, IEE, vol. 141, No. 4, pp. 328–336 (Aug. 1994).

Janssen, J.M.L., "An Experimental 'Stroboscopic' Oscilloscope for Frequencies up to about 50 Mc/s: I. Fundamentals," *Philips Technical Review*, Philips Research Laboratories, vol. 12, No. 2, pp. 52–59 (Aug. 1950).

Janssen, J.M.L. and Michels, A.J., "An Experimental 'Stroboscopic' Oscilloscope for Frequencies up to about 50 Mc/s: II. Electrical Build–Up," *Philips Technical Review*, Philips Research Laboratories, vol. 12, No. 3, pp. 73–82 (Sep. 1950).

Jondral, V.F. et al., "Doppler Profiles for Communication Satellites," *Frequenz*, Herausberger, pp. 111–116 (May–Jun. 1996).

Kaleh, G.K., "A Frequency Diversity Spread Spectrum System for Communication in the Presence on In–band Interference," *1995 IEEE Globecom,* IEEE Communications Society, pp. 66–70 (1995).

Karasawa, Y. et al., "A New Prediction Method for Tropospheric Scintillation on Earth–Space Paths," *IEEE Transactions on Antennas and Propagation,* IEEE Antennas and Propagation Society, vol. 36, No. 11, pp. 1608–1614 (Nov. 1988).

Kirsten, J. and Fleming, J., "Undersampling reduces data–acquisition costs for select applications," *EDN,* Cahners Publishing, vol. 35, No. 13, pp. 217–222, 224, 226–228 (Jun. 21, 1990).

Lam, W.K. et al., "Measurement of the Phase Noise Characteristics of an Unlocked Communications Channel Identifier," *Proceedings Of the 1993 IEEE International Frequency Control Symposium,* IEEE, pp. 283–288 (Jun. 2–4, 1993).

Lam, W.K. et al., "Wideband sounding of 11.6 Ghz transhorizon channel," *Electronics Letters,* IEE, vol. 30, No. 9, pp. 738–739 (Apr. 28, 1994).

Larkin, K.G., "Efficient demodulator for bandpass sampled AM signals," *Electronics Letters,* IEE, vol. 32, No. 2, pp. 101–102 (Jan. 18, 1996).

Lau, W.H. et al., "Analysis of the Time Variant Structure of Microwave Line–of–sight Multipath Phenomena," *IEEE Global Telecommunications Conference & Exhibition,* IEEE, pp. 1707–1711 (Nov. 28–Dec. 1, 1988).

Lau, W.H. et al., "Improved Prony Algorithm to Identify Multipath Components," *Electronics Letters,* IEE, vol. 23, No. 20, pp. 1059–1060 (Sep. 24, 1987).

Lesage, P. and Audoin, C., "Effect of Dead–Time on the Estimation of the Two–Sample Variance," *IEEE Transactions on Instrumentation and Measurement,* IEEE Instrumentation and Measurement Society, vol. IM–28, No. 1, pp. 6–10 (Mar. 1979).

Liechti, C.A., "Performance of Dual–gate GaAs MESFET's as Gain–Controlled Low–Noise Amplifiers and High Speed Modulators," *IEEE Transactions on Microwave Theory and Techniques,* IEEE Microwave Theory and Techniques Society, vol. MTT–23, No. 6, pp. 461–469 (Jun. 1975).

Linnenbrink, T.E. et al., "A One Gigasample Per Second Transient Recorder," *IEEE Transactions on Nuclear Science,* IEEE Nuclear and Plasma Sciences Society, vol. NS–26, No. 4, pp. 4443–4449 (Aug. 1979).

Liou, M.L., "A Tutorial on Computer–Aided Analysis of Switched–Capacitor Circuits," *Proceedings of the IEEE,* IEEE, vol. 71, No. 8, pp. 987–1005 (Aug. 1983).

Lo, P. et al., "Coherent Automatic Gain Control," *IEE Colloquium on Phase Locked Techniques,* IEE, pp. 2/1–2/6 (Mar. 26, 1980).

Lo, P. et al., "Computation of Rain Induced Scintillations on Satellite Down–Links at Microwave Frequencies," *Third International Conference on Antennas and Propagation (ICAP 83),* pp. 127–131 (Apr. 12–15, 1983).

Lo, P.S.L.O. et al., "Observations of Amplitude Scintillations on a Low–Elevation Earth–Space Path," *Electronics Letters,* IEE, vol. 20, No. 7, pp. 307–308 (Mar. 29, 1984).

Madani, K. and Aithison, C.S., "A 20 Ghz Microwave Sampler," *IEEE Transactions on Microwave Theory and Techniques,* IEEE Microwave Theory and Techniques Society, vol. 40, No. 10, pp. 1960–1963 (Oct. 1992).

Marsland, R.A. et al., "130 Ghz GaAs monolithic integrated circuit sampling head," *Appl. Phys. Lett.,* American Institute of Physics, vol. 55, No. 6, pp. 592–594 (Aug. 7, 1989).

Martin, K. and Sedra, A.S., "Switched–Capacitor Building Blocks for Adaptive Systems," *IEEE Transactions on Circuits and Systems,* IEEE Circuits and Systems Society, vol. CAS–28, No. 6, pp. 576–584 (Jun. 1981).

Marzano, F.S. and d'Auria, G., "Model–based Prediction of Amplitude Scintillation variance due to Clear–Air Tropospheric Turbulence on Earth–Satellite Microwave Links," *IEEE Transactions on Antennas and Propagation,* IEEE Antennas and Propagation Society, vol. 46, No. 10, pp. 1506–1518 (Oct. 1998).

Matricciani, E., "Prediction of fade durations due to rain in satellite communication systems," *Radio Science,* American Geophysical Union, vol. 32, No. 3, pp. 935–941 (May–Jun. 1997).

McQueen, J.G., "The Monitoring of High–Speed Waveforms," *Electronic Engineering,* Morgan Brothers Limited, vol. XXIV, No. 296, pp. 436–441 (Oct. 1952).

Merkelo, J. and Hall, R.D., "Broad–Band Thin–Film Signal Sampler," *IEEE Journal of Solid–State Circuits,* IEEE, vol. SC–7, No. 1, pp. 50–54 (Feb. 1972).

Merlo, U. et al., "Amplitude Scintillation Cycles in a Sirio Satellite–Earth Link," *Electronics Letters,* IEE, vol. 21, No. 23, pp. 1094–1096 (Nov. 7, 1985).

Morris, D., "Radio–holographic reflector measurement of the 30–m millimeter radio telescope at 22 Ghz with a cosmic signal source," *Astronomy and Astrophysics,* Springer–Verlag, vol. 203, No. 2, pp. 399–406 (Sep. (II) 1988).

Moulsley, T.J. et al., "The efficient acquisition and processing of propagation statistics," *Journal of the Institution of Electronic and Radio Engineers,* IERE, vol. 55, No. 3, pp. 97–103 (Mar. 1985).

Ndzi, D. et al., "Wide–Band Statistical Characterization of an Over–the–Sea Experimental Transhorizon Link," *IEE Colloquium on Radio Communications at Microwave and Millimetre Wave Frequencies,* IEE, pp. 1/1–1/6 (Dec. 16, 1996).

Ndzi, D. et al., "Wideband Statistics of Signal Levels and Doppler Spread on an Over–The–Sea Transhorizon Link," *IEE Colloquium on Propagation Characteristics and Related System Techniques for Beyond Line–of–Sight Radio,* IEE, pp. 9/1–9/6 (Nov. 24, 1997).

"New zero IF chipset from Philips," *Electronic Engineering,* United News & Media, vol. 67, No. 825, p. 10 (Sep. 1995).

Ohara, H. et al., "First monolithic PCM filter cuts cost of telecomm systems," *Electronic Design,* Hayden Publishing Company, vol. 27, No. 8, pp. 130–135 (Apr. 12, 1979).

Oppenheim, A.V. et al., *Signals and Systems,* Prentice–Hall, pp. 527–531 and 561–562 (1983).

Ortgies, G., "Experimental Parameters Affecting Amplitude Scintillation Measurements on Satellite Links," *Electronics Letters,* IEE, vol. 21, No. 17, pp. 771–772 (Aug. 15, 1985).

Pärssinen et al., "A 2–GHz Subharmonic Sampler for Signal Downconversion," *IEEE Transactions on Microwave Theory and Techniques,* IEEE, vol. 45, No. 12, 7 pages (Dec. 1997).

Peeters, G. et al., "Evaluation of Statistical Models for Clear–Air Scintillation Prediction Using Olympus Satellite Measurements," *International Journal of Satellite Communications,* John Wiley and Sons, vol. 15, No. 2, pp. 73–88 (Mar.–Apr. 1997).

Perrey, A.G. and Schoenwetter, H.K., *NBS Technical Note 1121: A Schottky Diode Bridge Sampling Gate,* U.S. Dept. of Commerce, pp. 1–14 (May 1980).

Poulton, K. et al., "A 1–Ghz 6–bit ADC System," *IEEE Journal of Solid–State Circuits,* IEEE, vol. SC–22, No. 6, pp. 962–969 (Dec. 1987).

Press Release, "Parkervision, Inc. Announces Fiscal 1993 Results," Lippert/Heilshorn and Associates, 2 Pages (Apr. 6, 1994).

Press Release, "Parkervision, Inc. Announces the Appointment of Michael Baker to the New Position of National Sales Manager," Lippert/Heilshorn and Associates, 1 Page (Apr. 7, 1994).

Press Release, "Parkervision's Cameraman Well–Received By Distance Learning Market," Lippert/Heilshorn and Associates, 2 Pages (Apr. 8, 1994).

Press Release, "Parkervision, Inc. Announces First Quarter Financial Results," Lippert/Heilshorn and Associates, 2 Pages (Apr. 26, 1994).

Press Release, "Parkervision, Inc. Announces The Retirement of William H. Fletcher, Chief Financial Officer," Lippert/Heilshorn and Associates, 1 Page (May 11, 1994).

Press Release, "Parkervision, Inc. Announces New Cameraman System II™ At Infocomm Trade Show," Lippert/Heilshorn and Associates, 3 Pages (Jun. 9, 1994).

Press Release, "Parkervision, Inc. Announces Appointments to its National Sales Force," Lippert/Heilshorn and Associates, 2 Pages (Jun. 17, 1994).

Press Release, "Parkervision, Inc. Announces Second Quarter and Six Months Financial Results," Lippert/Heilshorn and Associates, 3 Pages (Aug. 9, 1994).

Press Release, "Parkervision, Inc. Announces Third Quarter and Nine Months Financial Results," Lippert/Heilshorn and Associates, 3 Pages (Oct. 28, 1994).

Press Release, "Parkervision, Inc. Announces First Significant Dealer Sale of Its *Cameraman®* System II," Lippert/Heilshorn and Associates, 2 Pages (Nov. 7, 1994).

Press Release, "Parkervision, Inc. Announces Fourth Quarter and Year End Results," Lippert/Heilshorn and Associates, 2 Pages (Mar. 1, 1995).

Press Release, "Parkervision, Inc. Announces Joint Product Developments With VTEL," Lippert/Heilshorn and Associates, 2 Pages (Mar. 21, 1995).

Press Release, "Parkervision, Inc. Announces First Quarter Financial Results," Lippert/Heilshorn and Associates, 3 Pages (Apr. 28, 1995).

Press Release, "Parkervision Wins Top 100 Product Districts' Choice Award," Parkervision Marketing and Manufacturing Headquarters, 1 Page (Jun. 29, 1995).

Press Release, "Parkervision National Sales Manager Next President of USDLA," Parkervision Marketing and Manufacturing Headquarters, 1 Page (Jul. 6, 1995).

Press Release, "Parkervision Granted New Patent," Parkervision Marketing and Manufacturing Headquarters, 1 Page (Jul. 21, 1995).

Press Release, "Parkervision's Camerman Personal Locator Camera System Wins Telecon XV Award," Parkervision Marketing and Manufacturing Headquarters, 2 Pages (Nov. 1, 1995).

Press Release, "Parkervision, Inc. Announces Purchase Commitment From VTEL Corporation," Parkervision Marketing and Manufacturing Headquarters, 1 Page (Feb. 26, 1996).

Press Release, "ParkerVision, Inc. Announces Fourth Quarter and Year End Results," Parkervision Marketing and Manufacturing Headquarters, 2 Pages (Feb. 27, 1996).

Press Release, "ParkerVision, Inc. Expands its Product Line," Parkervision Marketing and Manufacturing Headquarters, 2 Pages (Mar. 7, 1996).

Press Release, "ParkerVision, Files Patents for its Research of Wireless Technology," Parkervision Marketing and Manufacturing Headquarters, 1 Page (Mar. 28, 1996).

Press Release, "Parkervision, Inc. Announces First Significant Sale of Its Cameraman® Three–Chip System," Parkervision Marketing and Manufacturing Headquarters, 2 Pages (Apr. 12, 1996).

Press Release, "Parkervision, Inc. Introduces New Product Line For Studio Production Market," Parkervision Marketing and Manufacturing Headquarters, 2 Pages (Apr. 15, 1996).

Press Release, "Parkervision, Inc. Announces Private Placement of 800,000 Shares," Parkervision Marketing and Manufacturing Headquarters, 1 Page (Apr. 15, 1996).

Press Release, "Parkervision, Inc. Announces First Quarter Financial Results," Parkervision Marketing and Manufacturing Headquarters, 3 Pages (Apr. 30, 1996).

Press Release, "ParkerVision's New Studio Product Wins Award," Parkervision Marketing and Manufacturing Headquarters, 2 Pages (Jun. 5, 1996).

Press Release, "Parkervision, Inc. Announces Second Quarter and Six Months Financial Results," Parkervision Marketing and Manufacturing Headquarters, 2 Pages (Jul. 31, 1995).

Press Release, "Parkervision, Inc. Expands Its Cameraman System II Product Line," Parkervision Marketing and Manufacturing Headquarters, 2 Pages (Sep. 22, 1995).

Press Release, "Parkervision Announces New Camera Control Technology," Parkervision Marketing and Manufacturing Headquarters, 2 Pages (Oct. 25, 1995).

Press Release, "Parkervision, Inc. Announces Completion of VTEL/Parkervision Joint Product Line," Parkervision Marketing and Manufacturing Headquarters, 2 Pages (Oct. 30, 1995).

Press Release, "Parkervision, Inc. Announces Third Quarter and Nine Months Financial Results," Parkervision Marketing and Manufacturing Headquarters, 2 Pages (Oct. 30, 1995).

Press Release, "Parkervision, Inc. Announces Second Quarter and Six Months Financial Results," Parkervision Marketing and Manufacturing Headquarters, 3 Pages (Aug. 1, 1996).

Press Release, "Parkervision, Inc. Announces Third Quarter and Nine Months Financial Results," Parkervision Marketing and Manufacturing Headquarters, 2 Pages (Oct. 29, 1996).

Press Release, "PictureTel and ParkerVision Sign Reseller Agreement," Parkervision Marketing and Manufacturing Headquarters, 2 Pages (Oct. 30, 1996).

Press Release, "CLI and ParkerVision Bring Enhanced Ease–of–Use to Videoconferencing," CLI/Parkervision, 2 Pages (Jan. 20, 1997).

Press Release, "Parkervision, Inc. Announces Fourth Quarter and Year End Results," Parkervision Marketing and Manufacturing Headquarters, 3 Pages (Feb. 27, 1997).

Press Release, "Parkervision, Inc. Announces First Quarter Financial Results," Parkervision Marketing and Manufacturing Headquarters, 3 Pages (Apr. 29, 1997).

Press Release, "NEC and Parkervision Make Distance Learning Closer," NEC America, 2 Pages (Jun. 18, 1997).

Press Release, "Parkervision Supplies JPL with Robotic Cameras, Cameraman Shot Director for Mars Mission," Parkervision Marketing and Manufacturing Headquarters, 2 pages (Jul. 8, 1997).

Press Release, "ParkerVision and IBM Join Forces to Create Wireless Computer Peripherals," Parkervision Marketing and Manufacturing Headquarters, 2 Pages (Jul. 23, 1997).

Press Release, "ParkerVision, Inc. Announces Second Quarter and Six Months Financial Results," Parkervision Marketing and Manufacturing Headquarters, 3 Pages (Jul. 31, 1997).

Press Release, "Parkervision, Inc. Announces Private Placement of 990,000 Shares," Parkervision Marketing and Manufacturing Headquarters, 2 Pages (Sep. 8, 1997).

Press Release, "Wal–Mart Chooses Parkervision for Broadcast Production," Parkervision Marketing and Manufacturing Headquarters, 2 Pages (Oct. 24, 1997).

Press Release, "Parkervision, Inc. Announces Third Quarter Financial Results," Parkervision Marketing and Manufacturing Headquarters, 3 Pages (Oct. 30, 1997).

Press Release, "ParkerVision Announces Breakthrough in Wireless Radio Frequency Technology," Parkervision Marketing and Manufacturing Headquarters, 3 Pages (Dec. 10, 1997).

Press Release, "Parkervision, Inc. Announces the Appointment of Joseph F. Skovron to the Position of Vice President, Licensing—Wireless Technologies," Parkervision Marketing and Manufacturing Headquarters, 2 Pages (Jan. 9, 1998).

Press Release, "Parkervision Announces Existing Agreement with IBM Terminates—Company Continues with Strategic Focus Announced in December," Parkervision Marketing and Manufacturing Headquarters, 2 Pages (Jan. 27, 1998).

Press Release, "Laboratory Tests Verify Parkervision Wireless Technology," Parkervision Marketing and Manufacturing Headquarters, 2 Pages (Mar. 3, 1998).

Press Release, "Parkervision, Inc. Announces Fourth Quarter and Year End Financial Results," Parkervision Marketing and Manufacturing Headquarters, 3 Pages (Mar. 5, 1998).

Press Release, "Parkervision Awarded Editors' Pick of Show for NAB 98," Parkervision Marketing and Manufacturing Headquarters, 2 Pages (Apr. 15, 1998).

Press Release, "Parkervision, Announces First Quarter Financial Results," Parkervision Marketing and Manufacturing Headquarters, 3 Pages (May 4, 1998).

Press Release, "Parkervision 'DIRECT2DATA' Introduced in Response to Market Demand," Parkervision Marketing and Manufacturing Headquarters, 3 pages (Jul. 9, 1998).

Press Release, "Parkervision Expands Senior Management Team," Parkervision Marketing and Manufacturing Headquarters, 2 Pages (Jul. 29, 1998).

Press Release, "Parkervision Announces Second Quarter and Six Month Financial Results," Parkervision Marketing and Manufacturing Headquarters, 4 Pages (Jul. 30, 1998).

Press Release, "Parkervision Announces Third Quarter and Nine Month Financial Results," Parkervision Marketing and Manufacturing Headquarters, 3 Pages (Oct. 30, 1998).

Press Release, "Questar Infocomm, Inc. Invests $5 Million in Parkervision Common Stock," Parkervision Marketing and Manufacturing Headquarters, 3 Pages (Dec. 2, 1998).

Press Release, "Parkervision Adds Two New Directors," Parkervision Marketing and Manufacturing Headquarters, 2 Pages (Mar. 5, 1999).

Press Release, "Parkervision Announces Fourth Quarter and Year End Financial Results," Parkervision Marketing and Manufacturing Headquarters, 3 Pages (Mar. 5, 1999).

Press Release, "Joint Marketing Agreement Offers New Automated Production Solution," Parkervision Marketing and Manufacturing Headquarters, 2 Pages (Apr. 13, 1999).

"Project COST 205: Scintillations in Earth–satellite links," *Alta Frequenza: Scientific Review in Electronics,* AEI, vol. LIV, No. 3, pp. 209–211 (May–Jun., 1985).

Razavi, B., *RF Microelectronics,* Prentice–Hall, pp. 147–149 (1998).

Reeves R.J.D., "The Recording and Collocation of Waveforms (Part 1)," *Electronic Engineering,* Morgan Brothers Limited, vol. 31, No. 373, pp. 130–137 (Mar. 1959).

Reeves. R.J.D., "The Recording and Collocation of Waveforms (Part 2)," *Electronic Engineering,* Morgan Brothers Limited, vol. 31, No. 374, pp. 204–212 (Apr. 1959).

Rein, H.M. and Zahn, M., "Subnanosecond–Pulse Generator with Variable Pulsewidth Using Avalanche Transistors," *Electronics Letters,* IEE, vol. 11, No. 1, pp. 21–23 (Jan. 9, 1975).

Riad, S.M. and Nahman, N.S., "Modeling of the Feed–through Wideband (DC to 12.4 Ghz) Sampling–Head," *IEEE MTT–S International Microwave Symposium Digest,* IEEE, pp. 267–269 (Jun. 27–29, 1978).

Rizzoli, V. et al., "Computer–Aided Noise Analysis of MESFET and HEMT Mixers," *IEEE Transactions on Microwave Theory and Techniques,* IEEE, vol. 37, No. 9, pp. 1401–1410 (Sep. 1989).

Rowe, H.E., *Signals and Noise in Communication Systems,* D. Van Nostrand Company, Inc., Princeton, New Jersey including, for example, Chapter V, Pulse Modulation Systems (1965).

Rücker, F. and Dintelmann, F., "Effect of Antenna Size on OTS Signal Scintillations and Their Seasonal Dependence," *Electronics Letters,* IEE, vol. 19, No. 24, pp. 1032–1034 (Nov. 24, 1983).

Russell, R. and Hoare, L., "Millimeter Wave Phase Locked Oscillators," *Military Microwaves '78 Conference Proceedings,* Microwave Exhibitions and Publishers, pp. 238–242 (Oct. 25–27, 1978).

Sabel, L.P., "A DSP Implementation of a Robust Flexible Receiver/Demultiplexer for Broadcast Data Satellite Communications," *The Institution of Engineers Australia Communications Conference,* Institution of Engineers, Australia, pp. 218–223 (Oct. 16–18, 1990).

Salous, S., "IF digital generation of FMCW waveforms for wideband channel characterization," *IEE Proceedings–I,* IEE, vol. 139, No. 3, pp. 281–288 (Jun. 1992).

"Sampling Loops Lock Sources to 23 Ghz," *Microwaves & RF,* Penton Publishing, p. 212 (Sep. 1990).

Sasikumar, M. et al., "Active Compensation in the Switched–Capacitor Biquad," *Proceedings of the IEEE,* IEEE, vol. 71, No. 8, pp. 1008–1009 (Aug. 1983).

Saul, P.H., "A GaAs MESFET Sample and Hold Switch," *Fifth European Solid State Circuits Conference–ESSCIRC 79,* IEE, pp. 5–7 (1979).

Shen, D.H. et al., "A 900–MHZ RF Front–End with Integrated Discrete–Time Filtering," *IEEE Journal of Solid State Circuits,* IEEE Solid–State Circuits Council, vol. 31, No. 12, pp. 1945–1954 (Dec. 1996).

Shen, X.D. and Vilar, E., "Anomalous transhorizon propagation and meterological processes of a multilink path," *Radio Science,* American Geophysical Union, vol. 30, No. 5, pp. 1467–1479 (Sep.–Oct. 1995).

Shen X. and Tawfik, A.N., "Dynamic Behaviour of Radio Channels Due to Trans–Horizon Propagation Mechanisms," *Electronics Letters,* IEE, vol. 29, No. 17, pp. 1582–1583 (Aug. 19, 1993).

Shen, X. et al., "Modeling Enhanced Spherical Diffraction and Troposcattering on a Transhorizon Path with aid of the parabolic Equation and Ray Tracing Methods," *IEE Colloquium on Common modeling techniqes for electromagnetic wave and acoustic wave propagation,* IEE, pp. 4/1–4/7 (Mar. 8, 1996).

Shen, X. and Vilar, E., "Path loss statistics and mechanisms of transhorizon propagation over a sea path," *Electronics Letters,* IEE, vol. 32, No. 3, pp. 259–261 (Feb. 1, 1996).

Shen, D. et al., "A 900 MHZ Integrated Discrete–Time Filtering RF Front–End," *IEEE International Solid State Circuits Conference,* IEEE, vol. 39, pp. 54–55 and 417 (Feb. 1996).

Spillard, C. et al., "X–Band Tropospheric Transhorizon Propagation Under Differing Meteorological Conditions," *Sixth International Conference on Antennas and Propagation (ICAP 89) Part 2: Propagation,* IEE, pp. 451–455 (Apr. 4–7, 1989).

Vilar, E. and Senin, S., "Propagation phase noise identified using 40 Ghz satellite downlink," *Electronics Letters,* IEE, vol. 33, No. 22, pp. 1901–1902 (Oct. 23, 1997).

Vilar, E. et al., "Scattering and Extinction: Dependence Upon Raindrop Size Distribution in Temperate (Barcelona) and Tropical (Belem) Regions," *Tenth International Conference on Antennas and Propagation,* Electronics Divison of the IEE, pp. 2.230–2.233 (Apr. 14–17, 1997).

Vilar, E. and Haddon, J., "Scintillation Modeling and Measurement—A Tool for Remote–Sensing Slant Paths," *AGARD Conference Proceedings No. 332: Propagation Aspects of Frequency Sharing, Interference And System Diversity,* AGARD, pp. 27–1–27–13 (Oct. 18–22, 1982).

Vilar, E., "Some Limitation on Digital Transmission through Turbulent Atmosphere," *International Conference on Satellite Communication Systems Technology,* Electronics Division of the IEE, pp. 169–187 (Apr. 7–10, 1975).

Vilar, E. and Matthews, P.A., "Summary of Scintillation Observations in a 36 Ghz Link Across London," *International Conference on Antennas and Propagation Part 2: Propagation,* IEE, pp. 36–40 (Nov. 28–30, 1978).

Stafford, K.R. et al., "A Complete Monolithic Sample/Hold Amplifier," *IEEE Journal of Solid–State Circuits,* IEEE, vol. SC–9, No. 6, pp. 381–387 (Dec. 1974).

Staruk, W. Jr. et al., "Pusing HF Data Rates," *Defense Electronics,* EW Communications, vol. 17, No. 5, pp. 211, 213, 215, 217, 220 and 222 (May 1985).

Stephenson, A.G., "Digitizing multiple RF signals requires an optimum sampling rate," *Electronics,* pp. 106–110 (Mar. 27, 1972).

Sugarman, R., "Sampling Oscilloscope for Statistically Varying Pulses," *The Review of Scientific Instruments,* American Institute of Physics, vol. 28, No. 11, pp. 933–938 (Nov. 1957).

Sylvain, M., "Experimental probing of multipath microwave channels," *Radio Science,* American Geophysical Union, vol. 24, No. 2, pp. 160–178 (Mar.–Apr. 1989).

Takano, T., "Novel GaAs Pet Phase Detector Operable To Ka Band," *IEEE MT–S Digest,* IEEE, pp. 381–383 (1984).

Tan, M.A., "Biquadratic Transconductance Switched–Capacitor Filters," *IEEE Transactions on Circuits and Systems–I: Fundamental Theory and Applications,* IEEE Circuits and Systems Society, vol. 40, No. 4, pp. 272–275 (Apr. 1993).

Tanaka, K. et al., "Single Chip Multisystem AM Stereo Decoder IC," *IEEE Transactions on Consumer Electronics,* IEEE Consumer Electronics Society, vol. CE–32, No. 3, pp. 482–496 (Aug. 1986).

Tawfik, A.N., "Amplitude Duration and Predictability of Long Hop Trans–Horizon X–band Signals Over the Sea," *Electronics Letters,* IEE, vol. 28, No. 6, pp. 571–572 (Mar. 12, 1992).

Tawfik, A.N. and Vilar, E., "Correlation of Transhorizon Signal Level Strength with Localized Surface Meterological Parameters," *Eight International Conference on Antennas and Propagation,* Electronics Division of the IEE, pp. 335–339 (Mar. 30–Apr. 2, 1993).

Tawfik, A.N. and Vilar, E., "Dynamic Structure of a Transhorizon Signal at X–band Over a Sea Path," *Sixth International Conference on Antennas and Propagation (ICAP 89) Part 2: Propagation,* IEE, pp. 446–450 (Apr. 4–7, 1989).

Tawfik, A.N. and Vilar, E., "Statistics of Duration and Intensity of Path Loss in a Microwave Transhorizon Sea–Path," *Electronics Letters,* IEE, vol. 26, No. 7, pp. 474–476 (Mar. 29, 1990).

Tawfik, A.N. and Vilar, E., "X–Band Transhorizon Measurements of CW Transmissions Over the Sea–Part 1: Path Loss, Duration of Events, and Their Modeling," *IEEE Transactions on Antennas and Propagation,* IEEE Antennas and Propagation Society, vol. 41, No. 11, pp. 1491–1500 (Nov. 1993).

Temes, G.C. and Tsividis, T., "The Special Section on Switched–Capacitor Circuits," *Proceedings of the IEEE,* IEEE, vol. 71, No. 8, pp. 915–916 (Aug. 1983).

Thomas, G.B., *Calculus and Analytic Geometry,* Third Edition, Addison–Wesley Publishing, pp. 119–133 (1960).

Tomassetti, Q., "An Unusual Microwave Mixer," *16th European Microwave Conference,* Microwave Exhibitions and Publishers, pp. 754–759 (Sep. 8–12, 1986).

Tortoli, P. et al., "Bidirectional Doppler Signal Analysis Based on a Single RF Sampling Channel," *IEEE Transactions on Ultrasonics, Ferroelectrics, and Frequency Control,* IEEE Ultrasonics, Ferroelectrics, and Frequency Control Society, vol. 41, No. 1, pp. 1–3 (Jan. 1984).

Tsividis, Y. and Antognetti, P. (Ed.), *Design of MOS VLSI Circuits for Telecommunications,* Prentice–Hall, p. 304 (1985).

Tsividis, Y., "Principles of Operation and Analysis of Switched–Capacitor Circuits," *Proceedings of the IEEE,* IEEE, vol. 71, No. 8, pp. 926–940 (Aug. 1983).

Tsurumi, H. and Maeda, T., "Design Study on a Direct Conversion Receiver Front–End for 280 MHZ, 900 MHZ, and 2.6 Ghz Band Radio Communications Systems," *41st IEEE Vehicular Technology Conference,* IEEE Vehicular Technology Society, pp. 457–462 (May. 19–22, 1991).

Valdmanis, J.A. et al., "Picosecond and Subpicosend Optoelectronics for Measurements of Future High Speed Electronic Devices," *IEDM Technical Digest,* IEEE pp. 597–600 (Dec. 5–7, 1983).

van de Kamp, M.M.J.L., "Asymmetric signal level distribution due to tropospheric scintillation," *Electronics Letters,* IEE, vol. 34, No. 11, pp. 1145–1146 (May 28, 1998).

Vasseur, H. and Vanhoenacker, D., "Characterization of tropospheric turbulent layers from radiosonde data," *Electronics Letters,* IEE, vol. 34, No. 4, pp. 318–319 (Feb. 19, 1998).

Verdone, R., "Outage Probability Analysis for Short–Range Communication Systems at 60 Ghz in ATT Urban Environments," *IEEE Transactions on Vehicular Technology,* IEEE Vehicular Technology Society, vol. 46, No. 4, pp. 1027–1039 (Nov. 1997).

Vierira–Ribeiro, S.A., *Single–IF DECT Receiver Architecture using a Quadrature Sub–Sampling Band–Pass Sigma–Delta Modulator,* Thesis for Degree of Master's of Engineering, Carleton University, UMI Dissertation Services, pp. 1–180 (Apr. 1995).

Vilar, E. et al., "A Comprehensive/Selective MM–Wave Satellite Downlink Experiment on Fade Dynamics," *Tenth International Conference on Antennas and Propagation,* Electronics Division of the IEE, pp. 2.98–2.101 (Apr. 14–17, 1997).

Vilar, E. et al., "A System to Measure LOS Atmospheric Transmittance at 19 Ghz," *AGARD Conference Proceedings No. 346: Characteristics of the Lower Atmosphere Influencing Radio Wave Propagation,* AGARD, pp. 8–1–8–16 (Oct. 4–7, 1983).

Vilar, E. and Smith, H., "A Theoretical and Experimental Study of Angular Scintillations in Earth Space Paths," *IEEE Transactions on Antennas and Propagation,* IEEE, vol. AP–34, No. 1, pp. 2–10 (Jan. 1986).

Vilar, E. et al., "A Wide Band Transhorizon Experiment at 11.6 Ghz," *Eighth International Conference on Antennas and Propagation,* Electronics Division of the IEE, pp. 441–445 (Mar. 30–Apr. 2, 1993).

Vilar, E. and Matthews, P.A., "Amplitude Dependence of Frequency in Oscillators," *Electronics Letters,* IEE, vol. 8, No. 20, pp. 509–511 (Oct. 5, 1972).

Vilar, E. et al., "An experimental mm–wave receiver system for measuring phase noise due to atmospheric turbulence," *Proceedings of the 25$^{th}$ European Microwave Conference,* Nexus House, pp. 114–119 (1995).

Vilar, E. and Burgueño, A., "Analysis and Modeling of Time Intervals Between Rain Rate Exceedances in the Context of Fade Dynamics," *IEEE Transactions on Communications,* IEEE Communications Society, vol. 39, No. 9, pp. 1306–1312 (Sep. 1991).

Vilar, E. et al., "Angle of Arrival Fluctuations in High and Low Elevation Earth Space Paths," *Fourth International Conference on Antennas and Propagation (ICAP 85),* Electronics Division of the IEE, pp. 83–88 (Apr. 16–19, 1985).

Vilar, E., "Antennas and Propagation: A Telecommunications Systems Subject," *Electronics Division Colloquium on Teaching Antennas and Propagation to Undergraduates,* IEE, pp. 7/1–7/6 (Mar. 8, 1988).

Vilar, E. et al., "CERS*. Millimetre–Wave Beacon Package and Related Payload Doppler Correction Strategies," *Electronics Division Colloquium on CERS–Communications Engineering Research Satellite,* IEE, pp. 10/1–10/10 (Apr. 10, 1984).

Vilar, E. and Moulsley, T.J., "Comment and Reply: Probability Density Function of Amplitude Scintillations," *Electronics Letters,* IEE, vol. 21, No. 14, pp. 620–622 (Jul. 4, 1985).

Vilar, E. et al., "Comparison of Rainfall Rate Duration Distributions for ILE–IFE and Barcelona," *Electronics Letters,* IEE, vol. 28, No. 20, pp. 1922–1924 (Sep. 24, 1992).

Vilar, E., "Depolarization and Field Transmittances in Indoor Communications," *Electronics Letters,* IEE, vol. 27, No. 9, pp. 732–733 (Apr. 25, 1991).

Vilar, E. and Larsen, J.R., "Elevation Dependence of Amplitude Scintillations on Low Elevation Earth Space Paths," *Sixth International Conference on Antennas and Propagation (ICAP 89 ) Part 2: Propagation,* IEE, pp. 150–154 (Apr. 4–7, 1989).

Vilar, E. et al., "Experimental System and Measurements of Transhorizon Signal Levels at 11 Ghz," *18$^{th}$ European Microwave Conference,* Microwave Exhibitions and Publishers Ltd., pp. 429–435 (Sep. 12–15, 1988).

Vilar, E. and Matthews, P.A., "Importance of Amplitude Scintillations in Millimetric Radio Links," *Proceedings of the 4$^{th}$ European Microwave Conference,* Microwave Exhibitions and Publishers, pp. 202–206 (Sep. 10–13, 1974).

Vilar, E. and Haddon, J., "Measurement and Modeling of Scintillation Intensity to Estimate Turbulence Parameters in an Earth–Space Path," *IEEE Transactions on Antennas and Propagation,* IEEE Antennas and Propagation Society, vol. AP–32, No. 4, pp. 340–346 (Apr. 1984).

Vilar, E. and Matthews, P.A., "Measurement of Phase Fluctuations on Millimetric Radiowave Propagation," *Electronics Letters,* IEE, vol. 7, No. 18, pp. 566–568 (Sep. 9, 1971).

Vilar, E. and Wan, K.W., "Narrow and Wide Band Estimates of Field Strength for Indoor Communications in the Millimetre Band," *Electronics Division Colloquium on Radiocommunications in the Range 30–60 Ghz,* IEE, pp. 5/1–5/8 (Jan. 17, 1991).

Vilar, E. and Faulkner, N.D., "Phase Noise and Frequency Stability Measurements, Numerical Techniques and Limitations," *Electronics Division Colloquium on Low Noise Oscillators and Synthesizer,* IEE, 5 pages (Jan. 23, 1986).

Vilar, E. et al., "Wideband Characterization of Scattering Channels," *Tenth International Conference on Antennas and Propagation,* Electronics Division of the IEE, pp. 2.323–2.358 (Apr. 14–17, 1997).

Vollmer, A., "Complete GPS Receiver Fits on Two Chips," *Electronic Design,* Penton Publishing, pp. 50, 52, 54 and 56 (Jul. 6, 1998).

*Voltage and Time Resolution in Digitizing Oscilloscopes: Application Note 348,* Hewlett Packard, pp. 1–11 (Nov. 1986).

Wan, K.W. et al., "A Novel Approach to the Simultaneous Measurement of Phase and Amplitude Noises in Oscillator," *Proceedings of the 19$^{th}$ European Microwave Conference,* Microwave Exhibitions and Publishers Ltd., pp. 809–813 (Sep. 4–7, 1989).

Wan, K.W. et al., "Extended Variances and Autoregressive/Moving Average Algorithm for the Measurement and Synthesis of Oscillator Phase Noise," *Proceedings Of the 43$^{rd}$ Annual Symposium on Frequency Control,* IEEE, pp. 331–335 (1989).

Wan, K.W. et al., "Wideband Transhorizon Channel Sounder at 11 Ghz," *Electronics Division Colloquium on High Bit Rate UHF/SHF Channel Sounders—Technology and Measurement,* IEE, pp. 3/1–3/5 (Dec. 3, 1993).

Wang, H., "A 1–V Multigigaherz RF Mixer Core in 0.5–$\mu$m CMOS," *IEEE Journal of Solid–State Circuits,* IEEE Solid–State Circuits Society, vol. 33, No. 12, pp. 2265–2267 (Dec. 1998).

Watson, A.W.D. et al., "Digital Conversion and Signal Processing for High Performance Communications Receivers," *Digital Processing of Signals in Communications*, Institution of Electronic and Radio Engineers, pp. 367–373 (Apr. 22nd–26th, 1985).

Weast, R.C. et al. (Ed.), *Handbook of Mathematical Tables*, Second Edition, The Chemical Rubber Co., pp. 480–485 (1964).

Wiley, R.G., "Approximate FM Demodulation Using Zero Crossings," *IEEE Transactions on Communications*, IEEE, vol. COM–29, No. 7, pp. 1061–1065 (Jul. 1981).

Worthman, W., "Convergence . . . Again," *RF Design*, Primedia, p. 102 (Mar. 1999).

Young, I.A. and Hodges, D.A., "MOS Switched–Capacitor Analog Sampled–Data Direct–Form Recursive Filters," *IEEE Journal of Solid–State Circuits*, IEEE, vol. SC–14, No. 6, pp. 1020–1033 (Dec. 1979).

Translation of Specification and Claims of FR Patent No. 2245130, 3 pages (Apr. 18, 1975–Date of publication of application).

Fest, Jean–Pierre, "Le Convertisseur A/N Revolutionne Le Recepteur Radio," *Electronique*, JMJ (Publisher), No. 54, pp. 40–42 (Dec. 1995).

Translation of DE Patent No 35 41 031 A1, 22 pages (May 22, 1986—Date of publication of application).

Translation of EP Patent No. 0 732 803 A1, 9 pages (Sep. 18, 1996—Date of publication of application).*

Fest, Jean–Pierre, "The A/D Converter Revolutionizes the Radio Receiver," *Electronique*, JMJ (Publisher), No. 54, 3 pages (Dec. 1995). (Translation of Doc. AQ50).*

Translation of German Patent No. DE 197 35 798 C1, 8 pages (Jul. 16, 1998—Date of publication of application).*

Miki, S. and Nagahama, R., *Modulation System II*, Common Edition 7, Kyoritsu Publishing Co., Ltd., pp. 146–154 (Apr. 30, 1956).*

Miki, S. and Nagahama, R., *Modulation System II*, Common Edition 7, Kyoritsu Publishing Co., Ltd., pp. 146–149 (Apr. 30, 1956). (Partial Translation of Doc. AQ51).*

Rabiner, L.R. and Gold, B., *Theory And Application Of Digital Signal Processing*, Prentice–Hall, Inc. pp. v–xii and 40–46 (1975).

English–language Abstract of Japanese Patent Publication No. 08–032556, from http://www1.ipdl.jpo.go.jp, 2 Pages (Feb. 2, 1996—Date of publication of application).

English–language Abstract of Japanese Patent Publication No. 08–139524, from http://www1.ipdl.jpo.go.jp, 2 Pages (May 31, 1996—Date of publication of application).

English–language Abstract of Japanese Patent Publication No. 59–144249, from http://www1.ipdl.jpo.go.jp, 2 Pages (Aug. 18, 1984—Date of publication of application).

English–language Abstract of Japanese Patent Publication No. 63–054002, from http://www1.ipdl.jpo.go.jp, 2 Pages (Mar. 8, 1988—Date of publication of application).

English–language Abstract of Japanese Patent Publication No. 06–237276, from http://www1.ipdl.jpo.go.jp, 2 Pages (Aug. 23, 1994—Date of publication of application).

English–language Abstract of Japanese Patent Publication No. 08–023359, from http://www1.ipdl.jpo.go.jp, 2 Pages (Jan. 23, 1996—Date of publication of application).

Translation of Japanese Patent Publication No. 47–2314, 7 pages (Feb. 4, 1972–Date of publication of application).

Partial Translation of Japanese Patent Publication No. 58–7903, 3 pages (Jan. 17, 1983–Date of publication of application).

English–language Abstract of Japanese Patent Publication No. 58–133004, from http://www1.ipdl.jpo.go.jp, 2 Pages (Aug. 8, 1993—Date publication of application).

English–language Abstract of Japanese Patent Publication No. 60–058705, from http://www1.ipdl.jpo.go.jp, 2 Pages (Apr. 4, 1985—Date of publication of application).

English–language Abstract of Japanese Patent Publication No. 04–123614, from http://www1.ipdl.jpo.go.jp, 2 Pages (Apr. 23, 1992—Date publication of application).

English–language Abstract of Japanese Patent Publication No. 04–127601, from http://www1.ipdl.jpo.go.jp, 2 Pages (Apr. 28, 1992—Date of publication of application).

English–language Abstract of Japanese Patent Publication No. 05–175730, from http://www1.ipdl.jpo.go.jp, 2 Pages (Jul. 13, 1993—Date of publication of application).

English–language Abstract of Japanese Patent Publication No. 05–175734, from http://www1.ipdl.jpo.go.jp, 2 Pages (Jul. 13, 1993—Date of publication of application).

English–language Abstract of Japanese Patent Publication No. 07–154344, from http://www1.ipdl.jpo.go.jp, 2 Pages (Jun. 16, 1995—Date of publication of application).

English–language Abstract of Japanese Patent Publication No. 07–307620, from http://www1.ipdl.jpo.go.jp, 2 Pages (Nov. 21, 1995—Date of publication of application).

Oppenheim, A.V. and Schafer, R.W., *Digital Signal Processing*, Prentice–Hall, pp. vii–x, 6–35, 45–78, 87–121 and 136–165 (1975).

English–language Abstract of Japanese Patent Publication No. 55–066057, from http://www1.ipdl.jpo.go.jp, 2 Pages (May 19, 1980—Date of publication of application).

English–language Abstract of Japanese Patent Publication No. 63–065587, from http://www1.ipdl.jpo.go.jp, 2 Pages (Mar. 24, 1988—Date of publication of application).

English–language Abstract of Japanese Patent Publication No. 63–153691, from http://www1.ipdl.jpo.go.jp, 1 Pages (Jun. 27, 1988—Date of publication of application).

Translation of Japanese Patent Publication No. 60–130203, 3 pages (Jul. 11, 1985—Date of publication of application).

Razavi, B., "A 900–MHz/1.8–Ghz CMOS Transmitter for Dual–Band Applications," *Symposium on VLSI Circuits Digest of Technical Papers*, IEEE, pp. 128–131 (1998).

Ritter, G.M., "SDA, A New Solution for Transceivers," *16th European Microwave Conference*, Microwave Exhibitions and Publishers, pp. 729–733 (Sep. 8, 1986).

Dialog File 351 (Derwent WPI) English Language Patent Abstract for FR 2 669 787, 1 page (May 29, 1992–Date of publication of application).

Akos, D.M. et al., "Direct Bandpass Sampling of Multiple Distinct RF Signals," *IEEE Transactions on Communications*, IEEE, vol. 47, No. 7, pp. 983–988 (Jul. 1999).

Patel, M. et al., "Bandpass Sampling for Software Radio Receivers, and the Effect of Oversampling on Aperture Jitter," *VTC 2002*, IEEE, pp. 1901–1905 (2002).

English–language Abstract of Japanese Patent Publication No. 61–030821, from http://www1.ipdl.jpo.go.jp, 2 Pages (Feb. 13, 1986–Date of publication of application).

English–language Abstract of Japanese Patent Publication No. 05–327356, from http://www1.ipdl.jpo.go.jp, 2 Page (Dec. 10, 1993—Date of publication of application).

Tayloe, D., "A Low–noise, High–performance Zero IF Quadrature Detector/Preamplifier," *RF Design*, Primedia Business Magazines & Media, Inc., pp. 58, 60, 62 and 69 (Mar. 2003).

Dines, J.A.B., "Smart Pixel Optoelectronic Receiver Based on a Charge Sensitive Amplifier Design," *IEEE Journal of Selected Topics in Quantum Electronics,* IEEE, vol. 2, No. 1, pp. 117–120 (Apr. 1996).

Simoni, A. et al., "A Digital Camera for Machine Vision," *20th International Conference on Industrial Electronics, Control and Instrumentation,* IEEE, pp. 879–883 (Sep. 1994).

Stewart, R.W. and Pfann, E., "Oversampling and sigma–delta strategies for data conversion," *Electronics & Communications Engineering Journal,* IEEE, pp. 37–47 (Feb. 1998).

Rudell, J.C. et al., "A 1.9–Ghz Wide–Band IF Double Conversion CMOS Receiver for Cordless Telephone Applications," *IEEE Journal of Solid–State Circuits,* IEEE, vol. 32, No. 12, pp. 2071–2088 (Dec. 1997).

English–language Abstract of Japanese Patent Publication No. 09–036664, from http://www1ipdl.jpo.go.jp, 2 Pages (Feb. 7, 1997—Date of publication of application).

Simoni, A. et al., "A Single–Chip Optical Sensor with Analog Memory for Motion Detection," *IEEE Journal of Solid–State Circtuits,* IEEE, vol. 30, No. 7, pp. 800–806 (Jul. 1995).

English Translation of German Patent Publication No. DE 196 48 915 A1, 10 pages.

\* cited by examiner

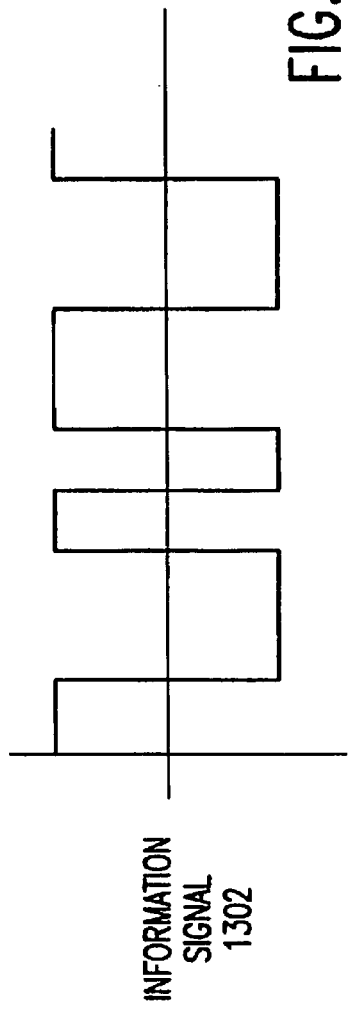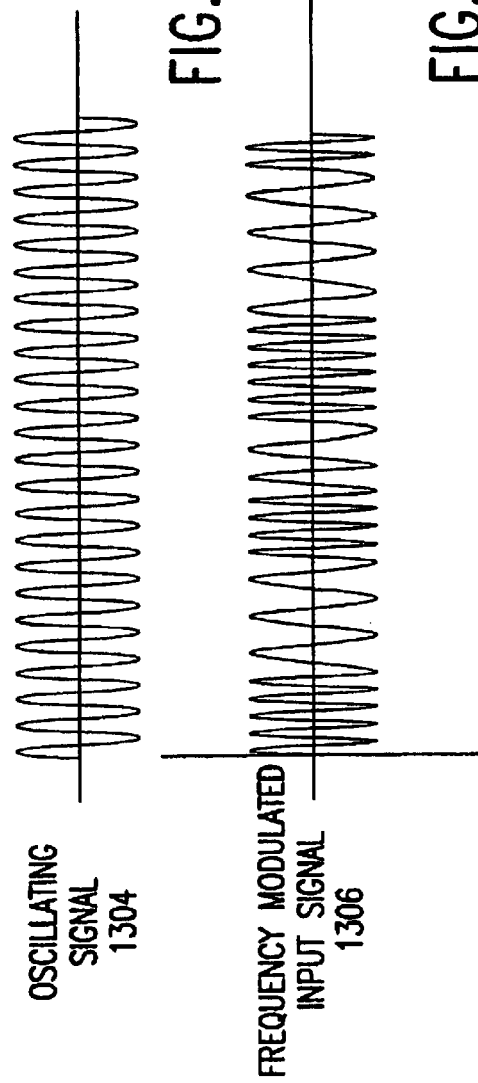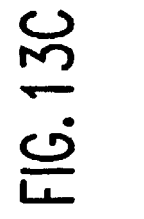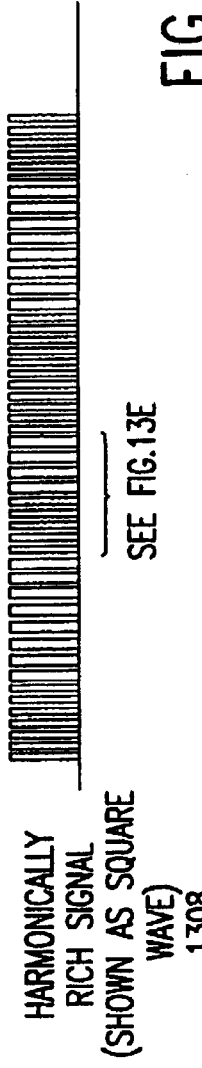
FIG. 13A — INFORMATION SIGNAL 1302
FIG. 13B — OSCILLATING SIGNAL 1304
FIG. 13C — FREQUENCY MODULATED INPUT SIGNAL 1306
FIG. 13D — HARMONICALLY RICH SIGNAL (SHOWN AS SQUARE WAVE) 1308
SEE FIG. 13E

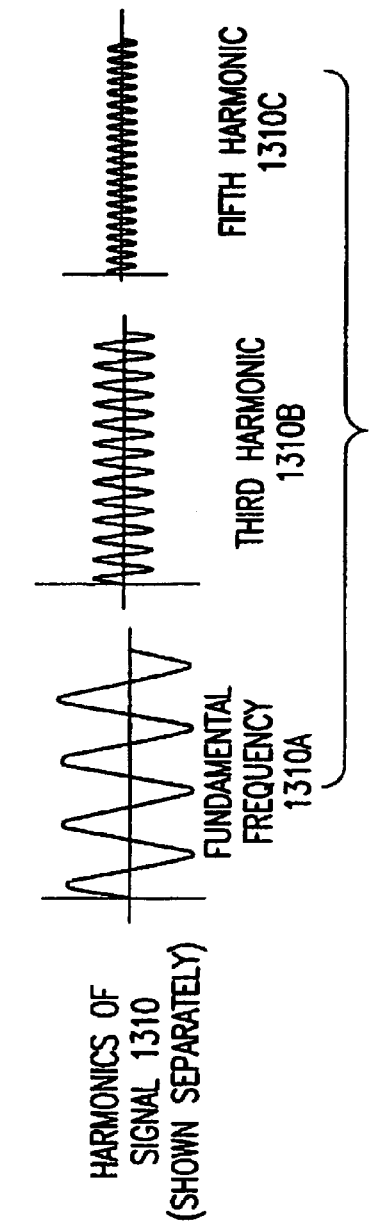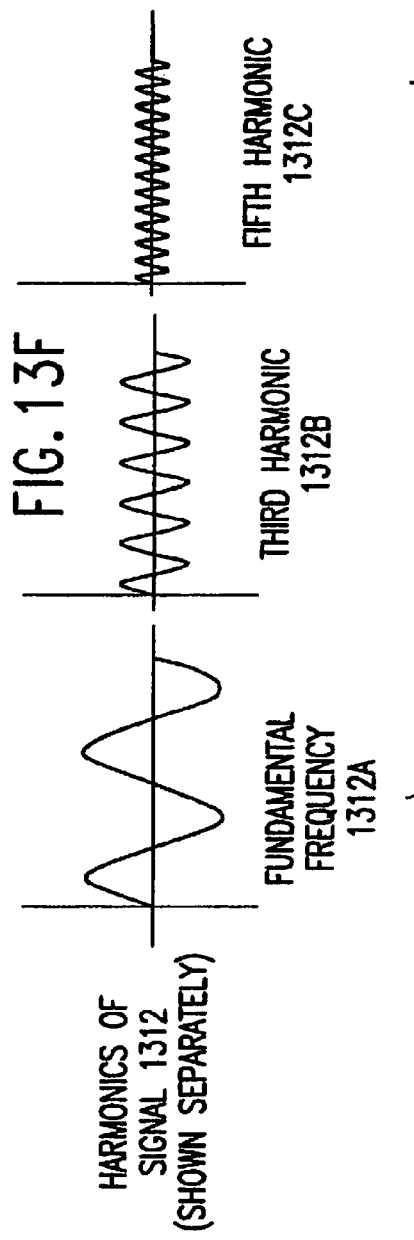

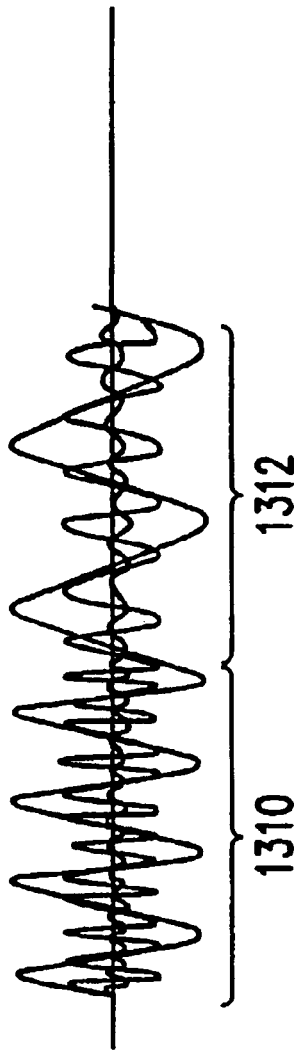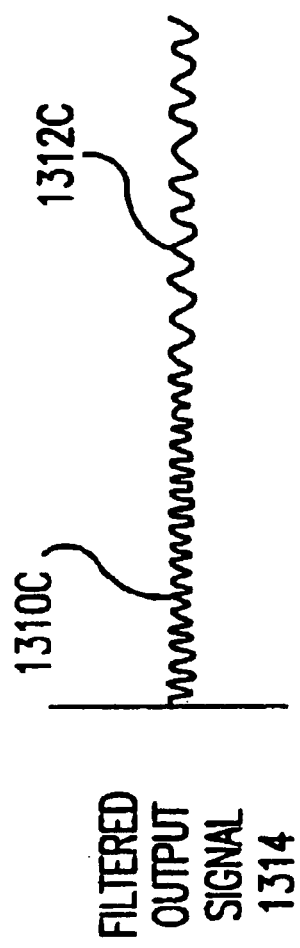

METHOD AND APPARATUS FOR DC OFFSET REMOVAL IN A RADIO FREQUENCY COMMUNICATION CHANNEL

CROSS-REFERENCE TO RELATED APPLICATIONS

This application claims the benefit of U.S. Provisional Application No. 60/384,834, filed Jun. 4, 2002, which is herein incorporated by reference in its entirety.

The following applications of common assignee are related to the present application, and are herein incorporated by reference in their entireties:

"Method and System for Down-Converting Electromagnetic Signals," Ser. No. 09/176,022, filed Oct. 21, 1998.

"Method and System for Frequency Up-Conversion," Ser. No. 09/176,154, filed Oct. 21, 1998.

"Integrated Frequency Translation And Selectivity," Ser. No. 09/175,966, filed Oct. 21, 1998.

"Method and System for Down-converting an Electromagnetic Signal, and Transforms for Same, and Aperture Relationships," Ser. No. 09/550,644, filed Apr. 14, 2000.

"Method, System, and Apparatus for Balanced Frequency Up-conversion of a Baseband Signal," Ser. No. 09/525,615, filed Mar. 14, 2000.

"DC Offset, Re-radiation, and I/Q Solutions Using Universal Frequency Translation Technology," Ser. No. 09/526,041, filed Mar. 14, 2000.

STATEMENT REGARDING FEDERALLY-SPONSORED RESEARCH AND DEVELOPMENT

Not applicable.

REFERENCE TO MICROFICHE APPENDIX/SEQUENCE LISTING/TABLE/COMPUTER PROGRAM LISTING APPENDIX (submitted on a compact disc and an incorporation-by reference of the material on the compact disc)

Not applicable.

BACKGROUND OF THE INVENTION

1. Field of the Invention

The present invention relates to frequency conversion of electromagnetic (EM) signals. More particularly, the present invention relates to reducing or eliminating DC offset voltages when down-converting a signal in a communication system.

2. Background Art

Electromagnetic (EM) information signals (baseband signals) include, but are not limited to, video baseband signals, voice baseband signals, computer baseband signals, etc. Baseband signals include analog baseband signals and digital baseband signals.

It is often beneficial to propagate EM information signals at higher frequencies. This is generally true regardless of whether the propagation medium is wire, optic fiber, space, air, liquid, etc. To enhance efficiency and practicality, such as improved ability to radiate and added ability for multiple channels of baseband signals, up-conversion to a higher frequency is utilized. Conventional up-conversion processes modulate higher frequency carrier signals with baseband signals. Modulation refers to a variety of techniques for impressing information from the baseband signals onto the higher frequency carrier signals. The resultant signals are referred to herein as modulated carrier signals. For example, the amplitude of an AM carrier signal varies in relation to changes in the baseband signal, the frequency of an FM carrier signal varies in relation to changes in the baseband signal, and the phase of a PM carrier signal varies in relation to changes in the baseband signal.

In order to process the information that was in the baseband signal, the information must be extracted, or demodulated, from the modulated carrier signal. However, because conventional signal processing technology is limited in operational speed, conventional signal processing technology cannot easily demodulate a baseband signal from higher frequency modulated carrier signal directly. Instead, higher frequency modulated carrier signals must be down-converted to an intermediate frequency (IF), from where a conventional demodulator can demodulate the baseband signal.

Conventional down-converters include electrical components whose properties are frequency dependent. As a result, conventional down-converters are designed around specific frequencies or frequency ranges and do not work well outside their designed frequency range.

Typically, down-converters are included in receiver channels that include amplifiers and/or filters. When a received modulated carrier signal is relatively weak, as in, for example, a radio receiver, conventional down-converters will include additional amplifiers in the receive signal path. These amplifiers, down-converters, and other components in a receiver channel create unwanted DC offset voltages. Any DC offset in the receiver channel has the effect of competing with the signal of interest, producing a statistical bias much like an interference. Furthermore, the DC offset may cause the receiver channel to become saturated, such that a voltage rail is reached or exceeded. For example, DC offset may saturate a receiver channel when it is amplified by DC coupled gain amplifiers in the receiver channel at baseband. In such situations, the information signal may not be recoverable at all. Hence, it is desirable to reduce or entirely eliminate unwanted DC offset voltages from receiver channels. Furthermore, the DC offset voltages must be removed without distorting the signal of interest.

BRIEF SUMMARY OF THE INVENTION

The present invention is directed to a filter module that reduces and/or removes DC offset voltages from a communication system. The filter module may be coupled in a receiver channel of a variety of communication system types, including, but not limited to, a wireless local area network (WLAN) receiver channel. Other applications of the invention include, without limitation, other types of communication networks and cellular telephones.

In a first aspect of the present invention, the filter module is used to reduce a DC offset voltage in a communication system. The filter module is configured in a single-ended fashion. A capacitor is coupled between an input signal and an output signal. An active variable resistor is coupled between the output signal and a reference voltage. The active variable resistor receives a control signal. The control signal adjusts the value of the active variable resistor, which adjusts the frequency response of the filter module. The rate at which the filter module reduces DC offset voltages is thereby adjusted.

In a further aspect of the present invention, the active variable resistor includes a first MOSFET transistor and a second MOSFET transistor. The second MOSFET transistor is coupled in parallel with the first MOSFET transistor.

In a further aspect of the present invention, the control signal is a periodic waveform, such as a ramp-shaped waveform.

In another aspect of the present invention, a filter module for reducing a DC offset voltage in a radio frequency communication channel is described. The filter module is configured in a differential fashion. A first capacitor is coupled between a first differential input node and a first differential output node. A second capacitor is coupled between a second differential input node and a second differential output node. An active variable resistor is coupled between the first differential output node and the second differential output node. The active variable resistor receives a control signal.

In another aspect of the present invention, an automatic gain control (AGC) feedback loop is presented. A rectifier receives a first receiver channel signal and outputs a rectified signal. A filter module receives the rectified signal and outputs an AGC signal. The filter module includes a capacitor and an active variable resistor. The capacitor is coupled between the rectified signal and the AGC signal. An active variable resistor is coupled between the AGC signal and a reference voltage. The active variable resistor receives a control signal. In a further aspect, the AGC feedback loop further includes an AGC amplifier that receives a second receiver channel signal and the AGC signal, and outputs a third receiver channel signal.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 7A:
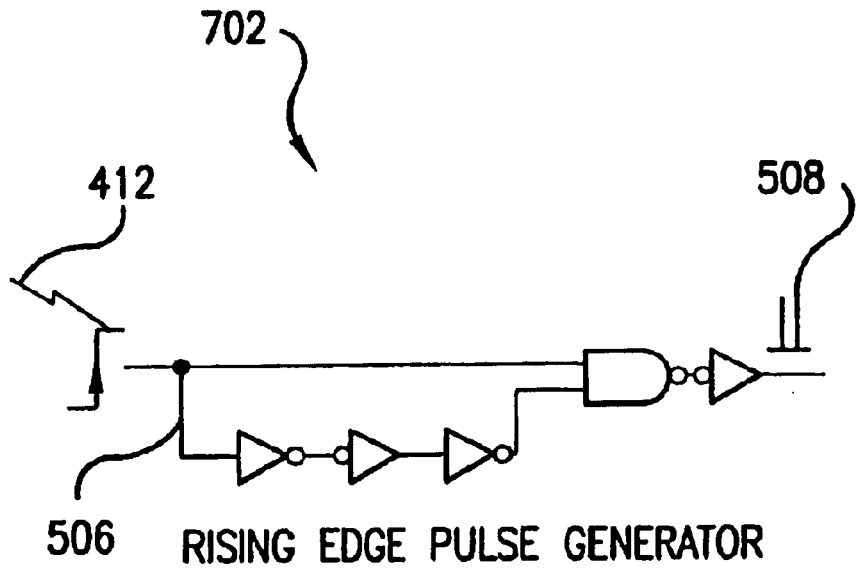
Figure 7B:
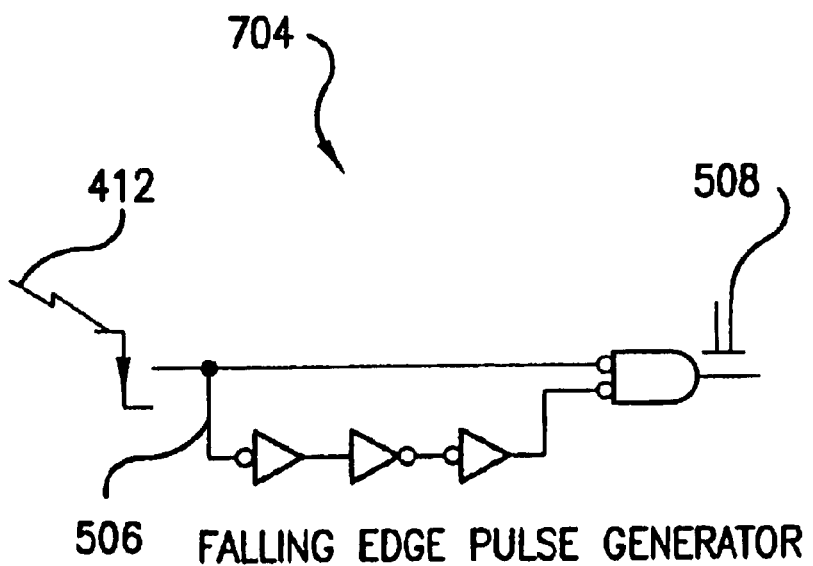

FIGS. 7A–B illustrate example aperture generators.

Figure 8:
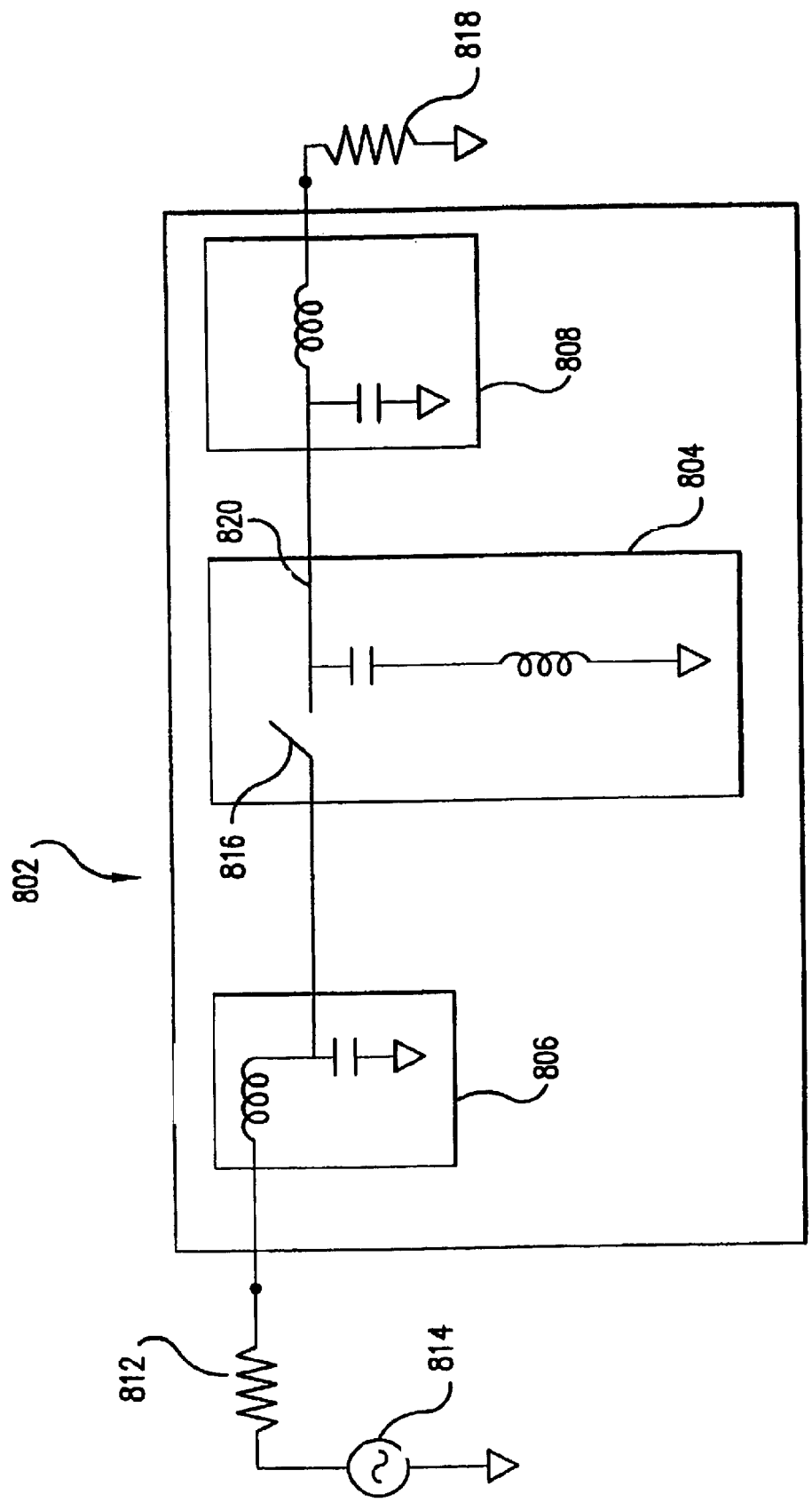

FIG. 8 illustrates an aliasing module with input and output impedance match according to an embodiment of the invention.

Figure 9:
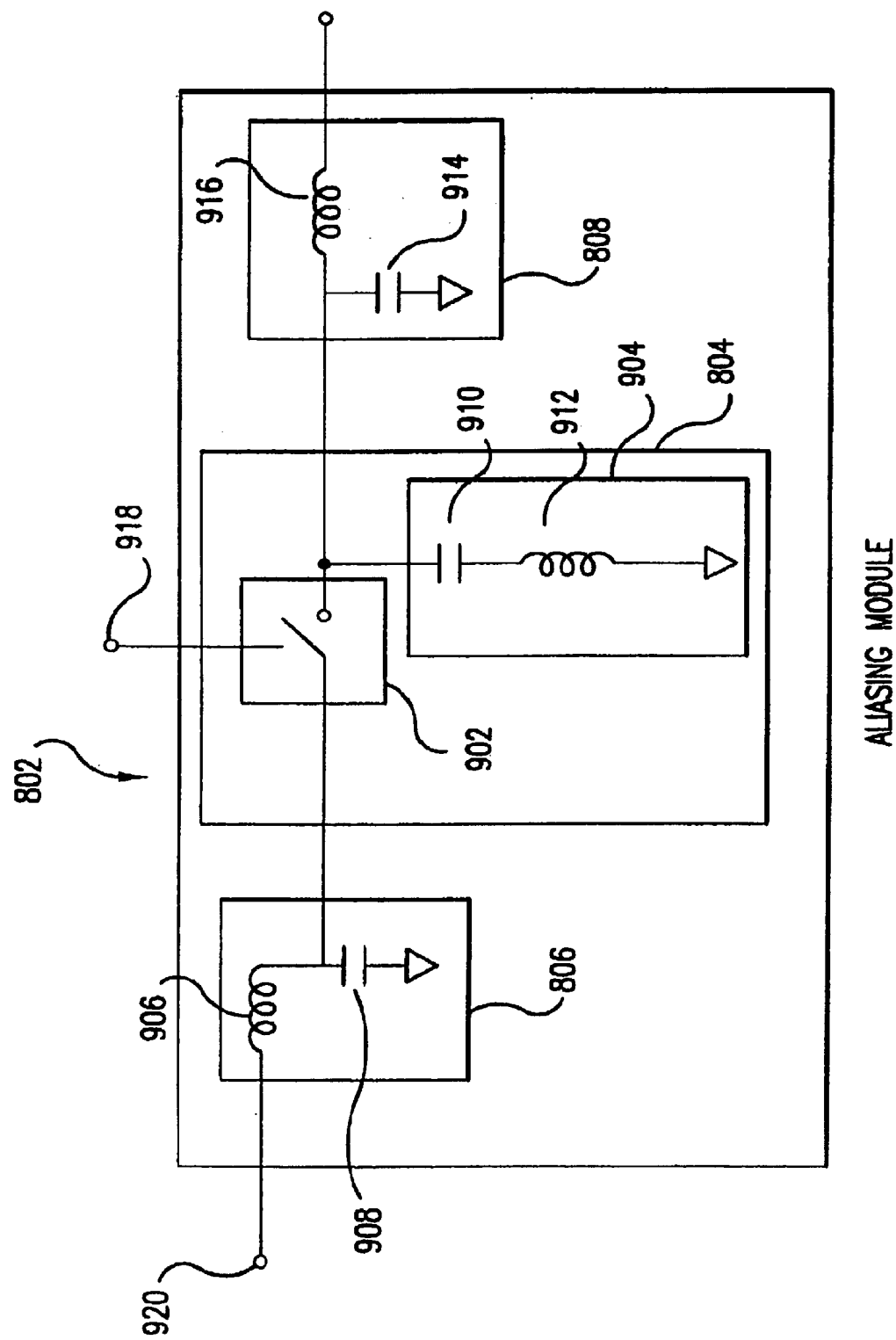

FIG. 9 illustrates an example energy transfer module with a switch module and a reactive storage module according to an embodiment of the invention.

Figure 10:
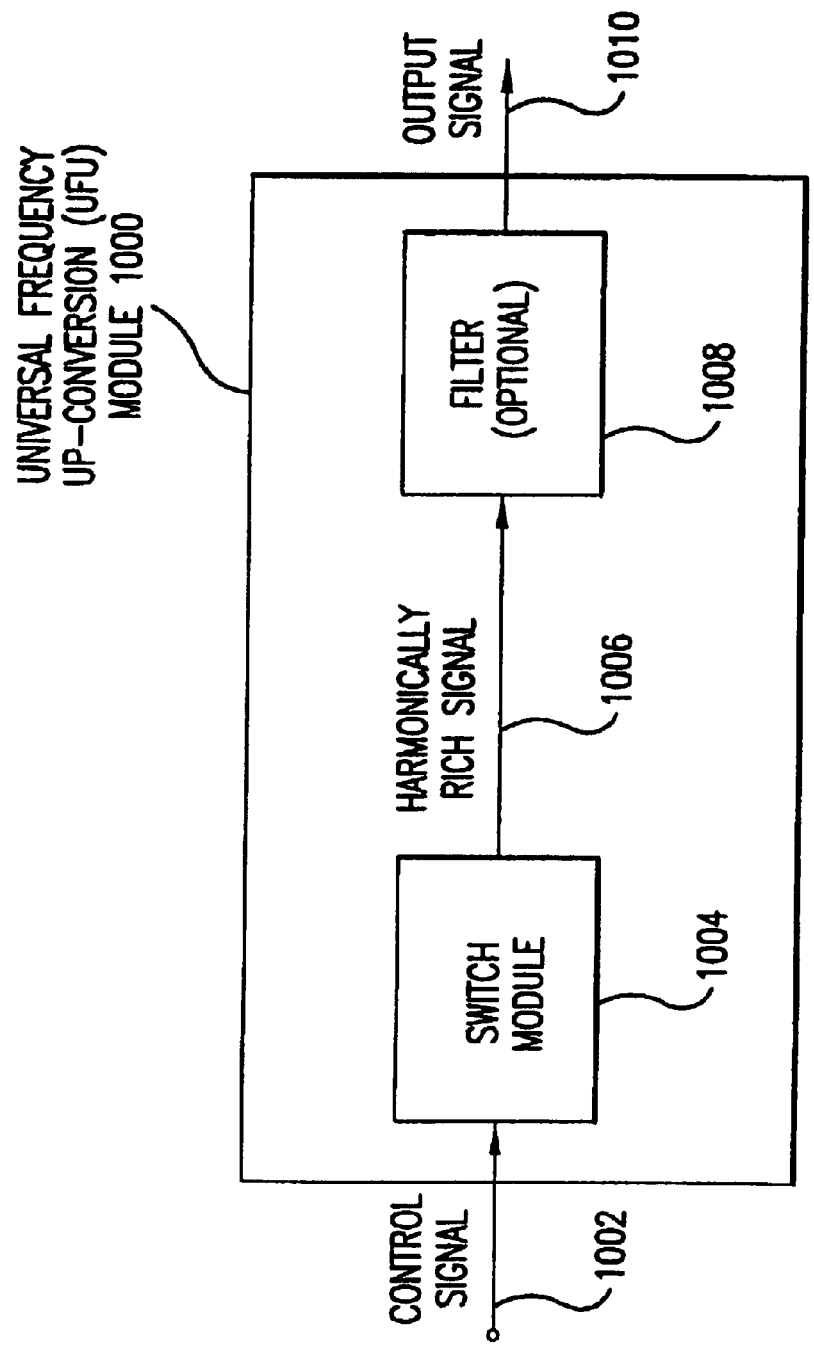

FIG. 10 is a block diagram of a universal frequency up-conversion (UFU) module according to an embodiment of the invention.

Figure 11:
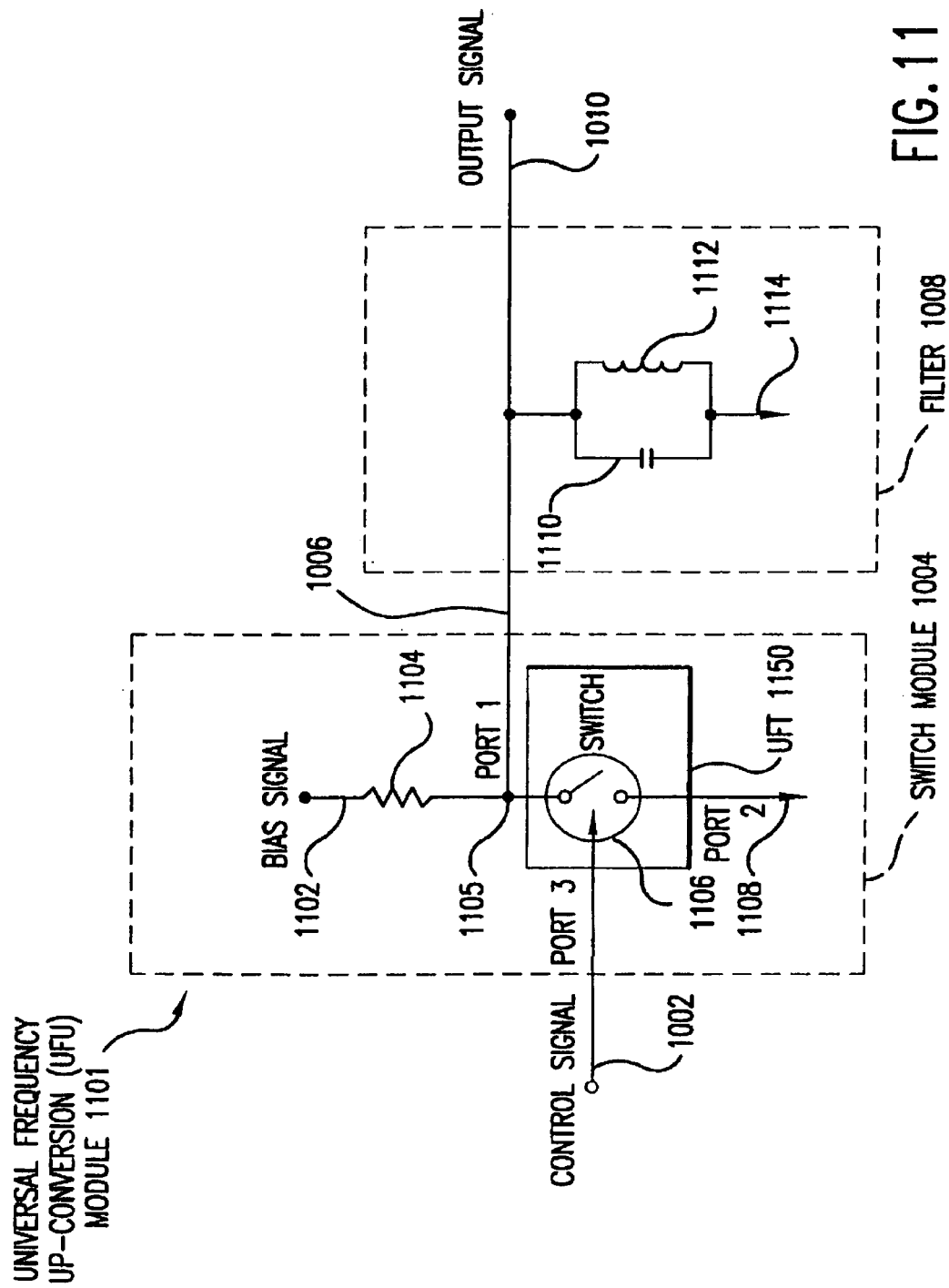

FIG. 11 is a more detailed diagram of a universal frequency up-conversion (UFU) module according to an embodiment of the invention.

Figure 12:
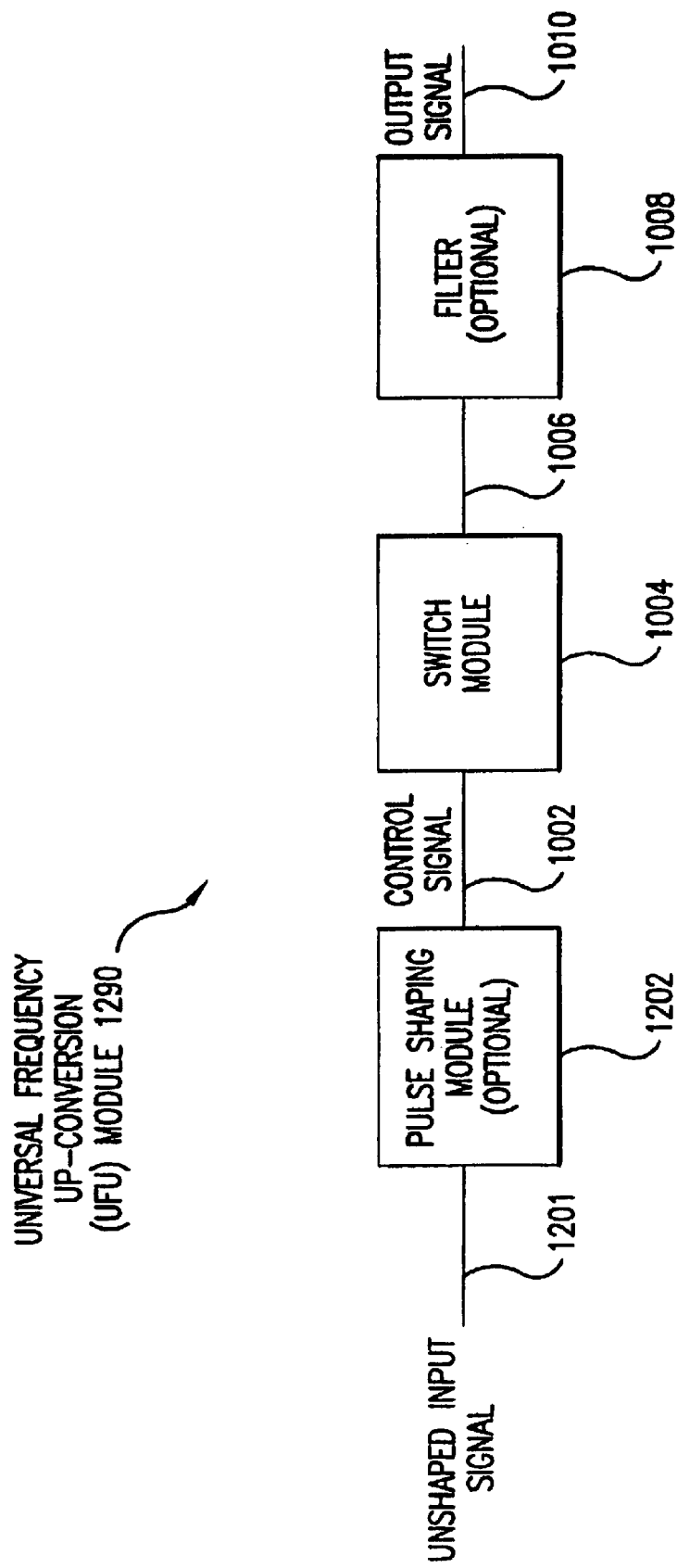

FIG. 12 is a block diagram of a universal frequency up-conversion (UFU) module according to an alternative embodiment of the invention.

FIGS. 13A–13I illustrate example waveforms used to describe the operation of the UFU module.

Figure 14:
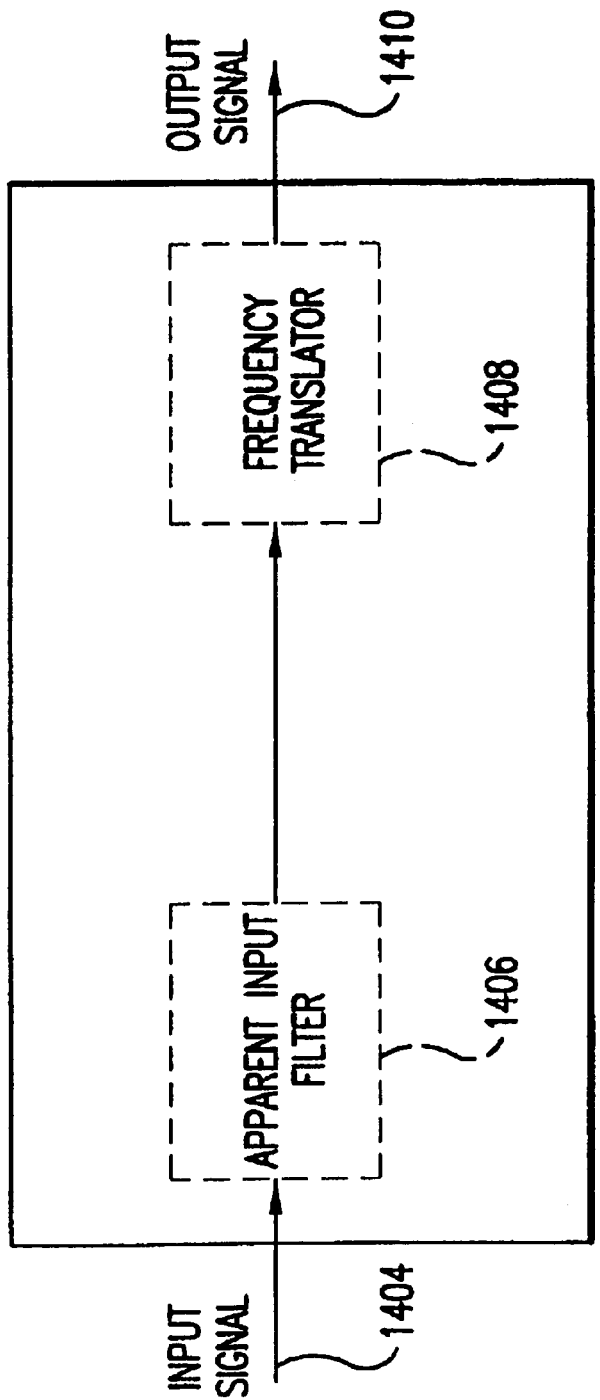

FIG. 14 illustrates a unified down-converting and filtering (UDF) module according to an embodiment of the invention.

Figure 15:
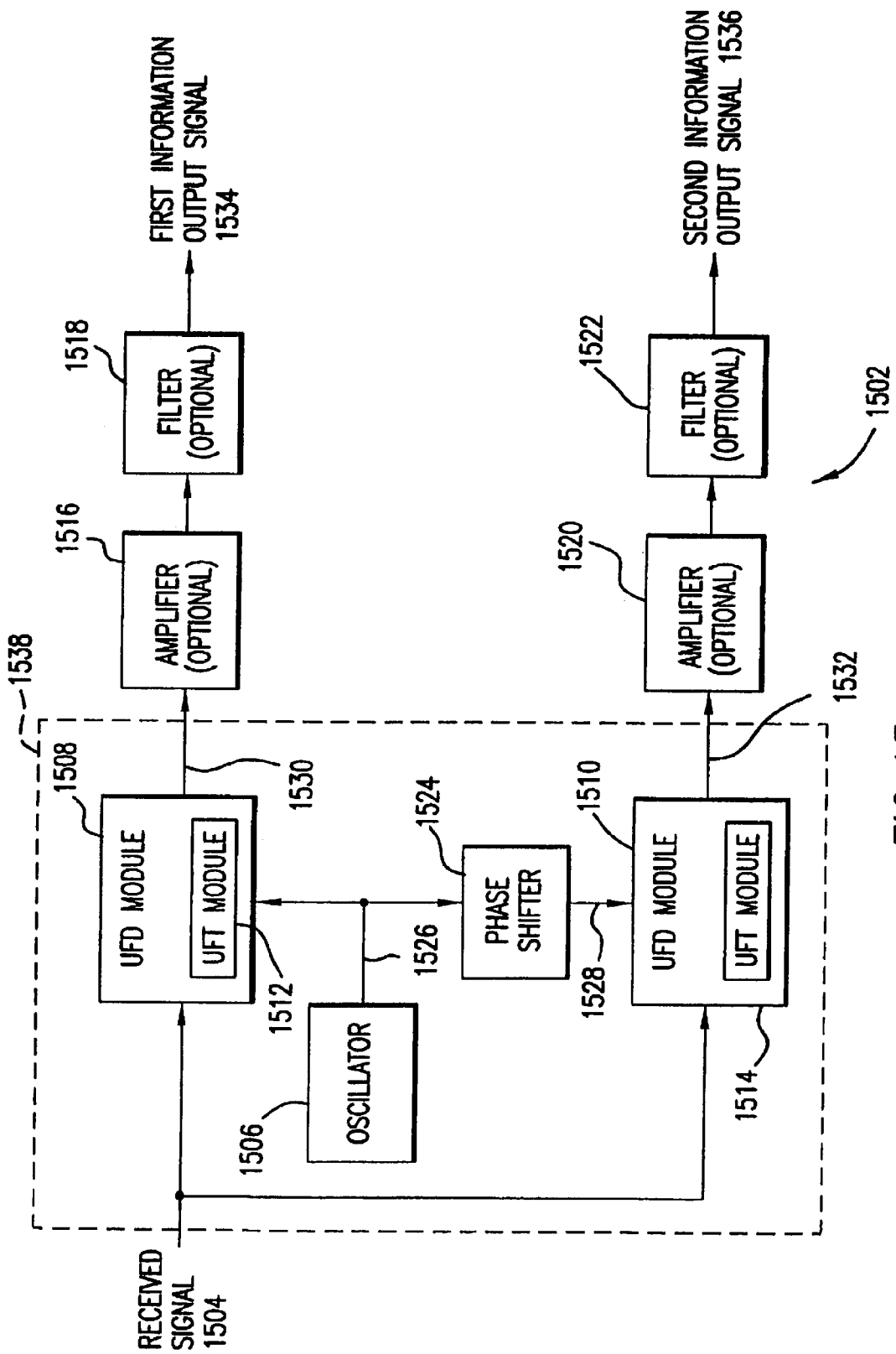

FIG. 15 illustrates an exemplary I/Q modulation embodiment of a receiver according to the invention.

Figure 16:
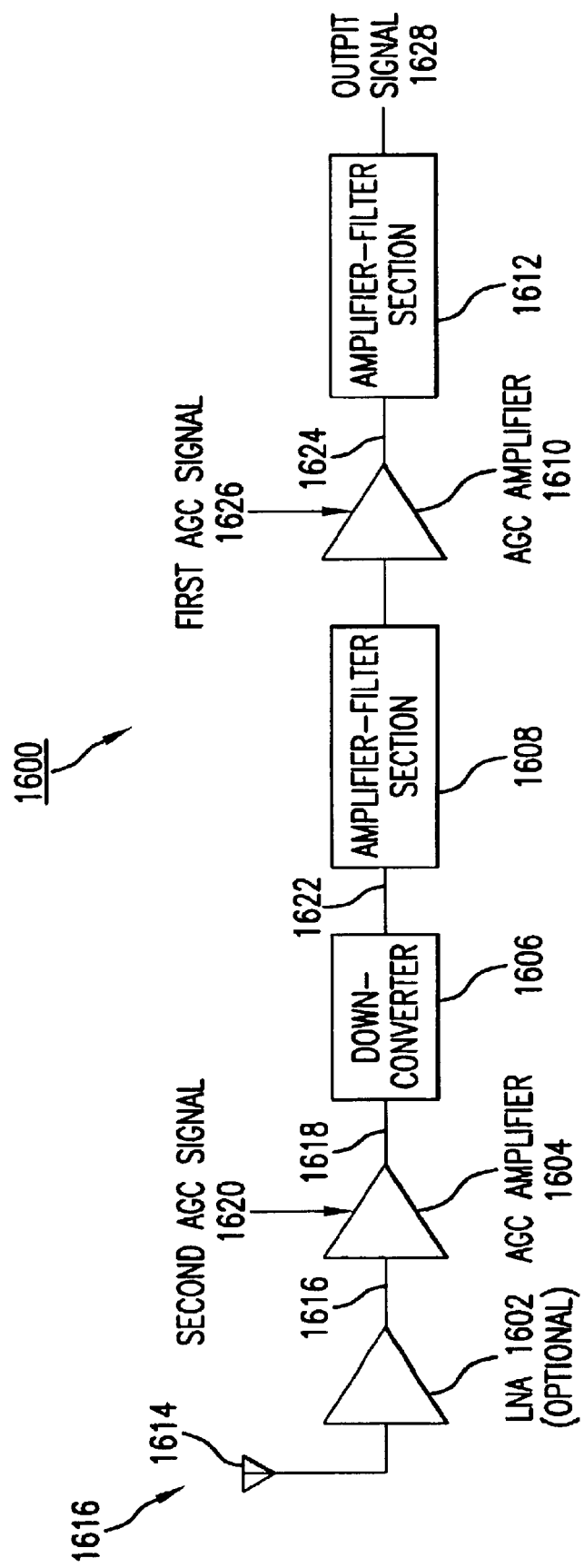

FIG. 16 shows an exemplary receiver channel in which embodiments of the present invention may be implemented.

Figure 17A:
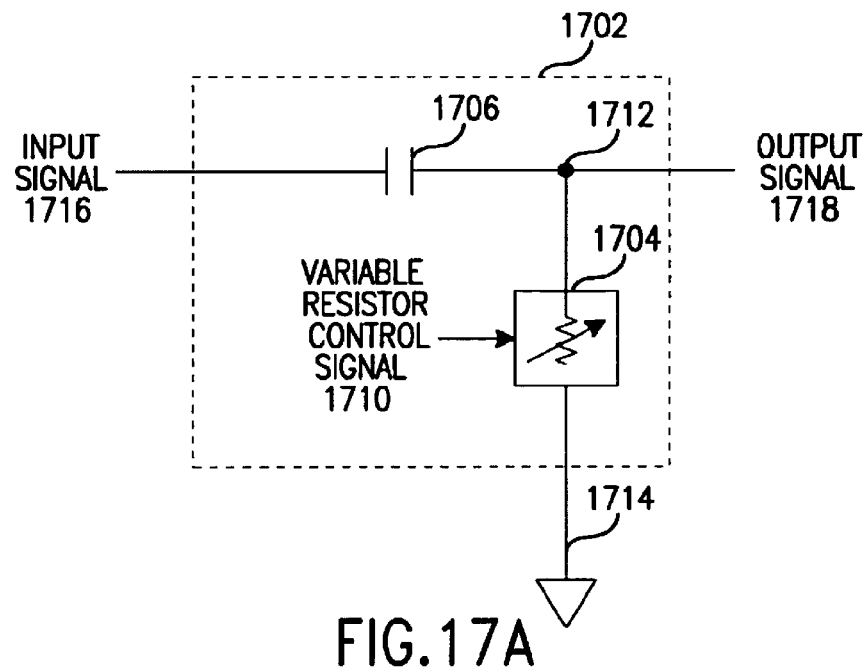

FIG. 17A shows an example filter module, according to an single-ended receiver channel embodiment of the present invention.

Figure 17B:
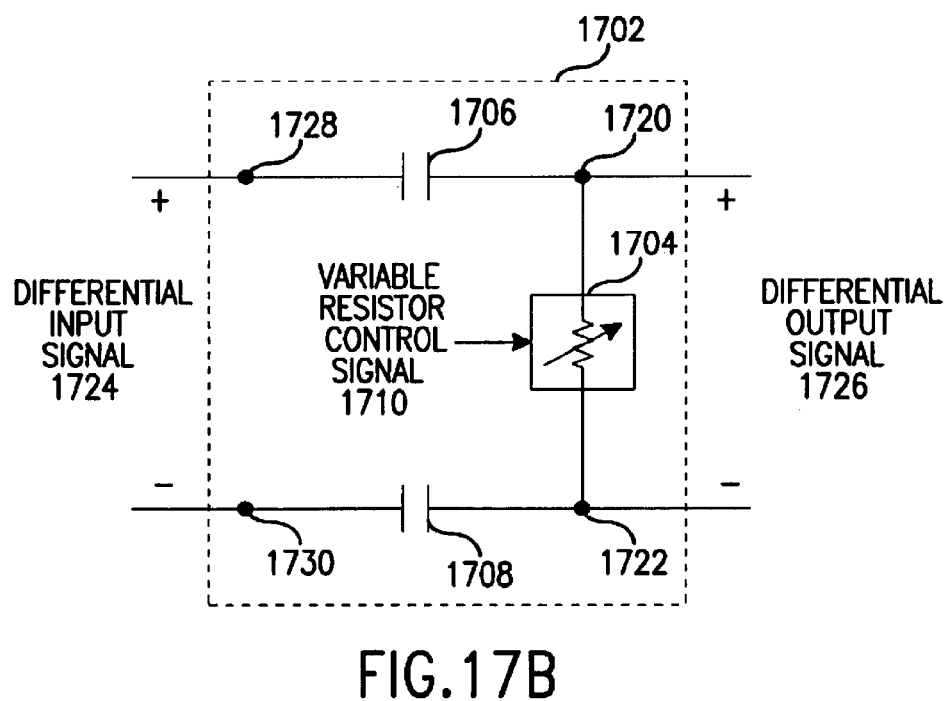

FIG. 17B shows a version of a filter module that may be implemented in a differential receiver channel, according to an embodiment of the present invention.

Figure 17C:
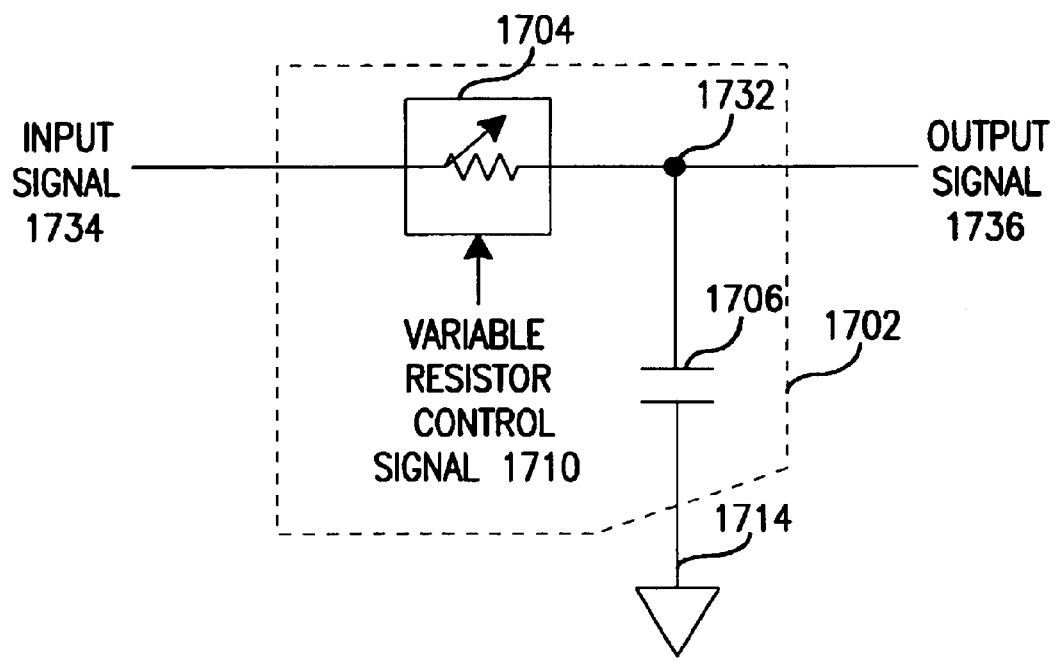

FIG. 17C shows an example filter module, according to an embodiment of the present invention.

Figure 18:
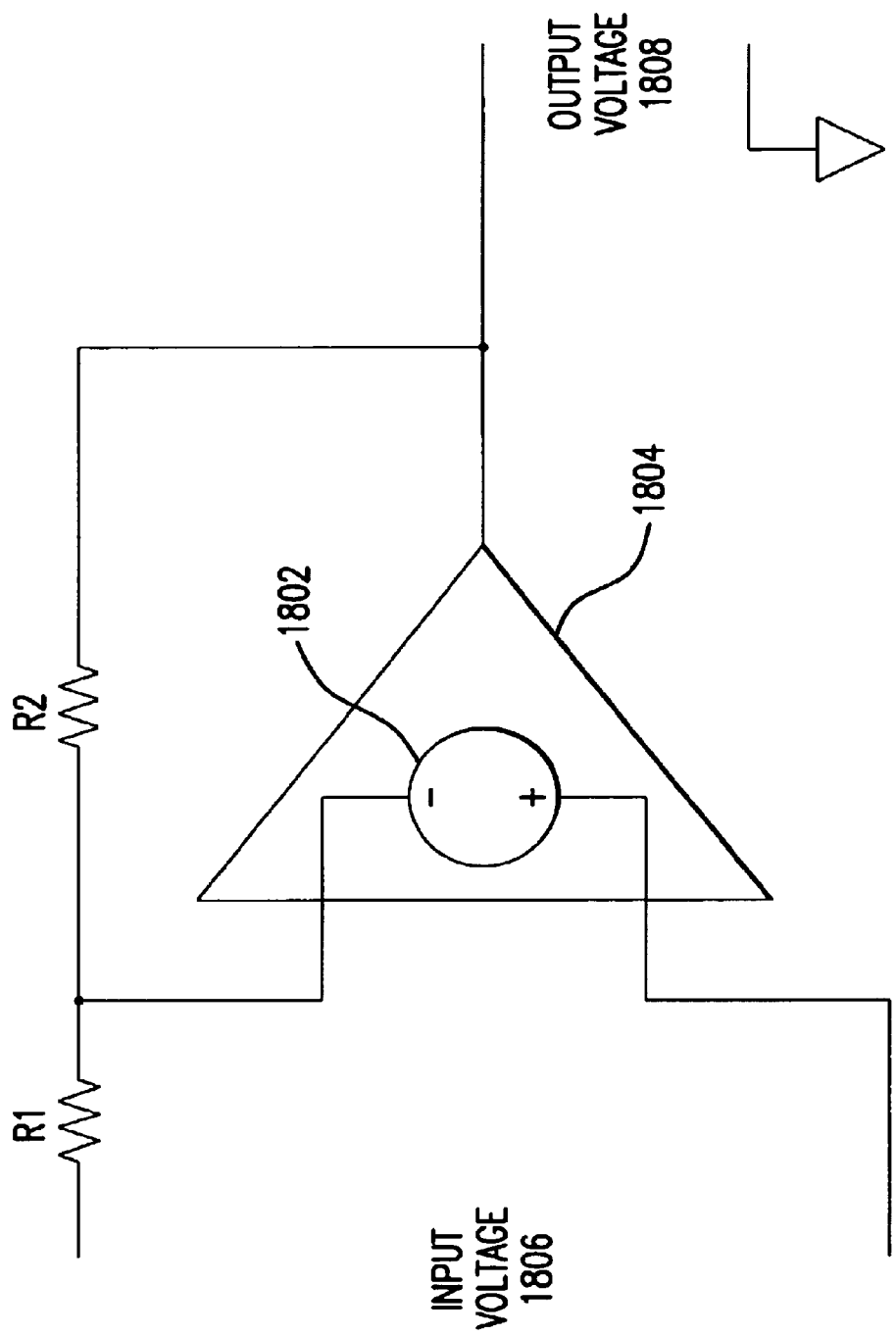

FIG. 18 shows a DC offset voltage present in an example model of an operational amplifier gain stage.

Figure 19:
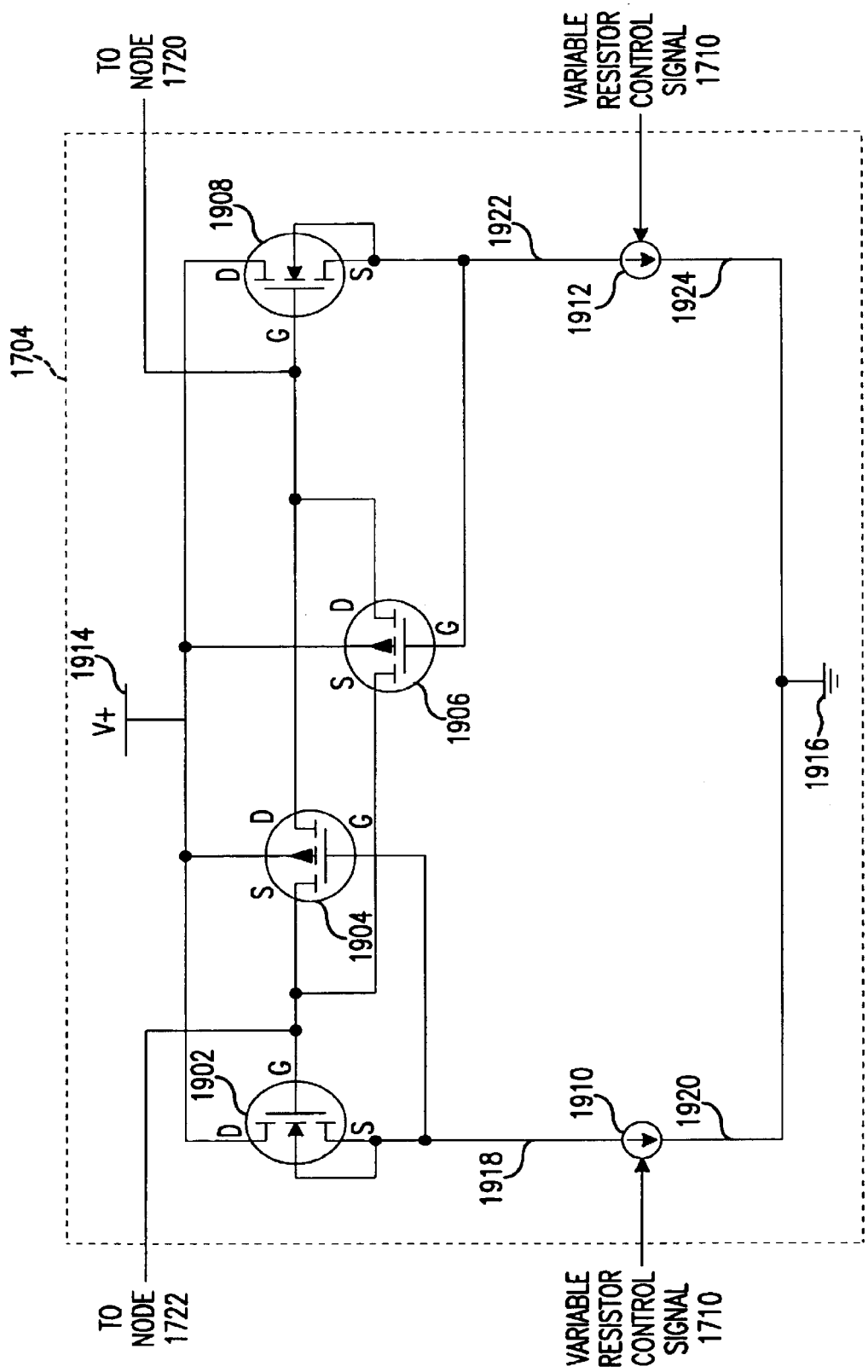

FIG. 19 shows an example implementation for a variable resistor that includes MOSFETs, according to an example embodiment of the present invention.

Figure 20A:
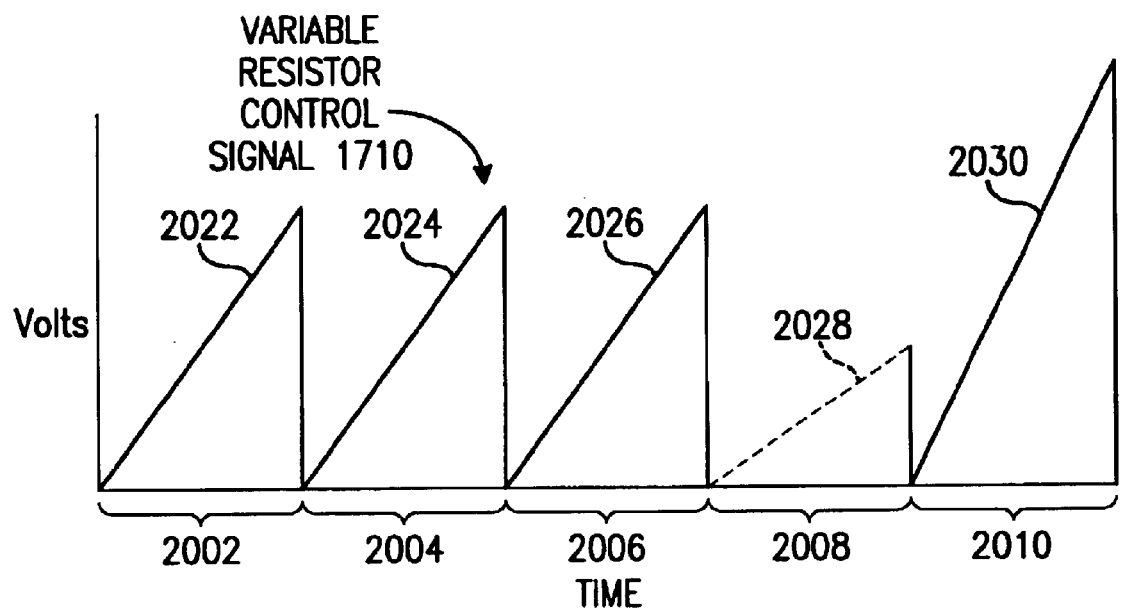

FIG. 20A shows an example of a control signal, according to an embodiment of the present invention.

Figure 20B:
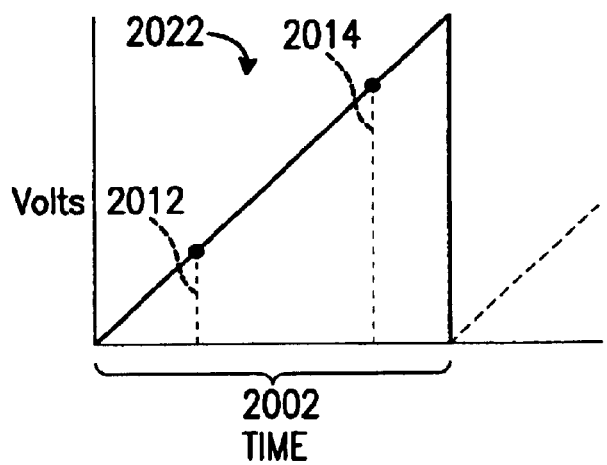

FIG. 20B shows more detail of a first ramp waveform portion of the control signal of FIG. 20A during first time period.

Figure 21A:
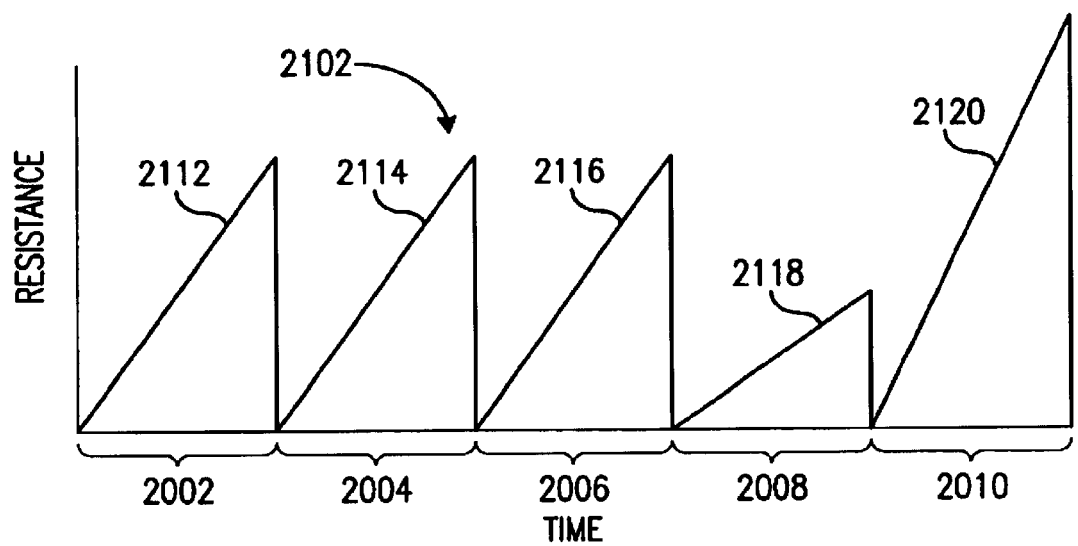

FIG. 21A shows an example plot of resistance versus time for a variable resistor when receiving the control signal shown in FIG. 20A, according to an embodiment of the present invention.

Figure 21B:
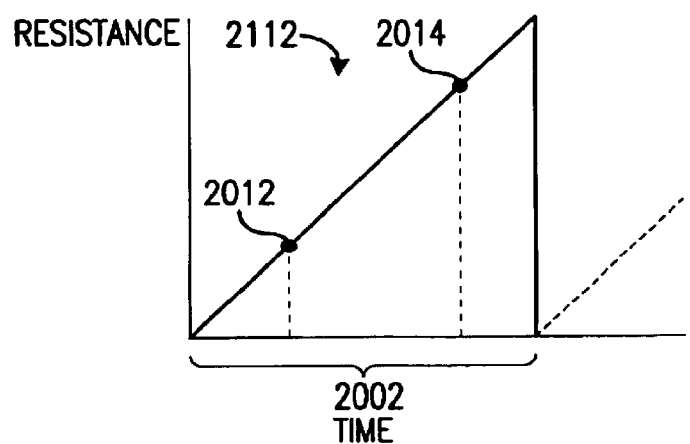

FIG. 21B shows more detail of a first resistor value waveform portion during a first time period shown in FIG. 21A, according to an embodiment of the present invention.

Figure 22:
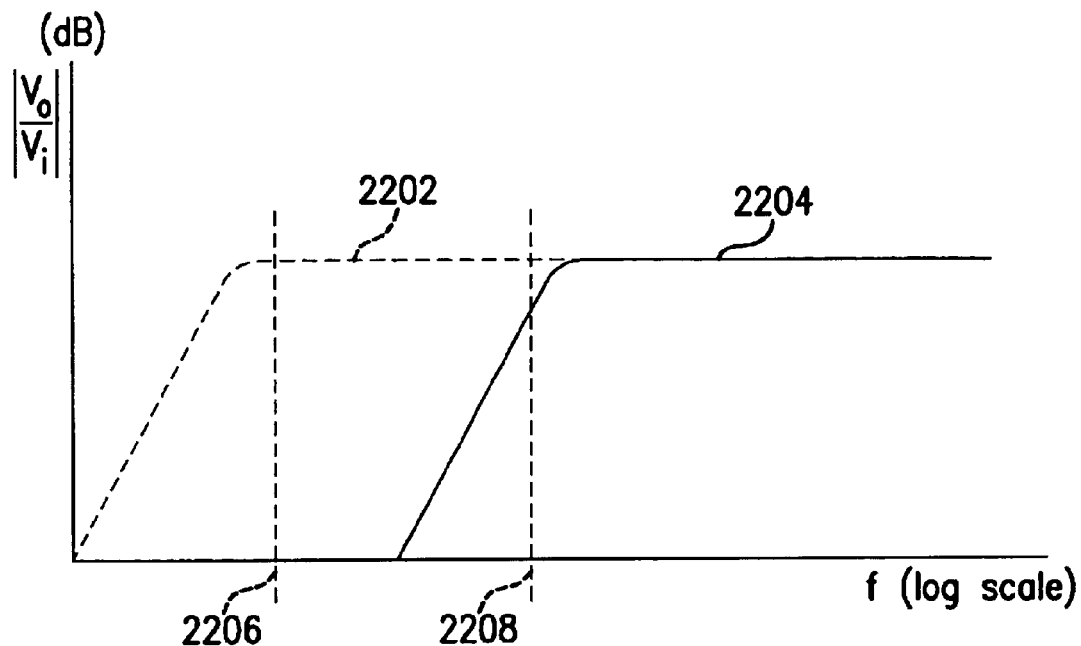

FIG. 22 shows example frequency responses for a filter module of the present invention.

Figure 23:
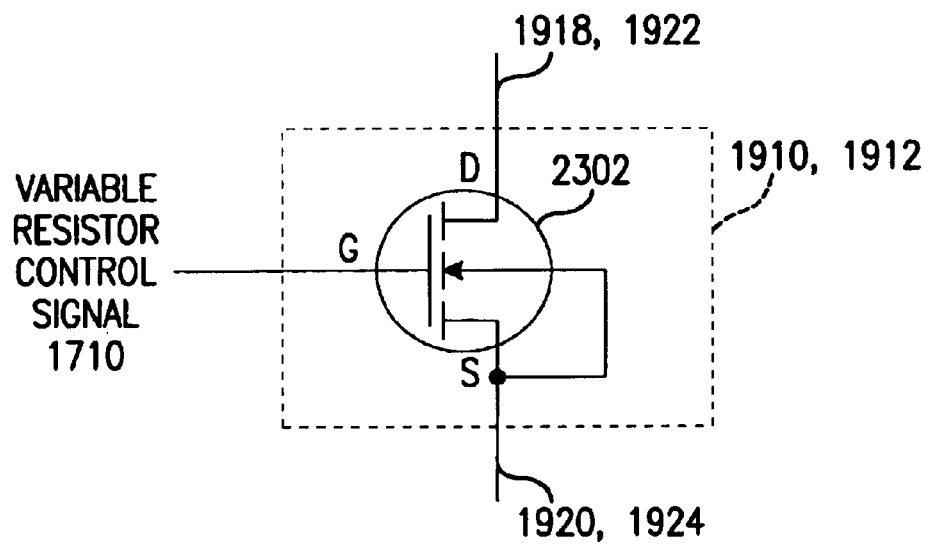

FIG. 23 shows an example implementation for first and second current sources, according to an embodiment of the present invention.

Figure 24A:
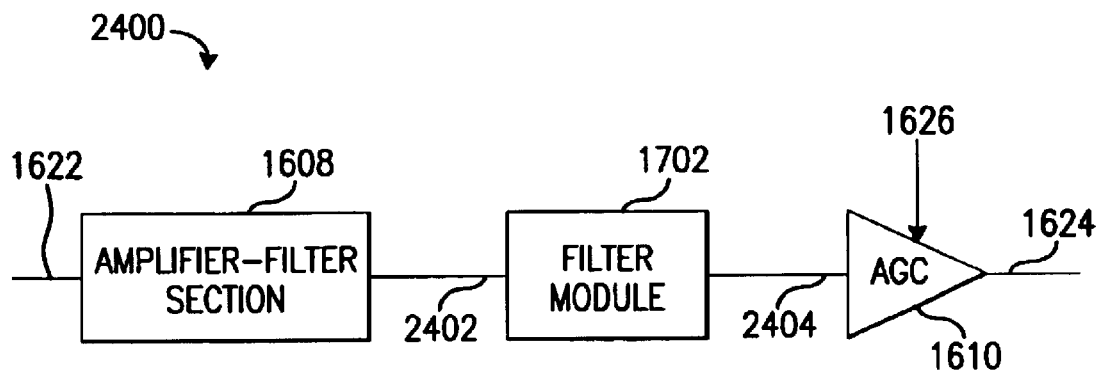

FIG. 24A shows an example application of a filter module in a receiver channel portion, according to an embodiment of the present invention.

Figure 24B:
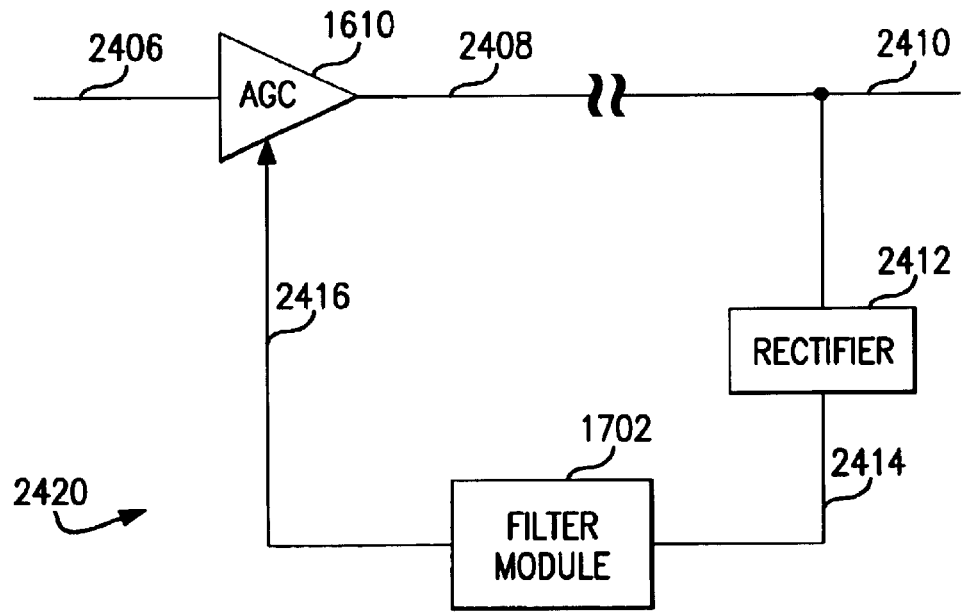

FIG. 24B shows an example application of a filter module in an AGC feedback loop, according to an embodiment of the present invention.

Figure 25A:
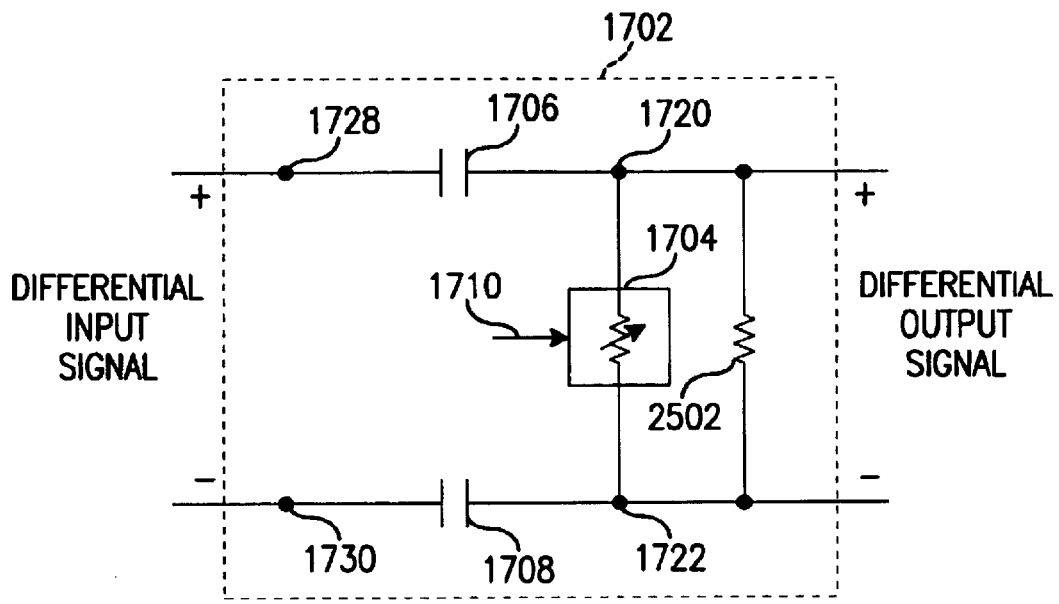

FIG. 25A shows a filter module, with a fixed resistor in parallel with a variable resistor, according to an embodiment of the present invention.

Figure 25B:
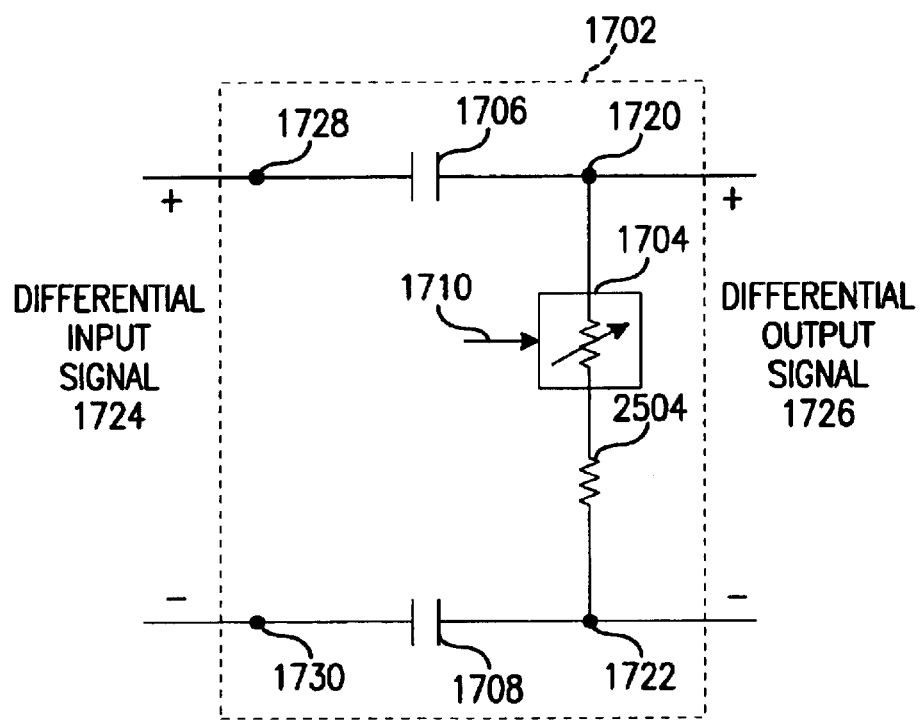

FIG. 25B shows a filter module, with a fixed resistor in series with a variable resistor, according to an embodiment of the present invention.

Figure 26:
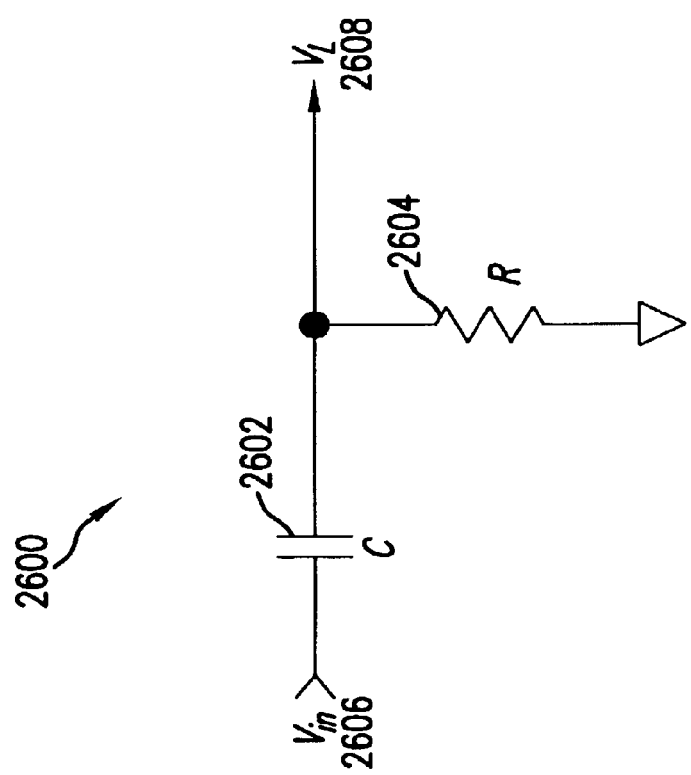

FIG. 26 illustrates a conventional high-pass resistor-capacitor (RC) filter.

Figure 27A:
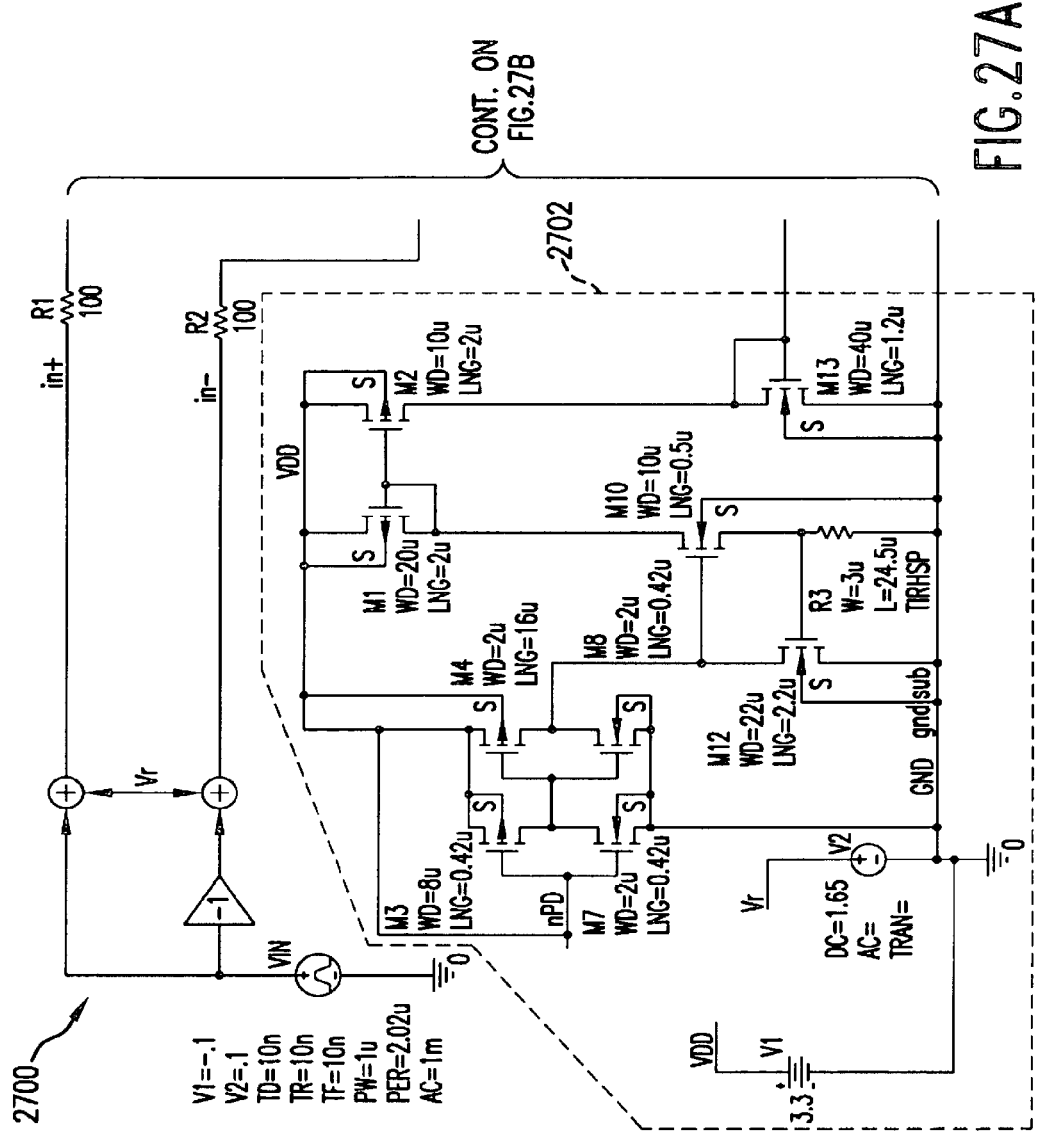
Figure 27B:
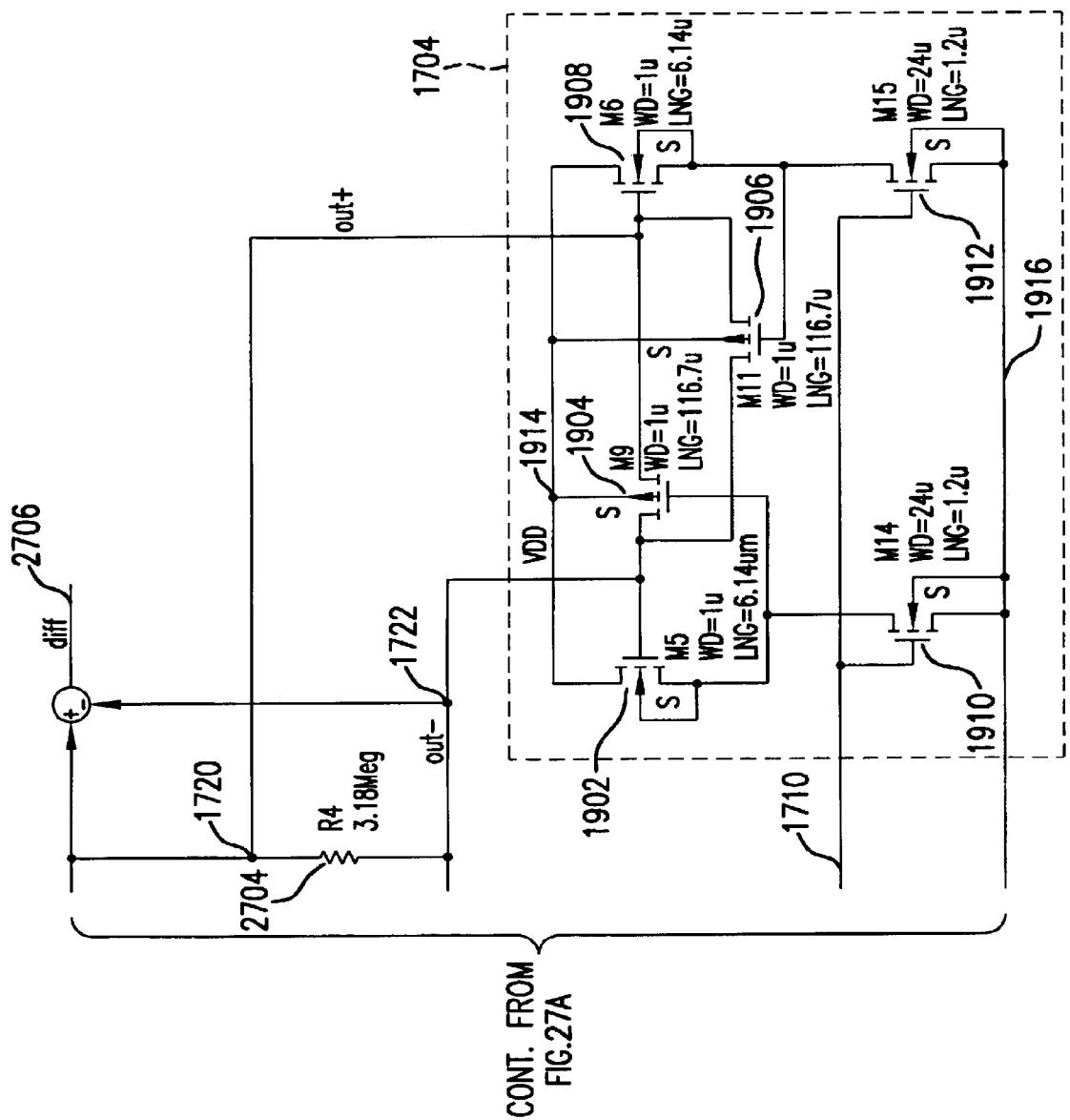

FIGS. 27A and 27B show a circuit that includes a variable resistor using selected dimensions, according to an example embodiment of the present invention.

Figure 28:
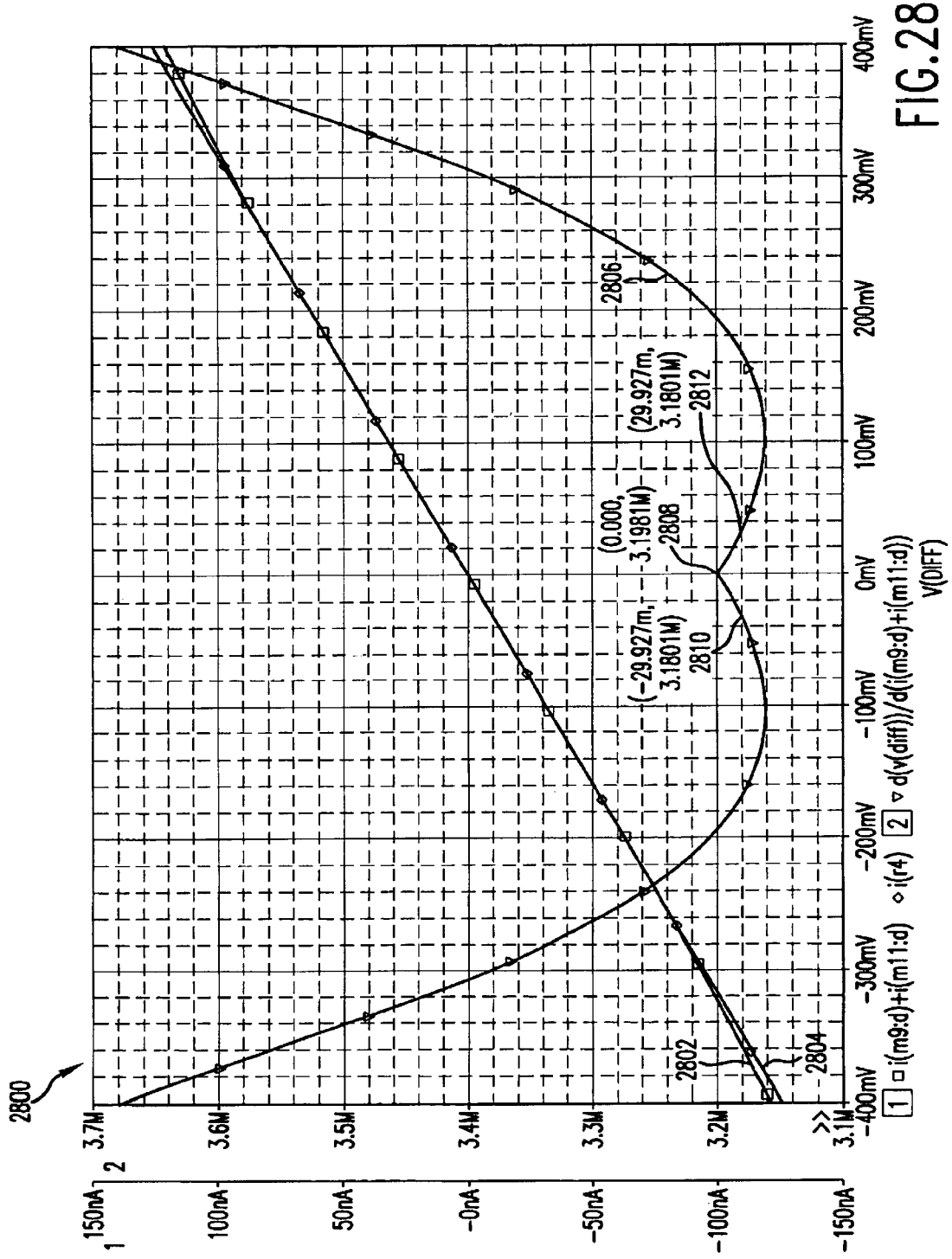

FIG. 28 shows an example simulation plot of the circuit shown in FIGS. 27A and 27B.

Figure 29A:
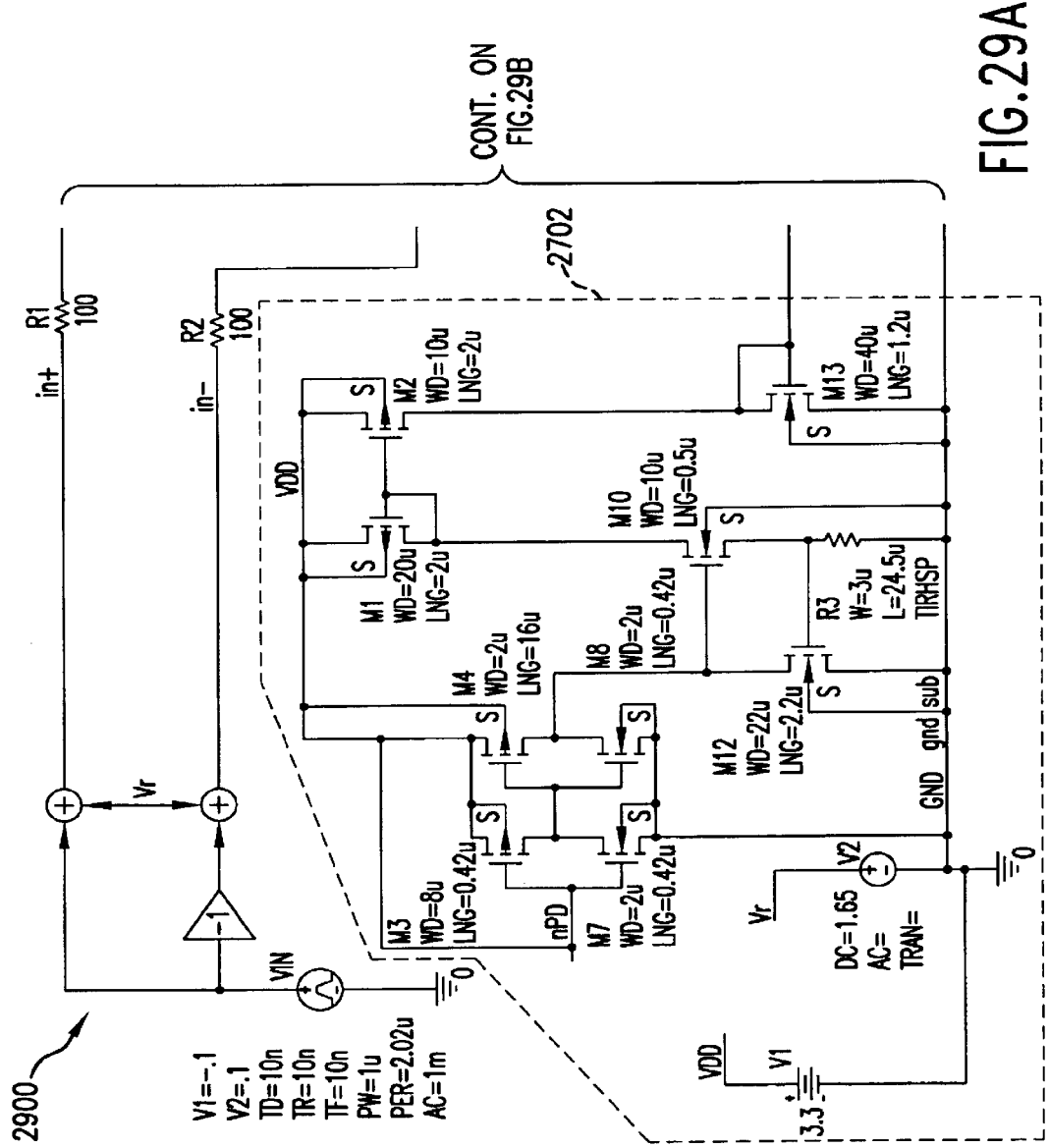
Figure 29B:
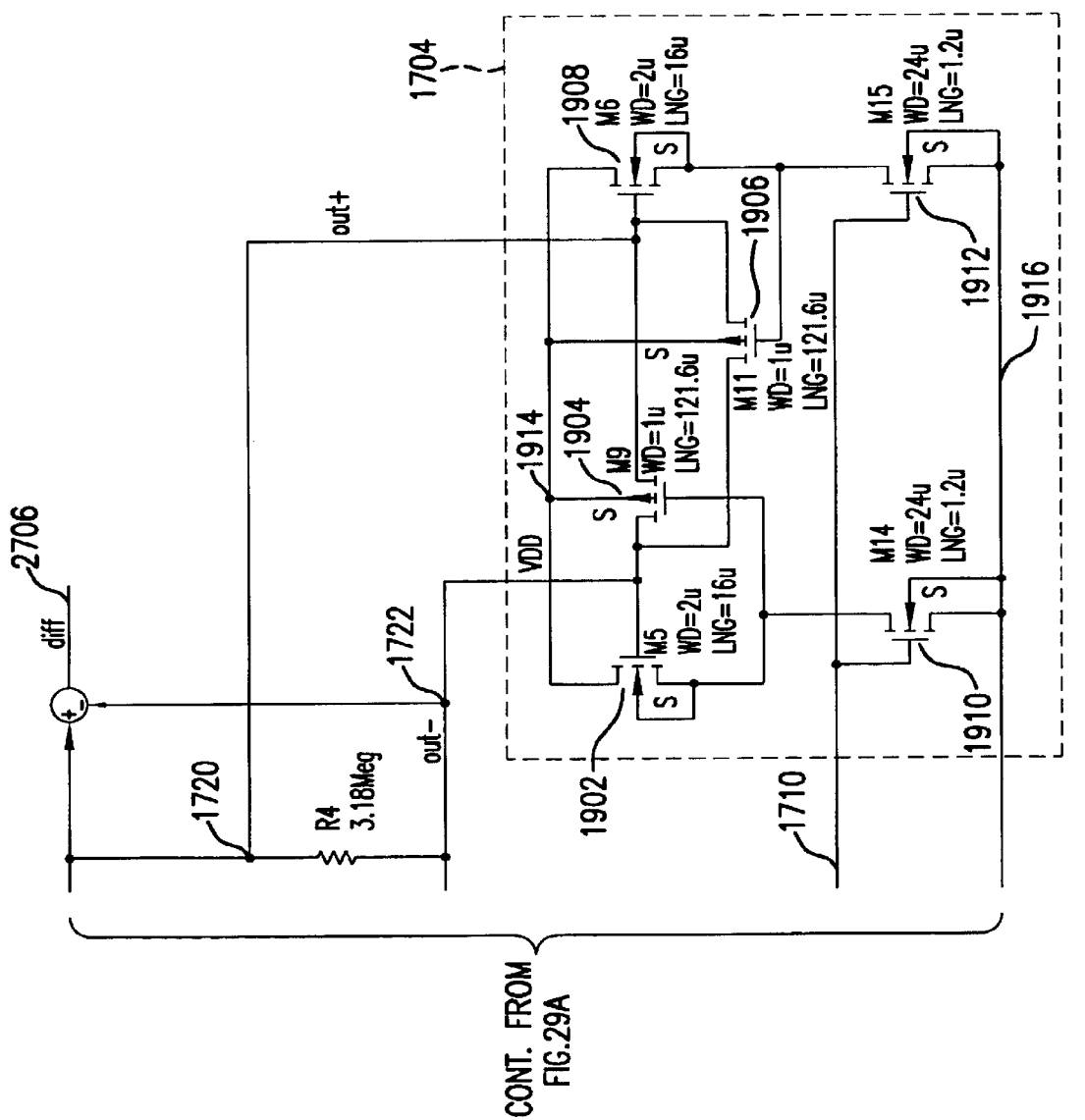

FIGS. 29A and 29B show the circuit of FIGS. 27A and 27B, with some MOSFET dimensions adjusted, according to an embodiment of the present invention.

Figure 30:
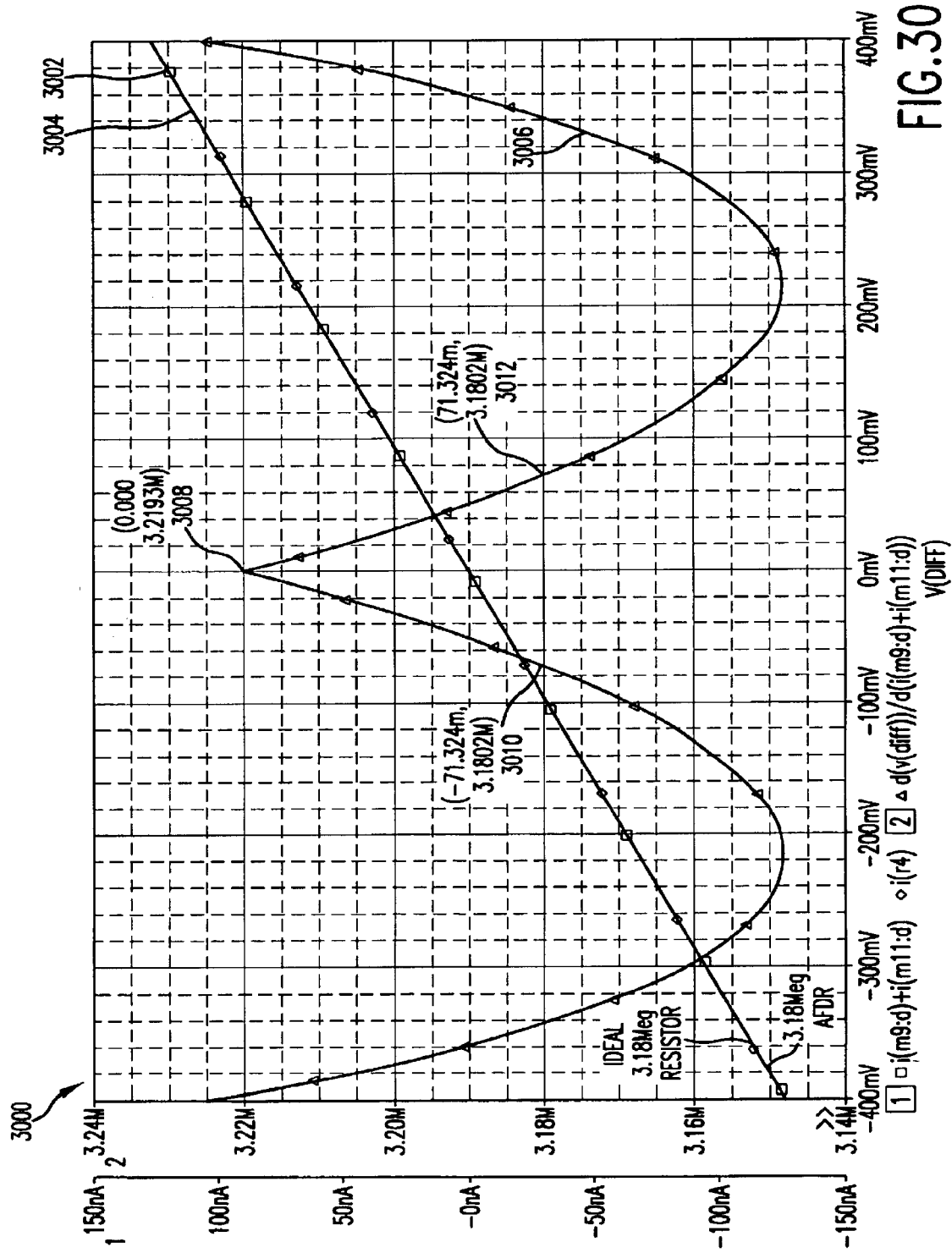

FIG. 30 shows an example simulation plot of the circuit shown in FIGS. 29A and 29B.

Figure 31:
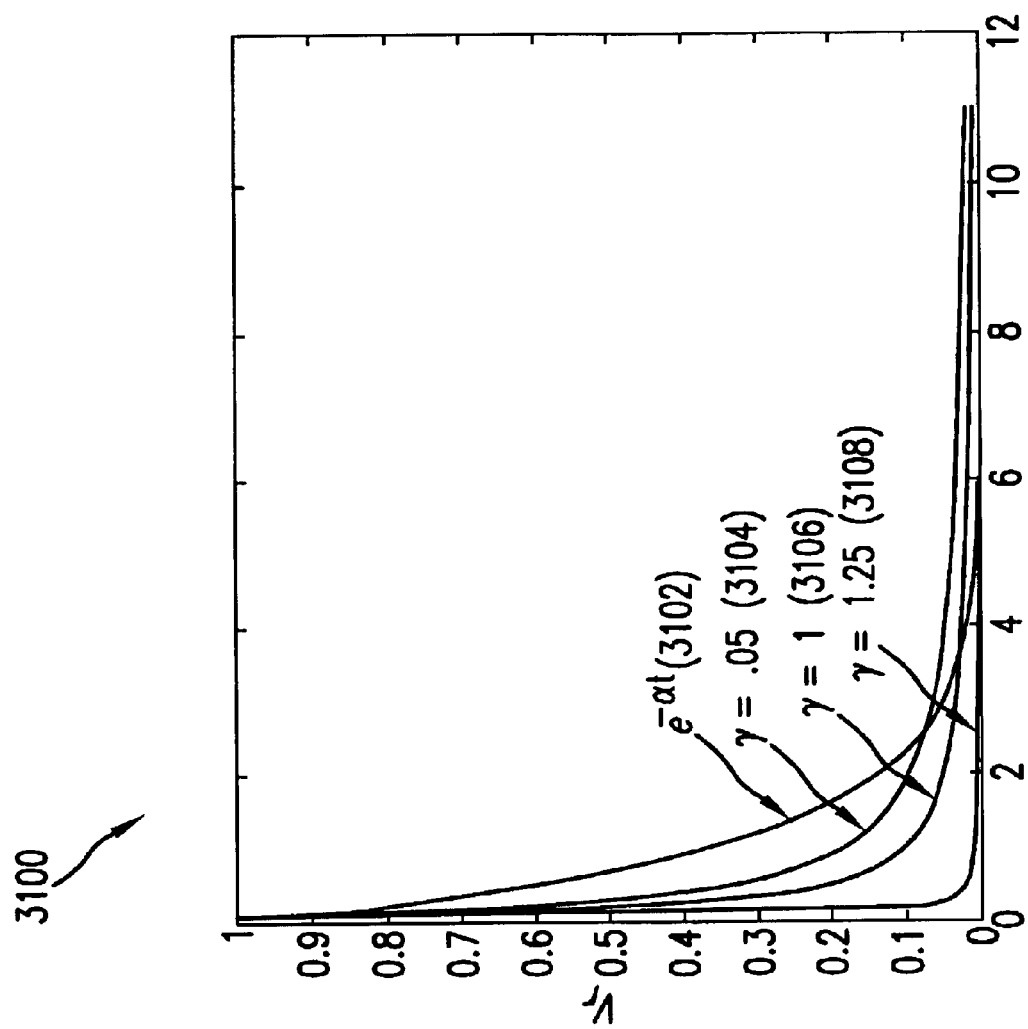

FIG. 31 shows a graph of responses to an input unit step function for a conventional RC filter, such as the RC filter shown in FIG. 26, and for various configurations for a filter module, according to embodiments of the present invention.

Figure 32:
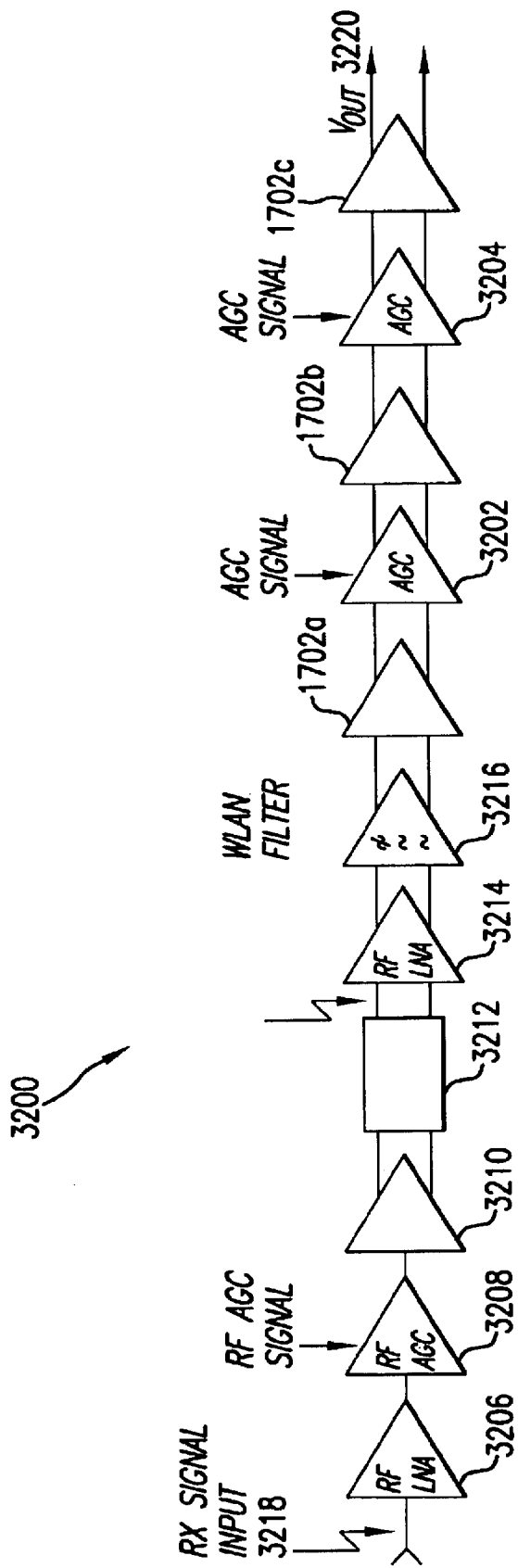

FIG. 32 shows an example receiver channel that includes a plurality of filter modules, according to an embodiment of the present invention.

Figure 33:
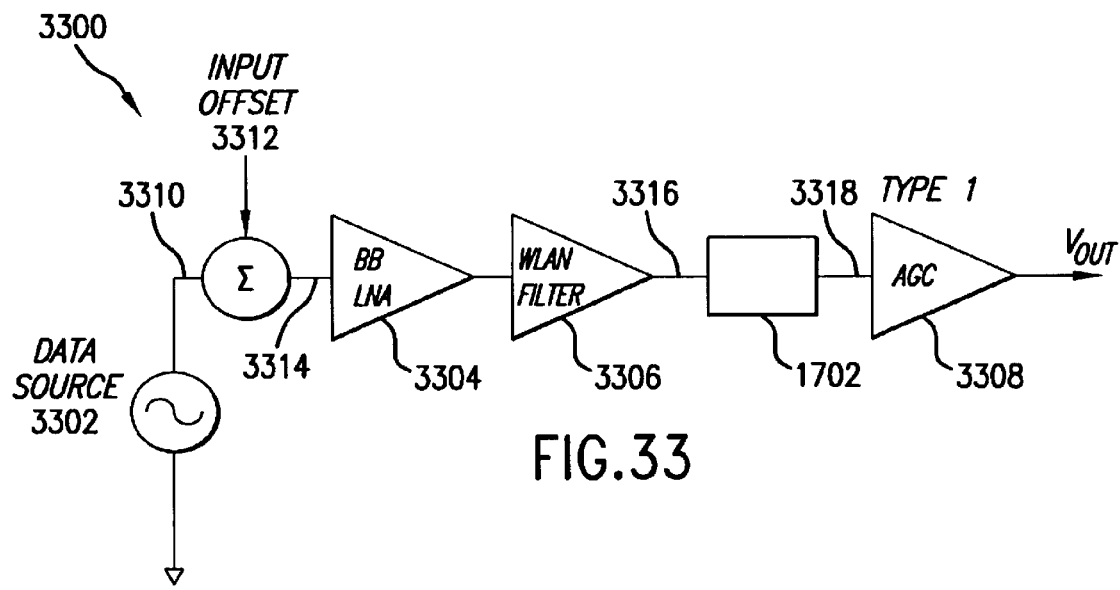

FIG. 33 illustrates a WLAN receiver circuit using a single filter module, according to an embodiment of the present invention.

Figure 34:
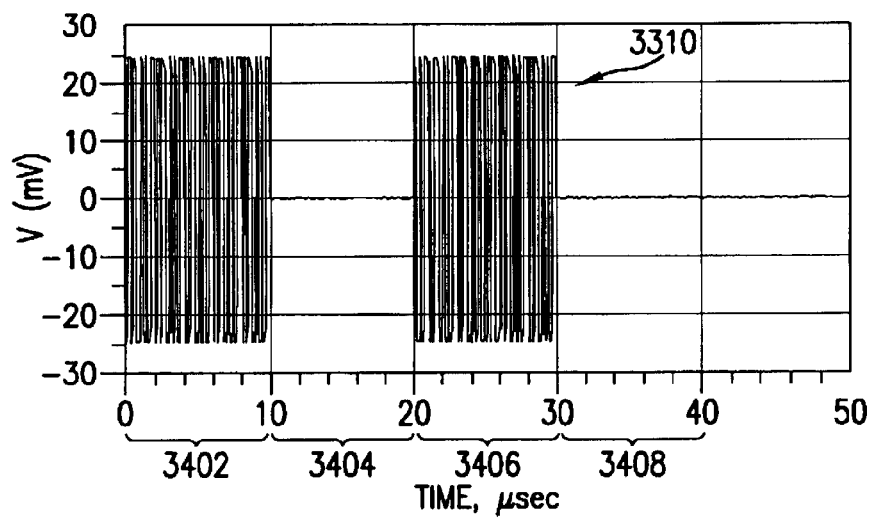

FIG. 34 illustrates a signal input to the WLAN receiver circuit of FIG. 33.

Figure 35:
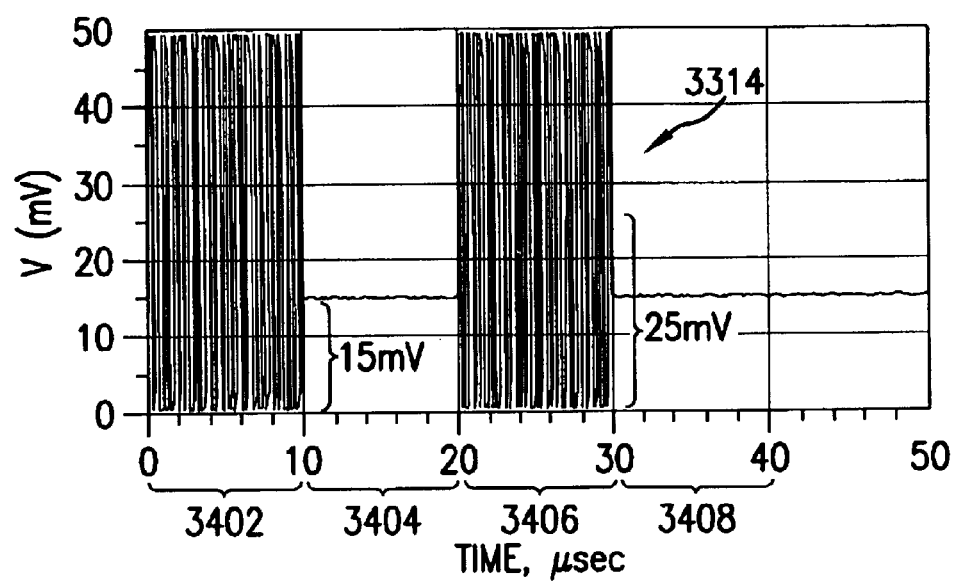

FIG. 35 illustrates a DC offset input signal of FIG. 33, showing unique DC offsets assigned to diversities A and B.

Figure 36:
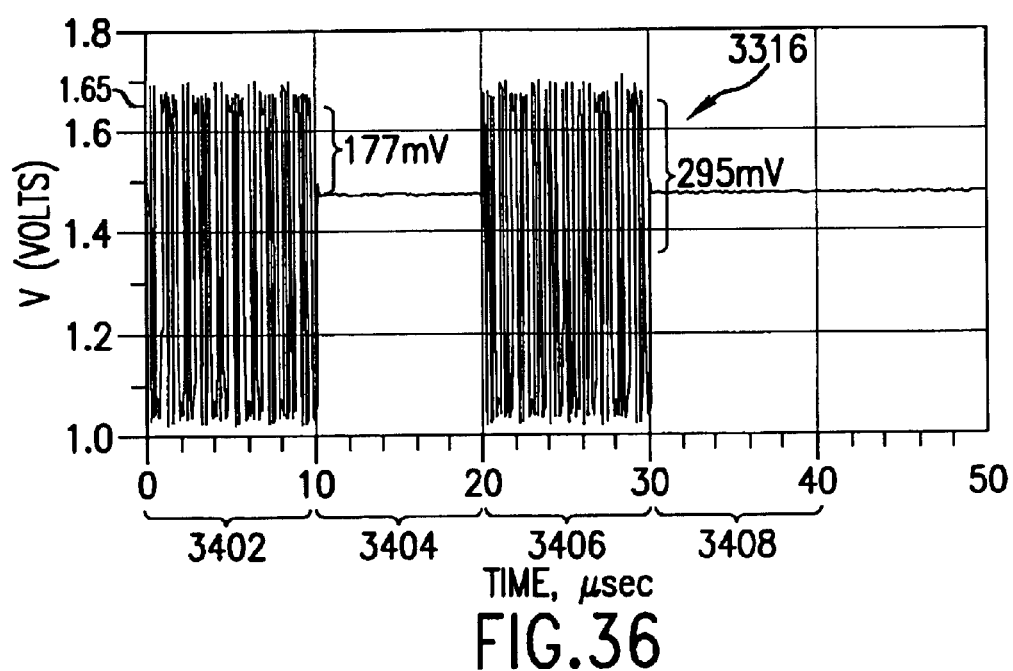

FIG. 36 illustrates an output of a WLAN filter located in the WLAN receiver circuit of FIG. 33.

Figure 37:
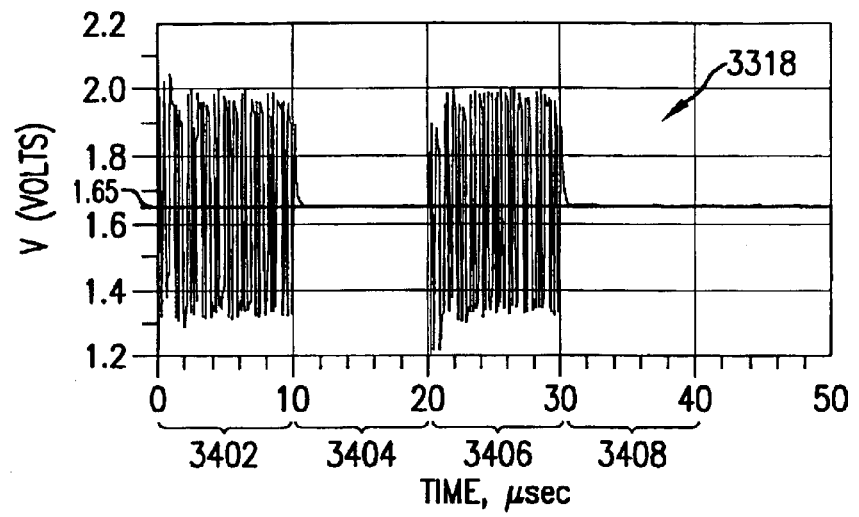

FIG. 37 illustrates a signal output by a filter module shown in FIG. 33.

Figure 38:
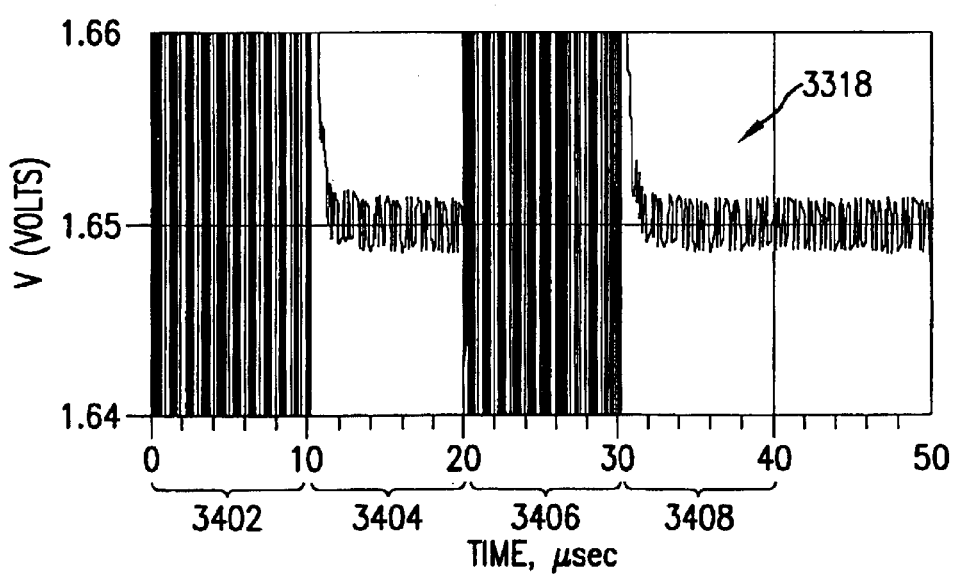
Figure 39:
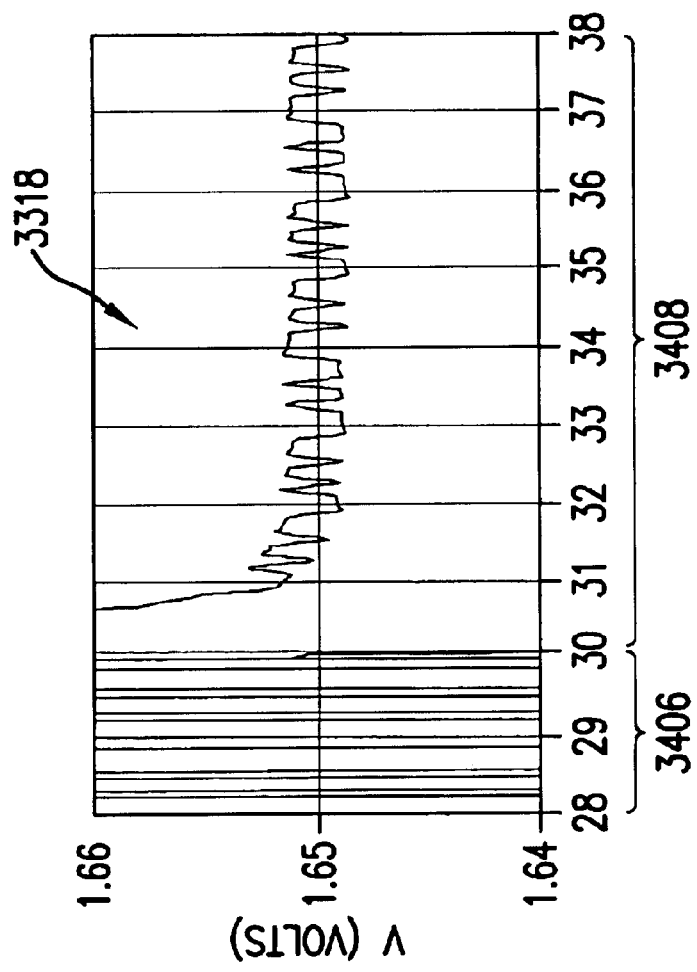

FIGS. 38 and 39 show further detail of the filter module output signal shown in FIG. 37.

Figure 40:
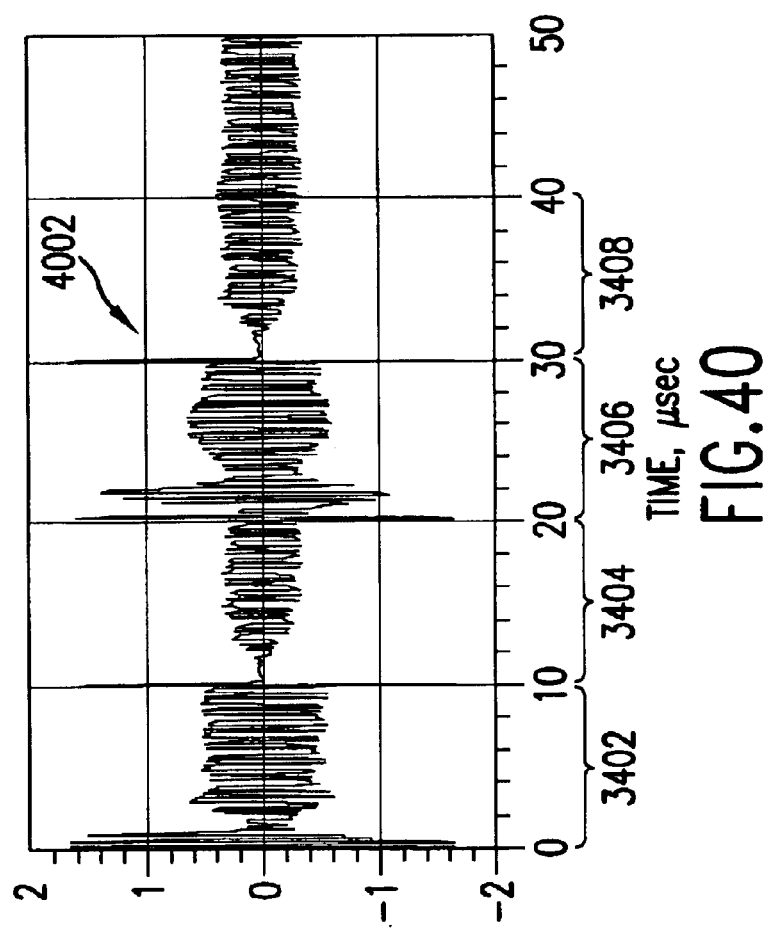

FIG. 40 shows an example AGC response waveform that converges simultaneously with DC offset acquisition, according to an embodiment of the present invention.

Figure 41:
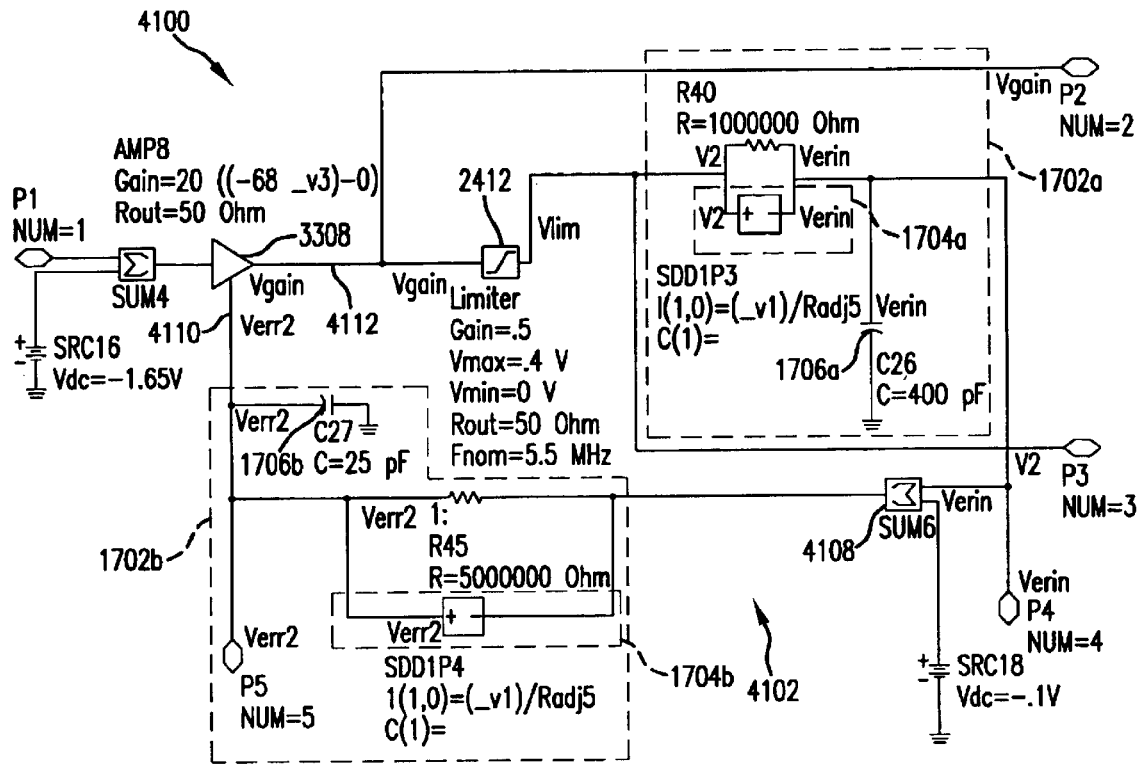

FIG. 41 shows an example simulation AGC circuit that generated the AGC response waveform shown in FIG. 40, according to an embodiment of the present invention.

Figure 42:
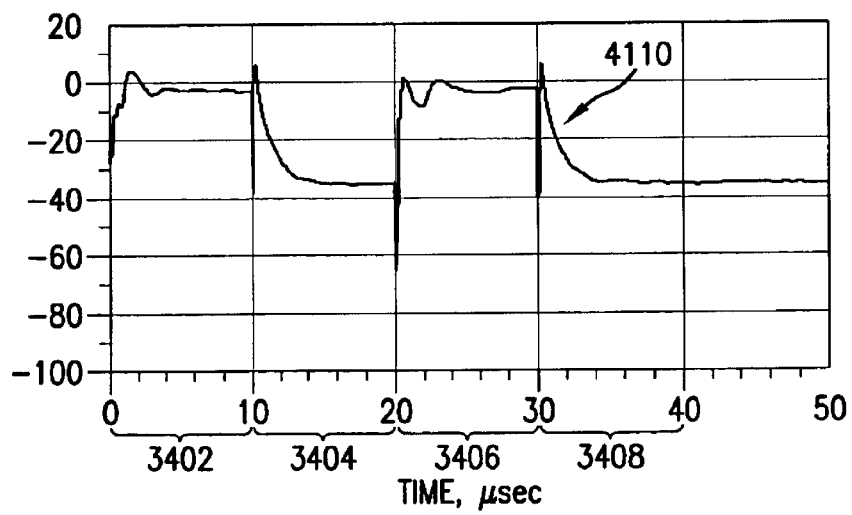

FIG. 42 illustrates an AGC control feedback signal related to the AGC circuit shown in FIG. 41.

Figure 43:
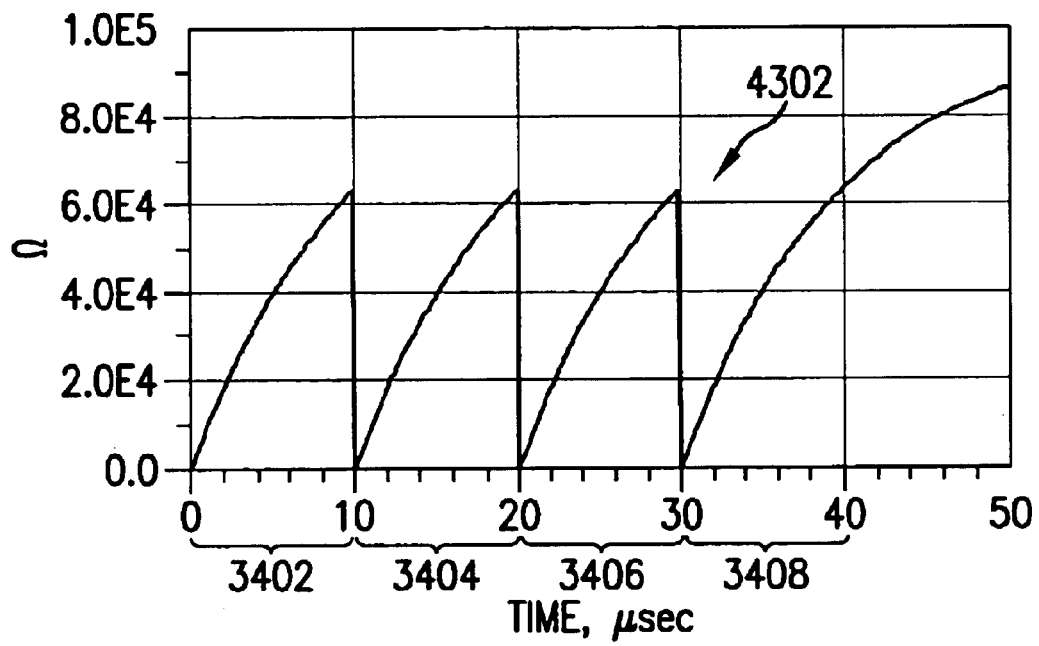

FIG. 43 illustrates a resistance waveform for variable resistors shown in FIG. 41.

Figure 44:
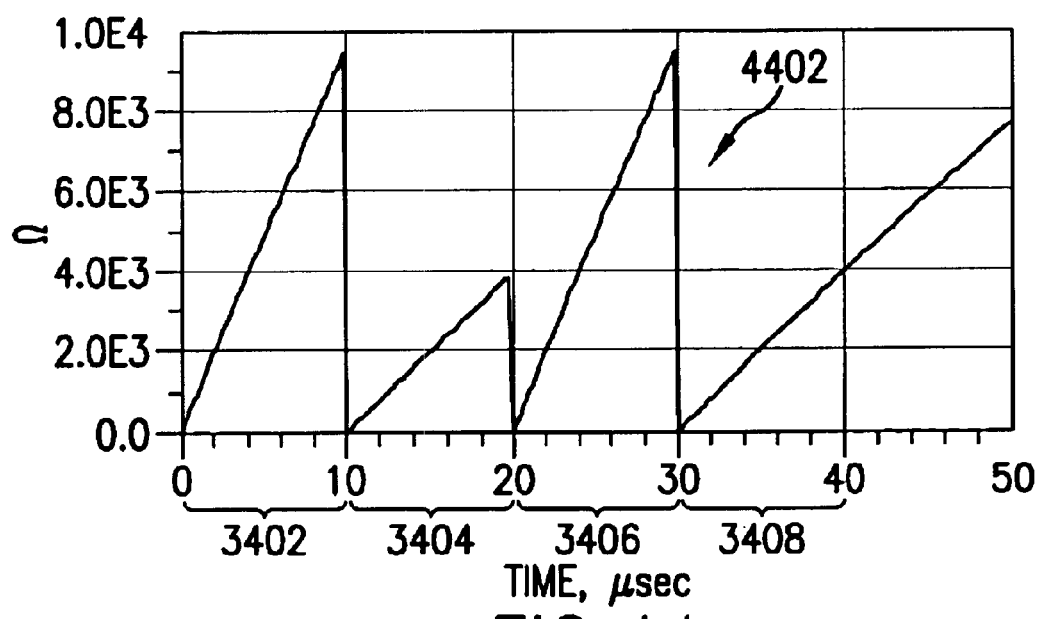

FIG. 44 shows a resistance waveform for an example variable resistor, having different time constants that correspond to different diversity time periods, according to an embodiment of the present invention.

Figure 45:
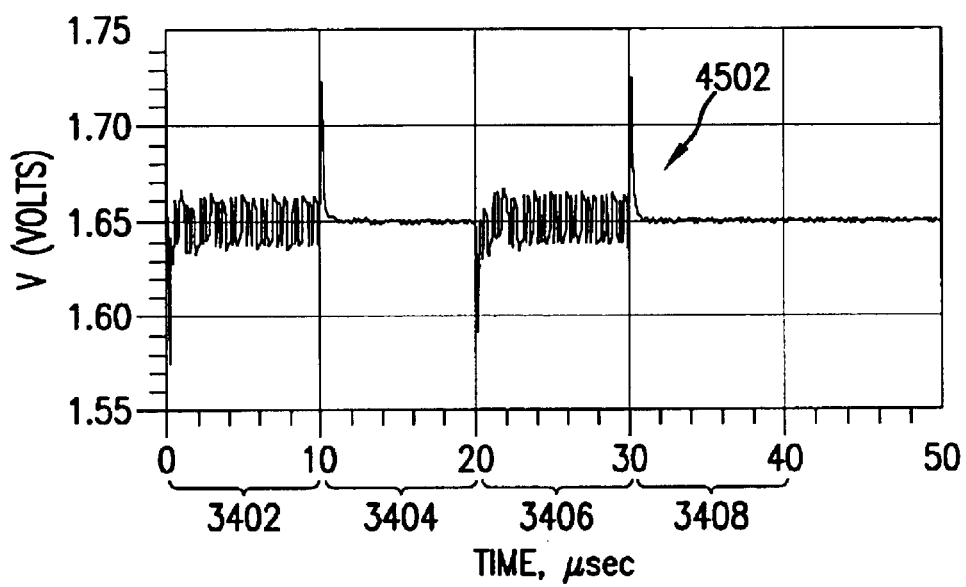

FIG. 45 illustrates a signal with reduced DC offset output from a filter module, according to an embodiment of the present invention.

Figure 46:
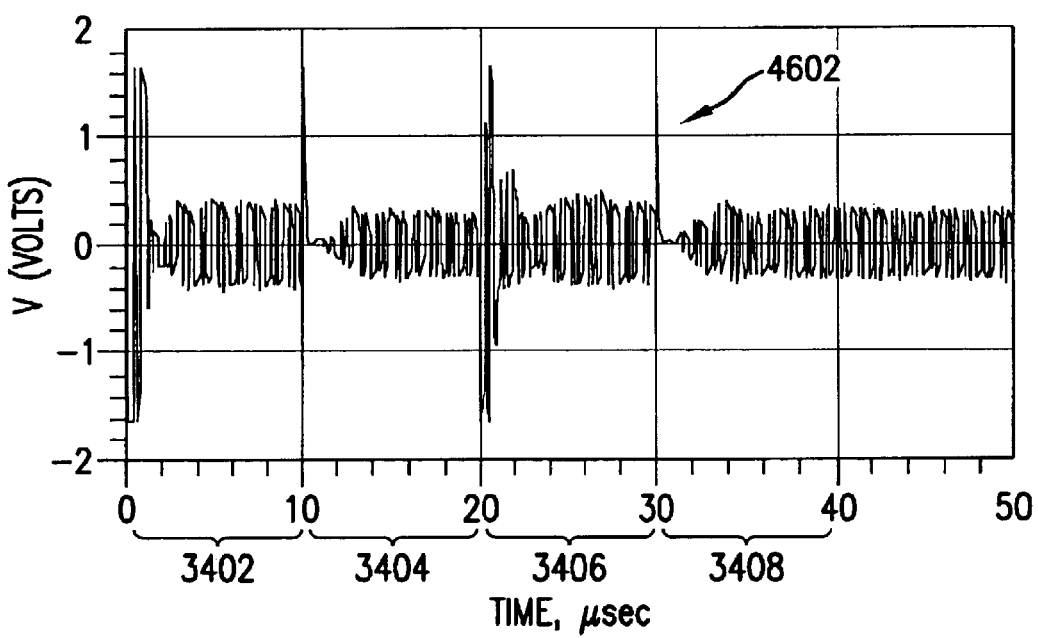

FIG. 46 shows an AGC output signal resulting from AGC amplification of the signal illustrated in FIG. 45.

FIGS. 47A–47D and 48A–48D show flowcharts relating to example operational embodiments of the present invention.

The present invention will now be described with reference to the accompanying drawings. In the drawings, like reference numbers generally indicate identical or functionally similar elements. Additionally, the left-most digit(s) of a reference number generally identifies the drawing in which the reference number first appears.

DETAILED DESCRIPTION OF THE INVENTION

Table of Contents
1. Introduction
2. Universal Frequency Translation
   2.1 Frequency Down-Conversion
   2.2 Optional Energy Transfer Signal Module
   2.3 Impedance Matching
   2.4 Frequency Up-Conversion
   2.5 Enhanced Signal Reception
   2.6 Unified Down-Conversion and Filtering
3. Example Down-Converter Embodiments of the Invention
   3.1 Receiver Embodiments
      3.1.1 In-Phase/Quadrature-Phase (I/Q) Modulation Mode Receiver Embodiments
4. DC Offset and Circuit Gain Considerations and Corrections
   4.1 Overview of DC Offset
   4.2 Exemplary Communications System Receiver Channel
   4.3 Filter Module Embodiments of the Present Invention
      4.3.1 Active Variable Resistor of the Present Invention
      4.3.2 Control Signal Embodiments
      4.3.3 Operational Embodiments of the Present Invention
      4.3.4 Example Filter Module Applications
         4.3.4.1 Example Receiver Channel Application
         4.3.4.2 Example AGC Feedback Path Applications
5. Conclusion 1. Introduction The present invention is directed to the down-conversion and up-conversion of an electromagnetic signal using a universal frequency translation (UFT) module, transforms for same, and applications thereof. The systems described herein each may include one or more receivers, transmitters, and/or transceivers. According to embodiments of the invention, at least some of these receivers, transmitters, and/or transceivers are implemented using universal frequency translation (UFT) modules. The UFT modules perform frequency translation operations. Embodiments of the present invention are described below.

Systems that transmit and receive EM signals using UFT modules exhibit multiple advantages. These advantages include, but are not limited to, lower power consumption, longer power source life, fewer parts, lower cost, less tuning, and more effective signal transmission and reception. These systems can receive and transmit signals across a broad frequency range. The structure and operation of embodiments of the UFT module, and various applications of the same are described in detail in the following sections, and in the referenced documents.

2. Universal Frequency Translation

The present invention is related to frequency translation, and applications of same. Such applications include, but are not limited to, frequency down-conversion, frequency up-conversion, enhanced signal reception, unified down-conversion and filtering, and combinations and applications of same.

Figure 1A:
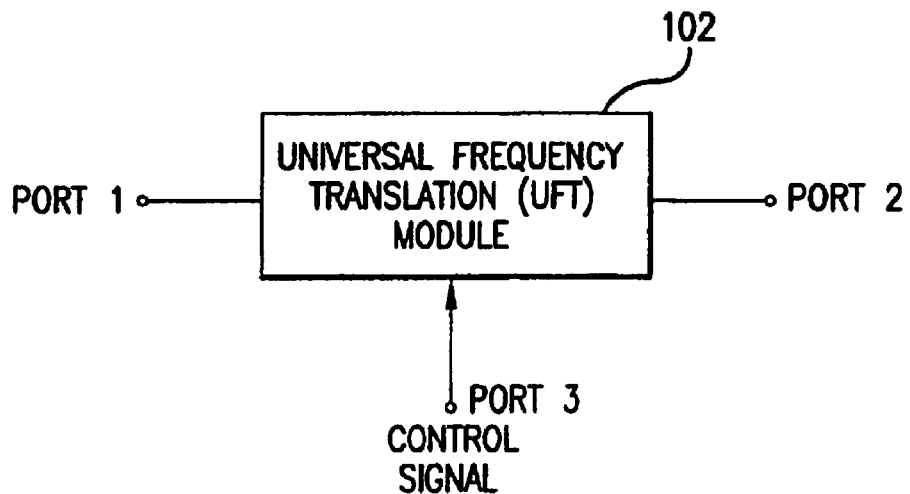
FIG. 1A is a block diagram of a universal frequency translation (UFT) module according to an embodiment of the invention.

FIG. 1A illustrates a universal frequency translation (UFT) module 102 according to embodiments of the invention. (The UFT module is also sometimes called a universal frequency translator, or a universal translator.)

As indicated by the example of FIG. 1A, some embodiments of the UFT module 102 include three ports (nodes), designated in FIG. 1A as Port 1, Port 2, and Port 3. Other UFT embodiments include other than three ports.

Generally, the UFT module 102 (perhaps in combination with other components) operates to generate an output signal from an input signal, where the frequency of the output signal differs from the frequency of the input signal. In other words, the UFT module 102 (and perhaps other components) operates to generate the output signal from the input signal by translating the frequency (and perhaps other characteristics) of the input signal to the frequency (and perhaps other characteristics) of the output signal.

Figure 1B:
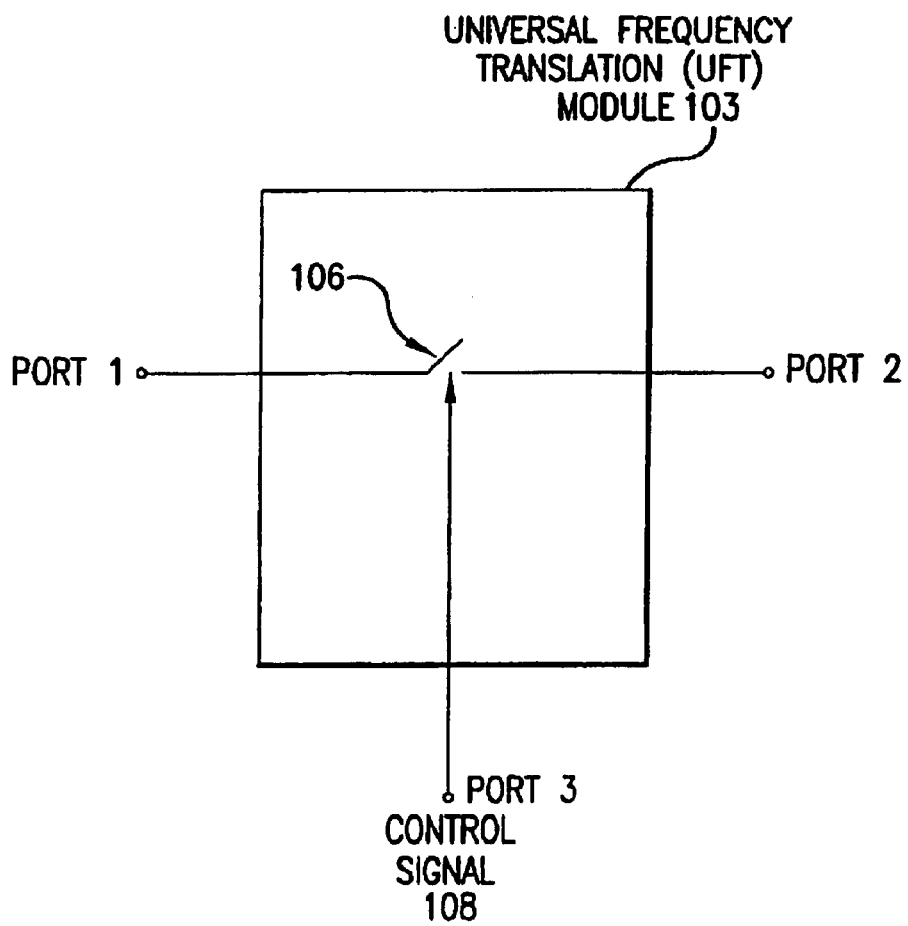
FIG. 1B is a more detailed diagram of a universal frequency translation (UFT) module according to an embodiment of the invention.

An example embodiment of the UFT module 103 is generally illustrated in FIG. 1B. Generally, the UFT module 103 includes a switch 106 controlled by a control signal 108. The switch 106 is said to be a controlled switch.

Figure 2:
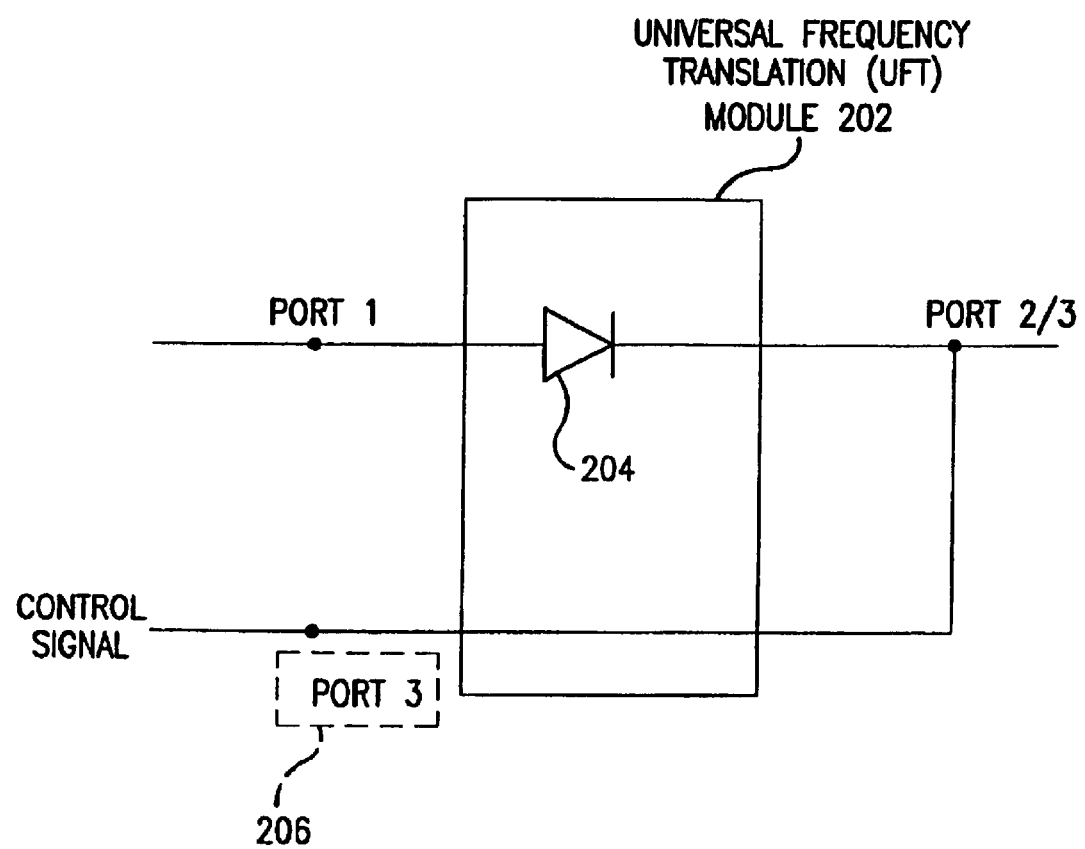
FIG. 2 is a block diagram of a universal frequency translation (UFT) module according to an alternative embodiment of the invention.

As noted above, some UFT embodiments include other than three ports. For example, and without limitation, FIG. 2 illustrates an example UFT module 202. The example UFT module 202 includes a diode 204 having two ports, designated as Port 1 and Port 2/3. This embodiment does not include a third port, as indicated by the dotted line around the "Port 3" label. Other embodiments, as described herein, have more than three ports.

The UFT module is a very powerful and flexible device. Its flexibility is illustrated, in part, by the wide range of applications in which it can be used. Its power is illustrated, in part, by the usefulness and performance of such applications.

Figure 1C:
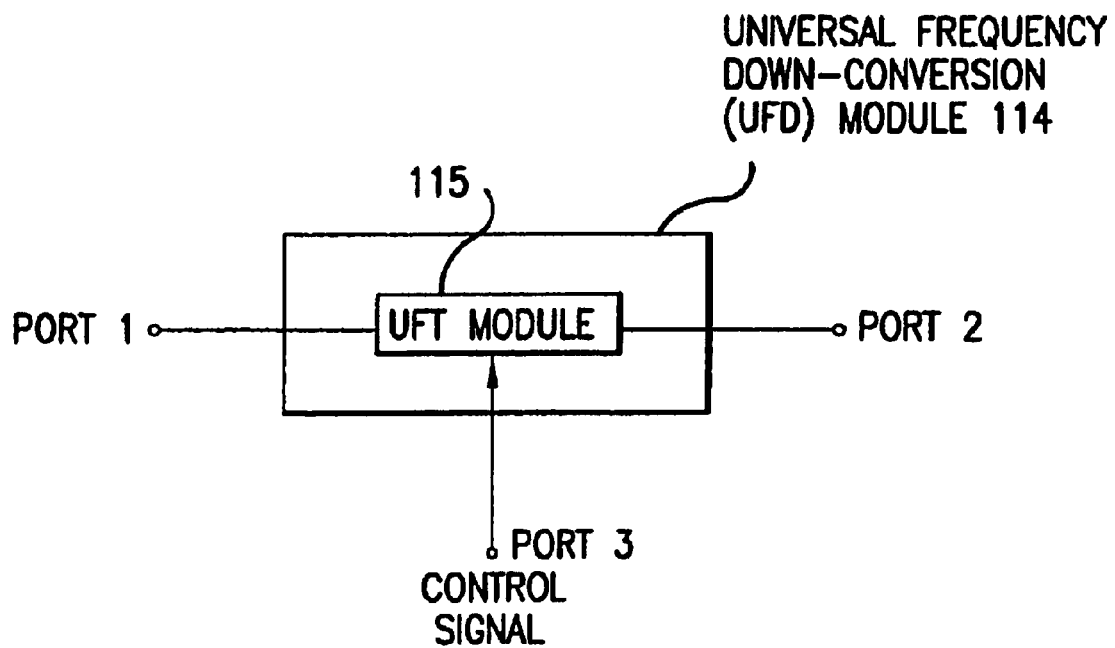
FIG. 1C illustrates a UFT module used in a universal frequency down-conversion (UFD) module according to an embodiment of the invention.

For example, a UFT module 115 can be used in a universal frequency down-conversion (UFD) module 114, an example of which is shown in FIG. 1C. In this capacity, the UFT module 115 frequency down-converts an input signal to an output signal.

Figure 1D:
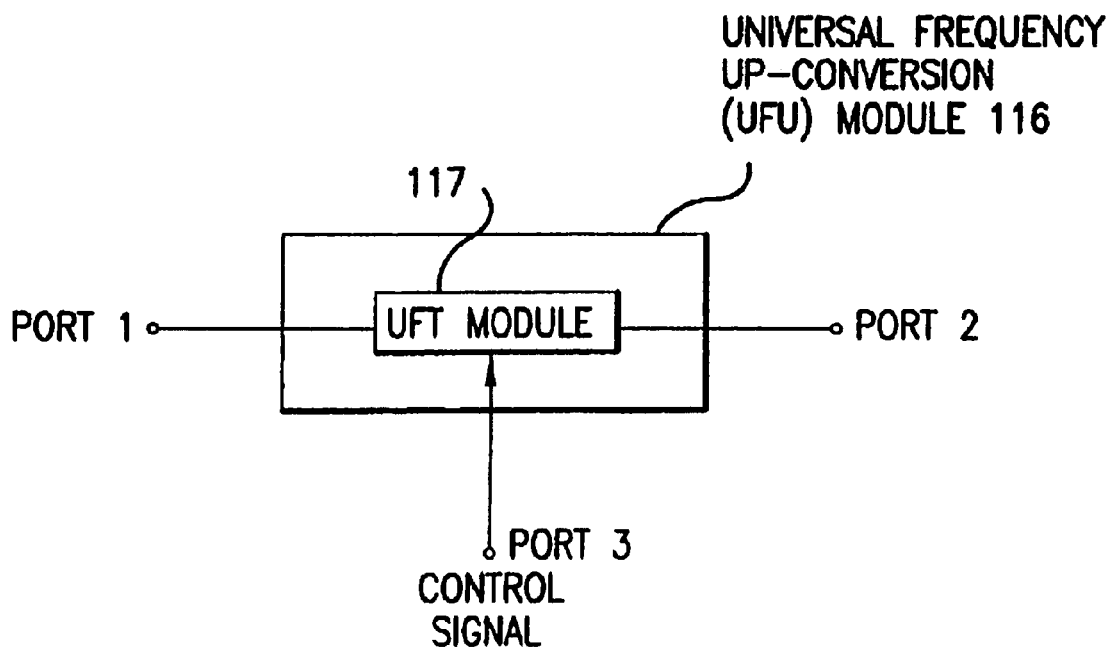
FIG. 1D illustrates a UFT module used in a universal frequency up-conversion (UFU) module according to an embodiment of the invention.

As another example, as shown in FIG. 1D, a UFT module 117 can be used in a universal frequency up-conversion (UFU) module 116. In this capacity, the UFT module 117 frequency up-converts an input signal to an output signal.

These and other applications of the UFT module are described below. Additional applications of the UFT module will be apparent to persons skilled in the relevant art(s) based on the teachings contained herein. In some applications, the UFT module is a required component. In other applications, the UFT module is an optional component.

2.1 Frequency Down-Conversion

The present invention is directed to systems and methods of universal frequency down-conversion, and applications of same.

In particular, the following discussion describes down-converting using a Universal Frequency Translation Module. The down-conversion of an EM signal by aliasing the EM signal at an aliasing rate is fully described in U.S. Pat. No. 6,061,551 entitled "Method and System for Down-Converting Electromagnetic Signals," the full disclosure of which is incorporated herein by reference. A relevant portion of the above-mentioned patent is summarized below to describe down-converting an input signal to produce a down-converted signal that exists at a lower frequency or a baseband signal. The frequency translation aspects of the invention are further described in other documents referenced above, such as application Ser. No. 09/550,644, entitled "Method and System for Down-converting an Electromagnetic Signal, and Transforms for Same, and Aperture Relationships."

Figure 3A:
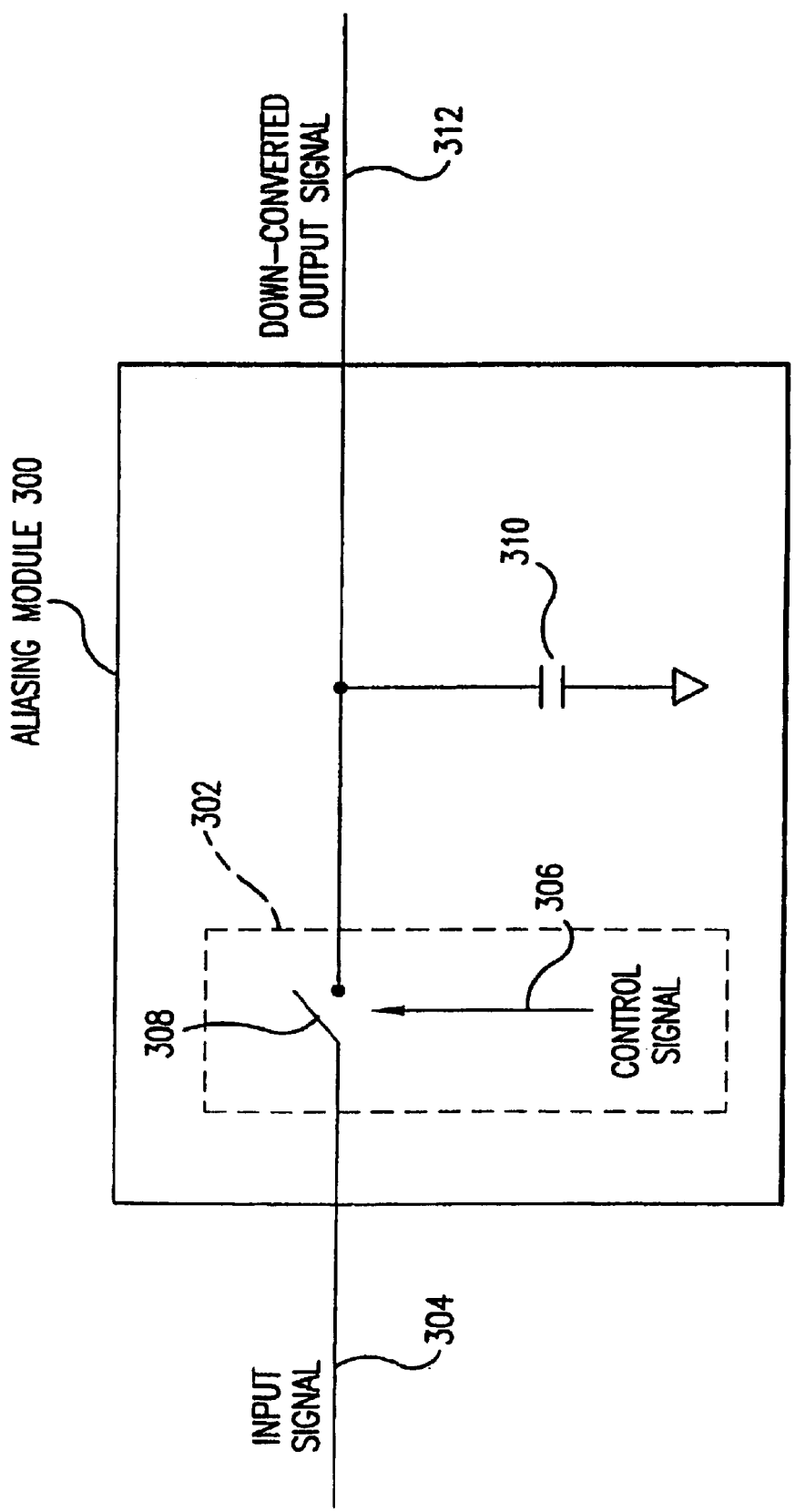
FIGS. 3A and 3G are example aliasing modules according to embodiments of the invention.
Figure 3B:
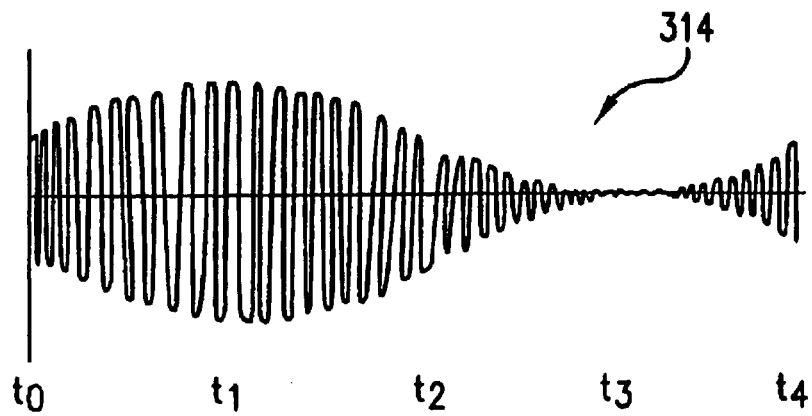
FIGS. 3B–3F are example waveforms used to describe the operation of the aliasing modules of FIGS. 3A and 3G.
Figure 3C:
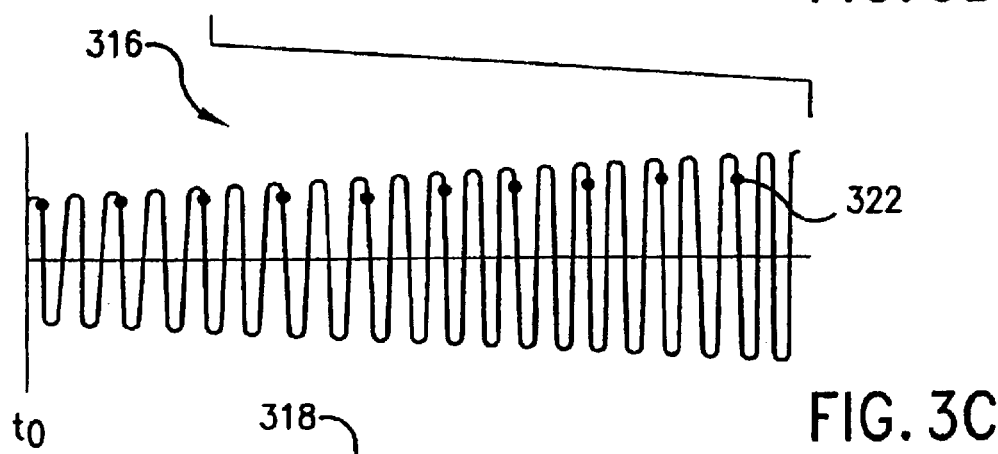

FIG. 3A illustrates an aliasing module 300 for down-conversion using a universal frequency translation (UFT) module 302 which down-converts an EM input signal 304. In particular embodiments, aliasing module 300 includes a switch 308 and a capacitor 310 (or integrator). (In embodiments, the UFT module is considered to include the switch and integrator.) The electronic alignment of the circuit components is flexible. That is, in one implementation, the switch 308 is in series with input signal 304 and capacitor 310 is shunted to ground (although it may be other than ground in configurations such as differential mode). In a second implementation (see FIG. 3G), the capacitor 310 is in series with the input signal 304 and the switch 308 is shunted to ground (although it may be other than ground in configurations such as differential mode). Aliasing module 300 with UFT module 302 can be tailored to down-convert a wide variety of electromagnetic signals using aliasing frequencies that are well below the frequencies of the EM input signal 304.

In one implementation, aliasing module 300 down-converts the input signal 304 to an intermediate frequency (IF) signal. In another implementation, the aliasing module 300 down-converts the input signal 304 to a demodulated baseband signal. In yet another implementation, the input signal 304 is a frequency modulated (FM) signal, and the aliasing module 300 down-converts it to a non-FM signal, such as a phase modulated (PM) signal or an amplitude modulated (AM) signal. Each of the above implementations is described below.

In an embodiment, the control signal 306 includes a train of pulses that repeat at an aliasing rate that is equal to, or less than, twice the frequency of the input signal 304. In this embodiment, the control signal 306 is referred to herein as an aliasing signal because it is below the Nyquist rate for the frequency of the input signal 304. Preferably, the frequency of control signal 306 is much less than the input signal 304.

Figure 3D:
Figure 3E:
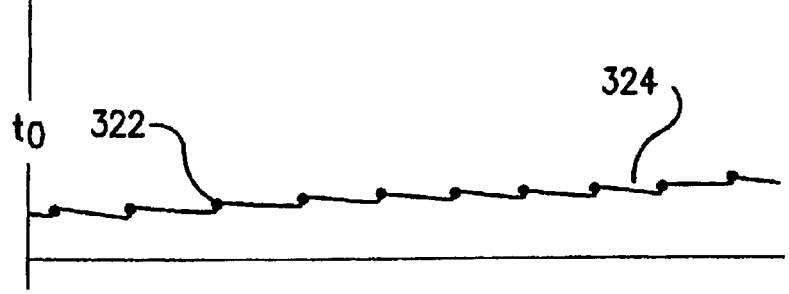

A train of pulses 318 as shown in FIG. 3D controls the switch 308 to alias the input signal 304 with the control signal 306 to generate a down-converted output signal 312. More specifically, in an embodiment, switch 308 closes on a first edge of each pulse 320 of FIG. 3D and opens on a second edge of each pulse. When the switch 308 is closed, the input signal 304 is coupled to the capacitor 310, and charge is transferred from the input signal to the capacitor 310. The charge stored during successive pulses forms down-converted output signal 312.

Exemplary waveforms are shown in FIGS. 3B–3F.

FIG. 3B illustrates an analog amplitude modulated (AM) carrier signal 314 that is an example of input signal 304. For illustrative purposes, in FIG. 3C, an analog AM carrier signal portion 316 illustrates a portion of the analog AM carrier signal 314 on an expanded time scale. The analog AM carrier signal portion 316 illustrates the analog AM carrier signal 314 from time $t_0$ to time $t_1$.

FIG. 3D illustrates an exemplary aliasing signal 318 that is an example of control signal 306. Aliasing signal 318 is on approximately the same time scale as the analog AM carrier signal portion 316. In the example shown in FIG. 3D, the aliasing signal 318 includes a train of pulses 320 having negligible apertures that tend towards zero (the invention is not limited to this embodiment, as discussed below). The pulse aperture may also be referred to as the pulse width as will be understood by those skilled in the art(s). The pulses 320 repeat at an aliasing rate, or pulse repetition rate of aliasing signal 318. The aliasing rate is determined as described below.

Figure 3F:
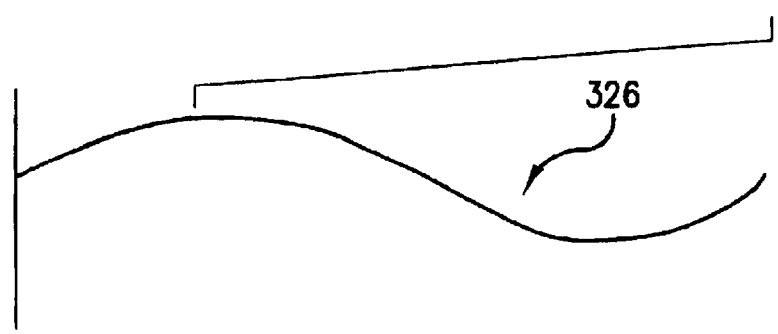
Figure 3G:
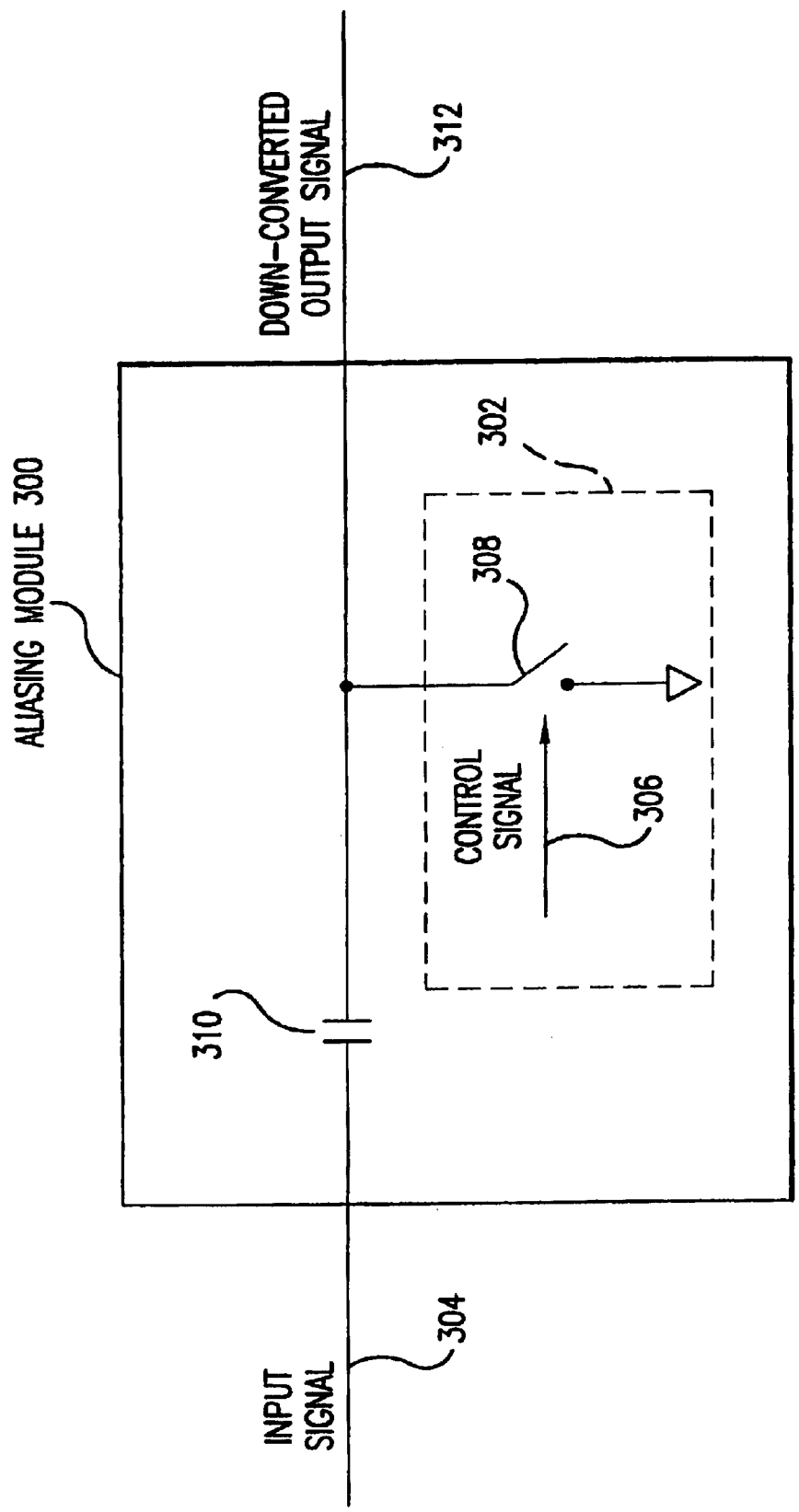

As noted above, the train of pulses 320 (i.e., control signal 306) control the switch 308 to alias the analog AM carrier signal 316 (i.e., input signal 304) at the aliasing rate of the aliasing signal 318. Specifically, in this embodiment, the switch 308 closes on a first edge of each pulse and opens on a second edge of each pulse. When the switch 308 is closed, input signal 304 is coupled to the capacitor 310, and charge is transferred from the input signal 304 to the capacitor 310. The charge transferred during a pulse is referred to herein as an under-sample. Exemplary under-samples 322 form down-converted signal portion 324 (FIG. 3E) that corresponds to the analog AM carrier signal portion 316 (FIG. 3C) and the train of pulses 320 (FIG. 3D). The charge stored during successive under-samples of AM carrier signal 314 form the down-converted signal 324 (FIG. 3E) that is an example of down-converted output signal 312 (FIG. 3A). In FIG. 3F, a demodulated baseband signal 326 represents the demodulated baseband signal 324 after filtering on a compressed time scale. As illustrated, down-converted signal 326 has substantially the same "amplitude envelope" as AM carrier signal 314. Therefore, FIGS. 3B–3F illustrate down-conversion of AM carrier signal 314.

The waveforms shown in FIGS. 3B–3F are discussed herein for illustrative purposes only, and are not limiting.

The aliasing rate of control signal 306 determines whether the input signal 304 is down-converted to an IF signal, down-converted to a demodulated baseband signal, or down-converted from an FM signal to a PM or an AM signal. Generally, relationships between the input signal 304, the aliasing rate of the control signal 306, and the down-converted output signal 312 are illustrated below:

(Freq. of input signal 304)=$n \cdot$(Freq. of control signal 306)±(Freq. of down-converted output signal 312)

For the examples contained herein, only the "+" condition will be discussed. Example values of n include, but are not limited to, n={0.5, 1, 2, 3, 4, . . . }.

When the aliasing rate of control signal 306 is off-set from the frequency of input signal 304, or off-set from a harmonic or sub-harmonic thereof, input signal 304 is down-converted to an IF signal. This is because the under-sampling pulses occur at different phases of subsequent cycles of input signal 304. As a result, the under-samples form a lower frequency oscillating pattern. If the input signal 304 includes lower frequency changes, such as amplitude, frequency, phase, etc., or any combination thereof, the charge stored during associated under-samples reflects the lower frequency changes, resulting in similar changes on the down-converted IF signal. For example, to down-convert a 901 MHZ input signal to a 1 MHZ IF signal, the frequency of the control signal 306 would be calculated as follows:

(Freq$_{input}$–Freq$_{IF}$)/$n$=Freq$_{control}$ (901 MHZ–1 MHZ)/$n$=900/$n$

For n={0.5, 1, 2, 3, 4, . . . }, the frequency of the control signal 306 would be substantially equal to 1.8 GHz, 900 MHZ, 450 MHZ, 300 MHZ, 225 MHZ, etc.

Alternatively, when the aliasing rate of the control signal 306 is substantially equal to the frequency of the input signal 304, or substantially equal to a harmonic or sub-harmonic thereof, input signal 304 is directly down-converted to a demodulated baseband signal. This is because, without modulation, the under-sampling pulses occur at the same point of subsequent cycles of the input signal 304. As a result, the under-samples form a constant output baseband signal. If the input signal 304 includes lower frequency changes, such as amplitude, frequency, phase, etc., or any combination thereof, the charge stored during associated under-samples reflects the lower frequency changes, resulting in similar changes on the demodulated baseband signal.

For example, to directly down-convert a 900 MHZ input signal to a demodulated baseband signal (i.e., zero IF), the frequency of the control signal 306 would be calculated as follows:

(Freq$_{input}$–Freq$_{IF}$)/$n$=Freq$_{control}$ (900 MHZ–0 MHZ)/$n$=900 MHZ/$n$ For n={0.5, 1, 2, 3, 4, . . . }, the frequency of the control signal 306 should be substantially equal to 1.8 GHz, 900 MHZ, 450 MHZ, 300 MHZ, 225 MHZ, etc.

Alternatively, to down-convert an input FM signal to a non-FM signal, a frequency within the FM bandwidth must be down-converted to baseband (i.e., zero IF). As an example, to down-convert a frequency shift keying (FSK) signal (a sub-set of FM) to a phase shift keying (PSK) signal (a subset of PM), the mid-point between a lower frequency $F_1$ and an upper frequency $F_2$ (that is, $[(F_1+F_2)\div 2]$) of the FSK signal is down-converted to zero IF. For example, to down-convert an FSK signal having $F_1$ equal to 899 MHZ and $F_2$ equal to 901 MHZ, to a PSK signal, the aliasing rate of the control signal 306 would be calculated as follows:

$$\text{Frequency of the input} = (F_1 + F_2) \div 2$$
$$= (899 \text{ MHZ} + 901 \text{ MHZ}) \div 2$$
$$= 900 \text{ MHZ}$$

Frequency of the down-converted signal=0 (i.e., baseband)

(Freq$_{input}$–Freq$_{IF}$)/$n$=Freq$_{control}$ (900 MHZ–0 MHZ)/$n$=900 MHZ/$n$ For n={0.5, 1, 2, 3, 4 . . . }, the frequency of the control signal 306 should be substantially equal to 1.8 GHz, 900 MHZ, 450 MHZ, 300 MHZ, 225 MHZ, etc. The frequency of the down-converted PSK signal is substantially equal to one half the difference between the lower frequency $F_1$ and the upper frequency $F_2$.

As another example, to down-convert a FSK signal to an amplitude shift keying (ASK) signal (a subset of AM), either the lower frequency $F_1$ or the upper frequency $F_2$ of the FSK signal is down-converted to zero IF. For example, to down-convert an FSK signal having $F_1$ equal to 900 MHZ and $F_2$ equal to 901 MHZ, to an ASK signal, the aliasing rate of the control signal 306 should be substantially equal to:

(900 MHZ–0 MHZ)/$n$=900 MHZ/$n$, or (901 MHZ–0 MHZ)/$n$=901 MHZ/$n$.

For the former case of 900 MHZ/n, and for n={0.5, 1, 2, 3, 4, . . . }, the frequency of the control signal 306 should be substantially equal to 1.8 GHz, 900 MHZ, 450 MHZ, 300 MHZ, 225 MHZ, etc. For the latter case of 901 MHZ/n, and for n={0.5, 1, 2, 3, 4, . . . }, the frequency of the control signal 306 should be substantially equal to 1.802 GHz, 901 MHZ, 450.5 MHZ, 300.333 MHZ, 225.25 MHZ, etc. The frequency of the down-converted AM signal is substantially equal to the difference between the lower frequency $F_1$ and the upper frequency $F_2$ (i.e., 1 MHZ).

In an embodiment, the pulses of the control signal 306 have negligible apertures that tend towards zero. This makes the UFT module 302 a high input impedance device. This configuration is useful for situations where minimal disturbance of the input signal may be desired.

In another embodiment, the pulses of the control signal 306 have non-negligible apertures that tend away from zero. This makes the UFT module 302 a lower input impedance device. This allows the lower input impedance of the UFT module 302 to be substantially matched with a source impedance of the input signal 304. This also improves the energy transfer from the input signal 304 to the down-converted output signal 312, and hence the efficiency and signal to noise (s/n) ratio of UFT module 302.

Exemplary systems and methods for generating and optimizing the control signal 306 and for otherwise improving energy transfer and s/n ratio, are disclosed in U.S. Pat. No. 6,061,551 entitled "Method and System for Down-Converting Electromagnetic Signals," as well as U.S. Ser. No. 09/550,644, "Method and System for Down-converting an Electromagnetic Signal, and Transforms for Same, and Aperture Relationships," filed Apr. 14, 2000.

When the pulses of the control signal 306 have non-negligible apertures, the aliasing module 300 is referred to interchangeably herein as an energy transfer module or a gated transfer module, and the control signal 306 is referred to as an energy transfer signal. Exemplary systems and methods for generating and optimizing the control signal 306 and for otherwise improving energy transfer and/or signal to noise ratio in an energy transfer module are described below.

2.2 Optional Energy Transfer Signal Module

Figure 4:
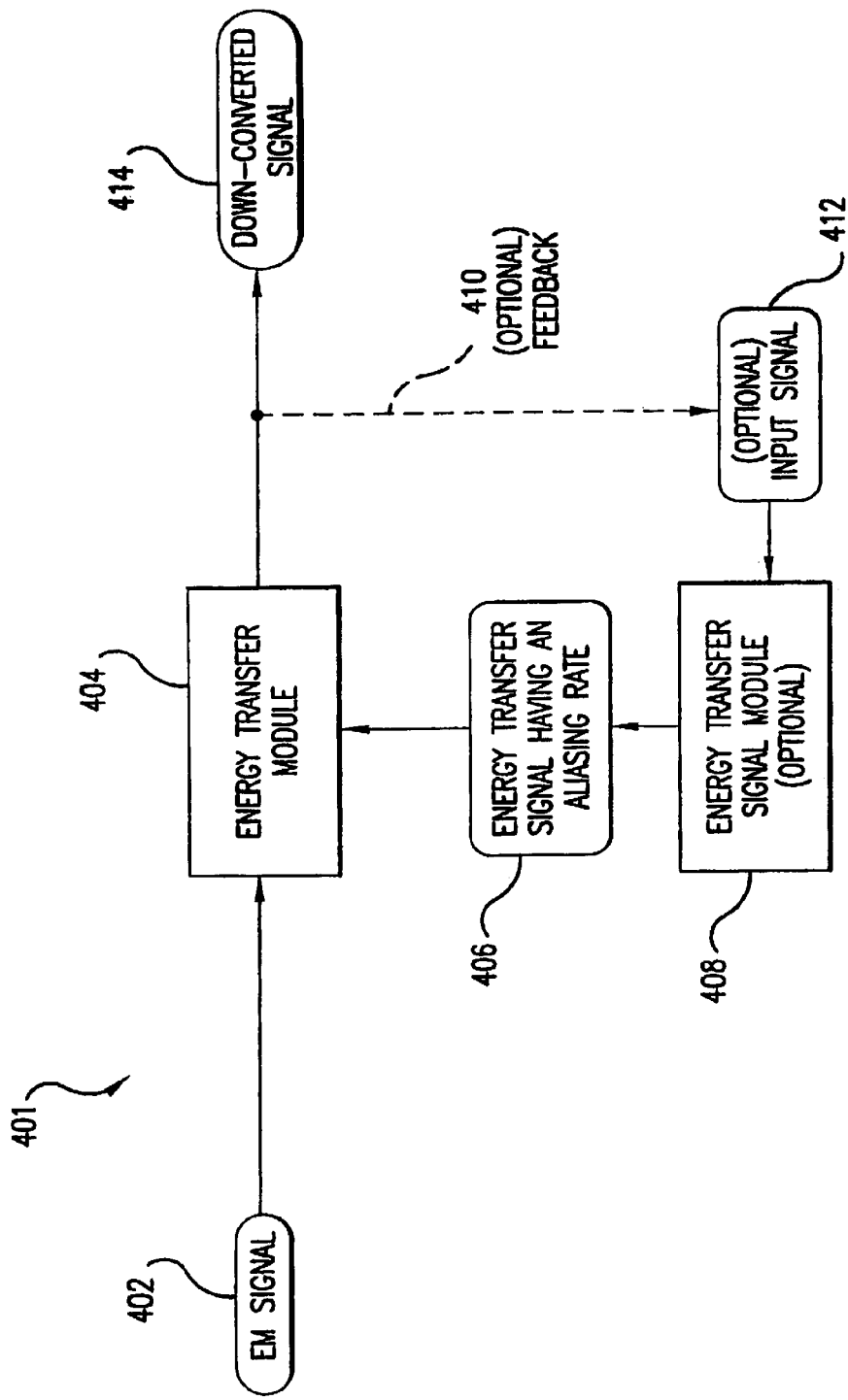
FIG. 4 illustrates an energy transfer system with an optional energy transfer signal module according to an embodiment of the invention.

FIG. 4 illustrates an energy transfer system 401 that includes an optional energy transfer signal module 408, which can perform any of a variety of functions or combinations of functions including, but not limited to, generating the energy transfer signal 406.

Figure 5:
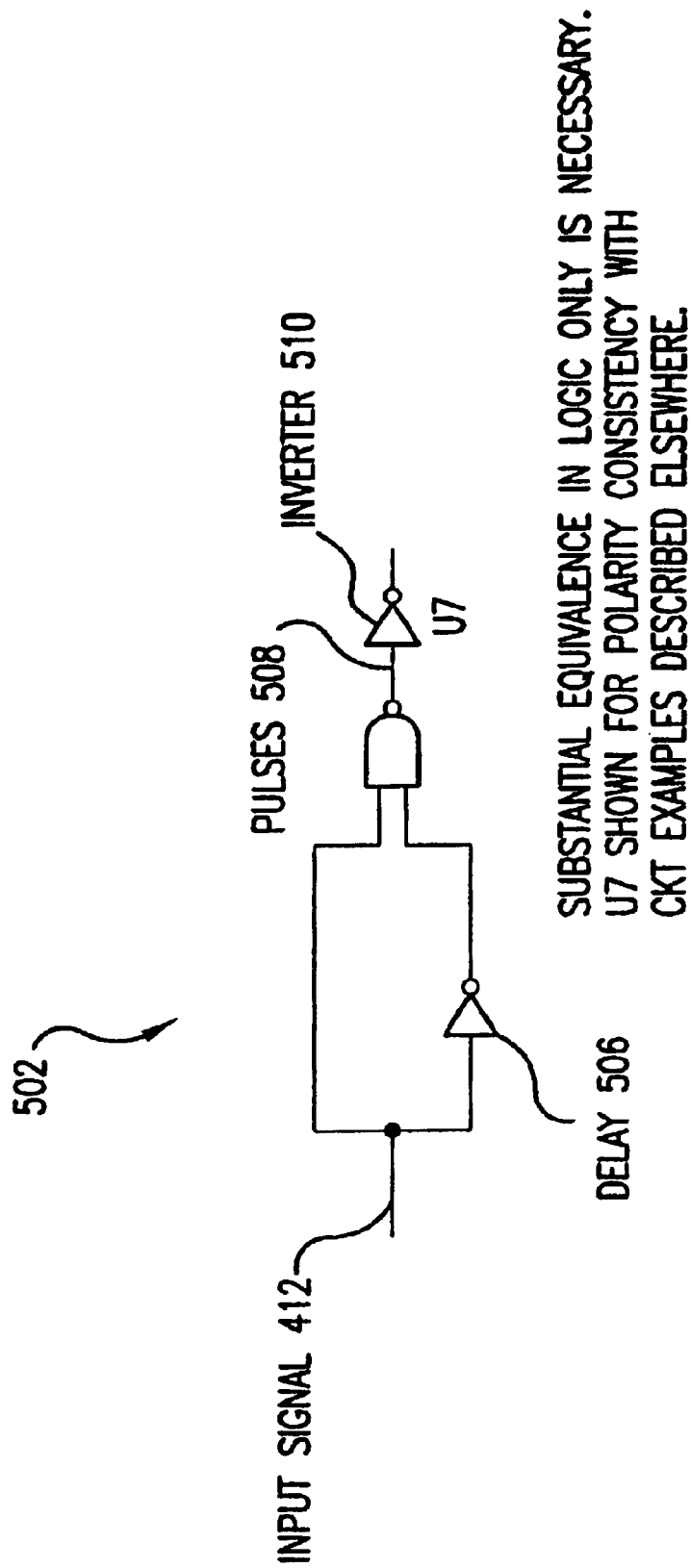
FIG. 5 illustrates an example aperture generator.

In an embodiment, the optional energy transfer signal module 408 includes an aperture generator, an example of which is illustrated in FIG. 5 as an aperture generator 502. The aperture generator 502 generates non-negligible aperture pulses 508 from an input signal 412. The input signal 412 can be any type of periodic signal, including, but not limited to, a sinusoid, a square wave, a saw-tooth wave, etc. Systems for generating the input signal 412 are described below.

The width or aperture of the pulses 508 is determined by delay through the branch 506 of the aperture generator 502. Generally, as the desired pulse width increases, the difficulty in meeting the requirements of the aperture generator 502 decrease (i.e., the aperture generator is easier to implement). In other words, to generate non-negligible aperture pulses for a given EM input frequency, the components utilized in the example aperture generator 502 do not require reaction times as fast as those that are required in an under-sampling system operating with the same EM input frequency.

The example logic and implementation shown in the aperture generator 502 are provided for illustrative purposes only, and are not limiting. The actual logic employed can take many forms. The example aperture generator 502 includes an optional inverter 510, which is shown for polarity consistency with other examples provided herein.

Figure 6A:
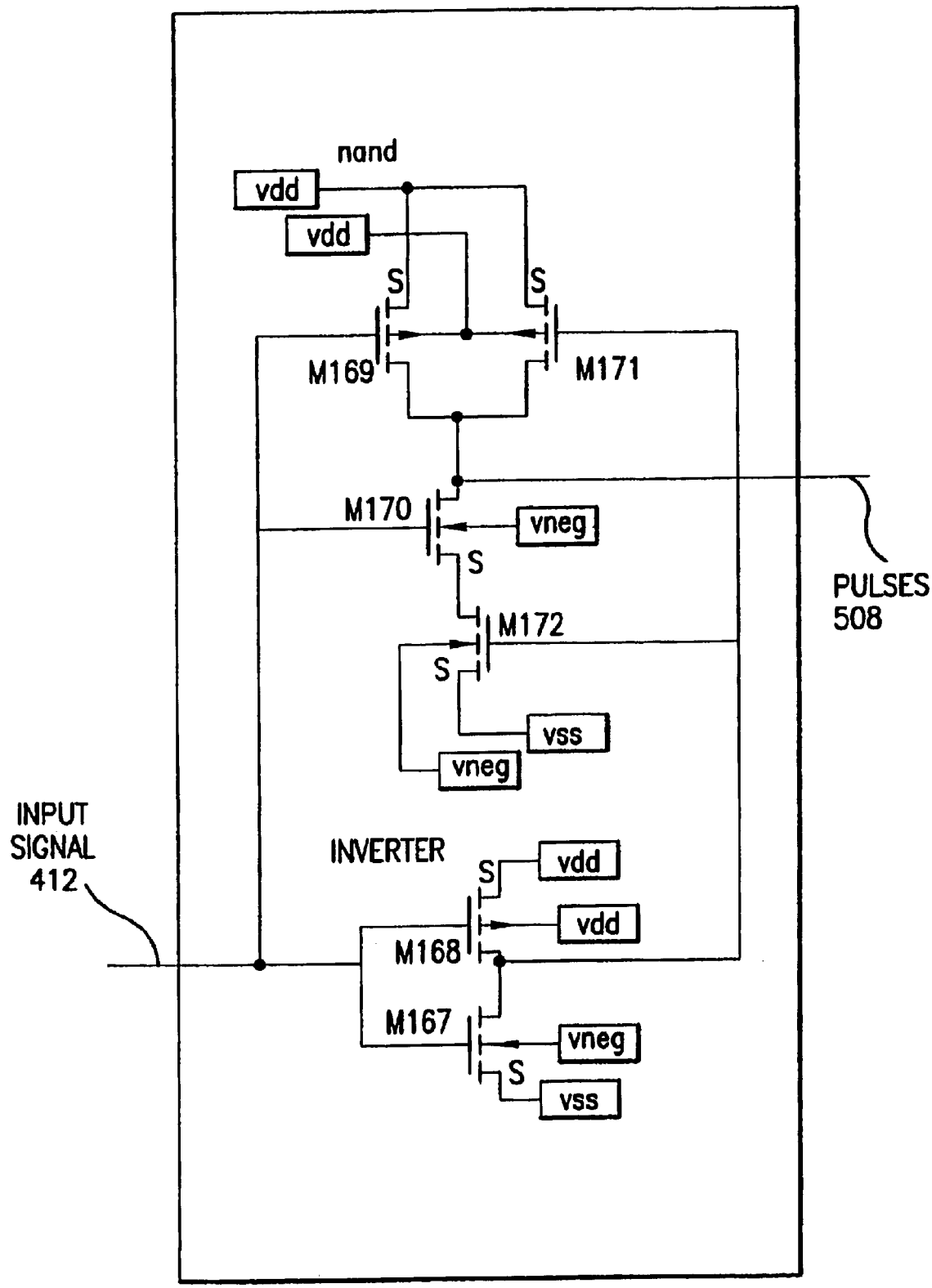
FIG. 6A illustrates an example aperture generator.

An example implementation of the aperture generator 502 is illustrated in FIG. 6A. Additional examples of aperture generation logic are provided in FIGS. 7A and 7B. FIG. 7A illustrates a rising edge pulse generator 702, which generates pulses 508 on rising edges of the input signal 412. FIG. 7B illustrates a falling edge pulse generator 704, which generates pulses 508 on falling edges of the input signal 412. These circuits are provided for example only, and do not limit the invention.

Figure 6B:
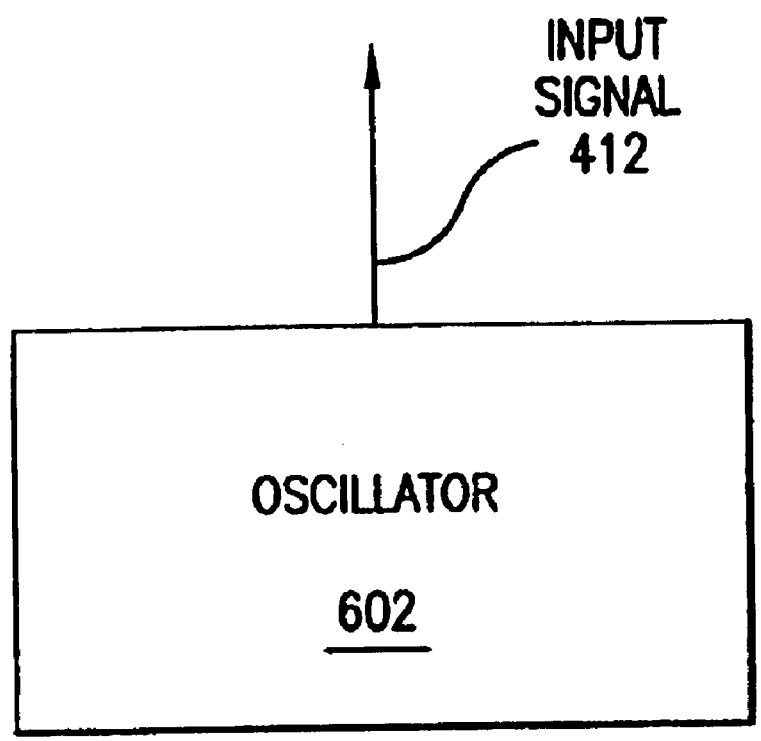
FIG. 6B illustrates an oscillator according to an embodiment of the present invention.

In an embodiment, the input signal 412 is generated externally of the energy transfer signal module 408, as illustrated in FIG. 4. Alternatively, the input signal 412 is generated internally by the energy transfer signal module 408. The input signal 412 can be generated by an oscillator, as illustrated in FIG. 6B by an oscillator 602. The oscillator 602 can be internal to the energy transfer signal module 408 or external to the energy transfer signal module 408. The oscillator 602 can be external to the energy transfer system 401. The output of the oscillator 602 may be any periodic waveform.

The type of down-conversion performed by the energy transfer system 401 depends upon the aliasing rate of the energy transfer signal 406, which is determined by the frequency of the pulses 508. The frequency of the pulses 508 is determined by the frequency of the input signal 412.

The optional energy transfer signal module 408 can be implemented in hardware, software, firmware, or any combination thereof.

2.3 Impedance Matching

The example energy transfer module 300 described in reference to FIG. 3A, above, has input and output impedances generally defined by (1) the duty cycle of the switch module (i.e., UFT 302), and (2) the impedance of the storage module (e.g., capacitor 310), at the frequencies of interest (e.g. at the EM input, and intermediate/baseband frequencies).

Starting with an aperture width of approximately ½ the period of the EM signal being down-converted as an example embodiment, this aperture width (e.g. the "closed time") can be decreased (or increased). As the aperture width is decreased, the characteristic impedance at the input and the output of the energy transfer module increases. Alternatively, as the aperture width increases from ½ the period of the EM signal being down-converted, the impedance of the energy transfer module decreases.

One of the steps in determining the characteristic input impedance of the energy transfer module could be to measure its value. In an embodiment, the energy transfer module's characteristic input impedance is 300 ohms. An impedance matching circuit can be utilized to efficiently couple an input EM signal that has a source impedance of, for example, 50 ohms, with the energy transfer module's impedance of, for example, 300 ohms. Matching these impedances can be accomplished in various manners, including providing the necessary impedance directly or the use of an impedance match circuit as described below.

Referring to FIG. 8, a specific example embodiment using an RF signal as an input, assuming that the impedance 812 is a relatively low impedance of approximately 50 Ohms, for example, and the input impedance 816 is approximately 300 Ohms, an initial configuration for the input impedance match module 806 can include an inductor 906 and a capacitor 908, configured as shown in FIG. 9. The configuration of the inductor 906 and the capacitor 908 is a possible configuration when going from a low impedance to a high impedance. Inductor 906 and the capacitor 908 constitute an L match, the calculation of the values which is well known to those skilled in the relevant arts.

The output characteristic impedance can be impedance matched to take into consideration the desired output frequencies. One of the steps in determining the characteristic output impedance of the energy transfer module could be to measure its value. Balancing the very low impedance of the storage module at the input EM frequency, the storage module should have an impedance at the desired output frequencies that is preferably greater than or equal to the load that is intended to be driven (for example, in an embodiment, storage module impedance at a desired 1 MHz output frequency is 2K ohm and the desired load to be driven is 50 ohms). An additional benefit of impedance matching is that filtering of unwanted signals can also be accomplished with the same components.

In an embodiment, the energy transfer module's characteristic output impedance is 2K ohms. An impedance matching circuit can be utilized to efficiently couple the down-converted signal with an output impedance of, for example, 2K ohms, to a load of, for example, 50 ohms. Matching these impedances can be accomplished in various manners, including providing the necessary load impedance directly or the use of an impedance match circuit as described below.

When matching from a high impedance to a low impedance, a capacitor 914 and an inductor 916 can be configured as shown in FIG. 9. The capacitor 914 and the inductor 916 constitute an L match, the calculation of the component values being well known to those skilled in the relevant arts.

The configuration of the input impedance match module 806 and the output impedance match module 808 are considered in embodiments to be initial starting points for impedance matching, in accordance with embodiments of the present invention. In some situations, the initial designs may be suitable without further optimization. In other situations, the initial designs can be enhanced in accordance with other various design criteria and considerations.

As other optional optimizing structures and/or components are utilized, their affect on the characteristic impedance of the energy transfer module should be taken into account in the match along with their own original criteria.

2.4 Frequency Up-Conversion

The present invention is directed to systems and methods of frequency up-conversion, and applications of same.

An example frequency up-conversion system 1000 is illustrated in FIG. 10. The frequency up-conversion system 1000 is now described.

An input signal 1002 (designated as "Control Signal" in FIG. 10) is accepted by a switch module 1004. For purposes of example only, assume that the input signal 1002 is a FM input signal 1306, an example of which is shown in FIG. 13C. FM input signal 1306 may have been generated by modulating information signal 1302 onto oscillating signal 1304 (FIGS. 13A and 13B). It should be understood that the invention is not limited to this embodiment. The information signal 1302 can be analog, digital, or any combination thereof, and any modulation scheme can be used.

The output of switch module 1004 is a harmonically rich signal 1006, shown for example in FIG. 13D as a harmonically rich signal 1308. The harmonically rich signal 1308 has a continuous and periodic waveform.

FIG. 13E is an expanded view of two sections of harmonically rich signal 1308, section 1310 and section 1312. The harmonically rich signal 1308 may be a rectangular wave, such as a square wave or a pulse (although, the invention is not limited to this embodiment). For ease of discussion, the term "rectangular waveform" is used to refer to waveforms that are substantially rectangular. In a similar manner, the term "square wave" refers to those waveforms that are substantially square and it is not the intent of the present invention that a perfect square wave be generated or needed.

Harmonically rich signal 1308 is comprised of a plurality of sinusoidal waves whose frequencies are integer multiples of the fundamental frequency of the waveform of the harmonically rich signal 1308. These sinusoidal waves are referred to as the harmonics of the underlying waveform, and the fundamental frequency is referred to as the first harmonic. FIG. 13F and FIG. 13G show separately the sinusoidal components making up the first, third, and fifth harmonics of section 1310 and section 1312. (Note that in theory there may be an infinite number of harmonics; in this example, because harmonically rich signal 1308 is shown as a square wave, there are only odd harmonics). Three harmonics are shown simultaneously (but not summed) in FIG. 13H.

The relative amplitudes of the harmonics are generally a function of the relative widths of the pulses of harmonically rich signal 1006 and the period of the fundamental frequency, and can be determined by doing a Fourier analysis of harmonically rich signal 1006. According to an embodiment of the invention, the input signal 1306 may be shaped to ensure that the amplitude of the desired harmonic is sufficient for its intended use (e.g., transmission).

An optional filter 1008 filters out any undesired frequencies (harmonics), and outputs an electromagnetic (EM) signal at the desired harmonic frequency or frequencies as an output signal 1010, shown for example as a filtered output signal 1314 in FIG. 13I.

FIG. 11 illustrates an example universal frequency up-conversion (UFU) module 1101. The UFU module 1101 includes an example switch module 1004, which comprises a bias signal 1102, a resistor or impedance 1104, a universal frequency translator (UFT) 1150, and a ground 1108. The UFT 1150 includes a switch 1106. The input signal 1002 (designated as "Control Signal" in FIG. 11) controls the switch 1106 in the UFT 1150, and causes it to close and open. Harmonically rich signal 1006 is generated at a node 1105 located between the resistor or impedance 1104 and the switch 1106.

Also in FIG. 11, it can be seen that an example optional filter 1008 is comprised of a capacitor 1110 and an inductor 1112 shunted to a ground 1114. The filter is designed to filter out the undesired harmonics of harmonically rich signal 1006.

The invention is not limited to the UFU embodiment shown in FIG. 11. For example, in an alternate embodiment shown in FIG. 12, an unshaped input signal 1201 is routed to a pulse shaping module 1202. The pulse shaping module 1202 modifies the unshaped input signal 1201 to generate a (modified) input signal 1002 (designated as the "Control Signal" in FIG. 12). The input signal 1002 is routed to the switch module 1004, which operates in the manner described above. Also, the filter 1008 of FIG. 12 operates in the manner described above.

The purpose of the pulse shaping module 1202 is to define the pulse width of the input signal 1002. Recall that the input signal 1002 controls the opening and closing of the switch 1106 in switch module 1004. During such operation, the pulse width of the input signal 1002 establishes the pulse width of the harmonically rich signal 1006. As stated above, the relative amplitudes of the harmonics of the harmonically rich signal 1006 are a function of at least the pulse width of the harmonically rich signal 1006. As such, the pulse width of the input signal 1002 contributes to setting the relative amplitudes of the harmonics of harmonically rich signal 1006.

Further details of up-conversion as described in this section are presented in U.S. Pat. No. 6,091,940, entitled "Method and System for Frequency Up-Conversion," incorporated herein by reference in its entirety.

2.5 Enhanced Signal Reception

The present invention is directed to systems and methods of enhanced signal reception (ESR), and applications of same, which are described in the above-referenced U.S. Pat.

No. 6,061,555, entitled "Method and System for Ensuring Reception of a Communications Signal," incorporated herein by reference in its entirety.

2.6 Unified Down-Conversion and Filtering

The present invention is directed to systems and methods of unified down-conversion and filtering (UDF), and applications of same.

In particular, the present invention includes a unified down-converting and filtering (UDF) module that performs frequency selectivity and frequency translation in a unified (i.e., integrated) manner. By operating in this manner, the invention achieves high frequency selectivity prior to frequency translation (the invention is not limited to this embodiment). The invention achieves high frequency selectivity at substantially any frequency, including but not limited to RF (radio frequency) and greater frequencies. It should be understood that the invention is not limited to this example of RF and greater frequencies. The invention is intended, adapted, and capable of working with lower than radio frequencies.

FIG. 14 is a conceptual block diagram of a UDF module 1402 according to an embodiment of the present invention. The UDF module 1402 performs at least frequency translation and frequency selectivity.

The effect achieved by the UDF module 1402 is to perform the frequency selectivity operation prior to the performance of the frequency translation operation. Thus, the UDF module 1402 effectively performs input filtering.

According to embodiments of the present invention, such input filtering involves a relatively narrow bandwidth. For example, such input filtering may represent channel select filtering, where the filter bandwidth may be, for example, 50 KHz to 150 KHz. It should be understood, however, that the invention is not limited to these frequencies. The invention is intended, adapted, and capable of achieving filter bandwidths of less than and greater than these values.

In embodiments of the invention, input signals 1404 received by the UDF module 1402 are at radio frequencies. The UDF module 1402 effectively operates to input filter these RF input signals 1404. Specifically, in these embodiments, the UDF module 1402 effectively performs input, channel select filtering of the RF input signal 1404. Accordingly, the invention achieves high selectivity at high frequencies.

The UDF module 1402 effectively performs various types of filtering, including but not limited to bandpass filtering, low pass filtering, high pass filtering, notch filtering, all pass filtering, band stop filtering, etc., and combinations thereof.

Conceptually, the UDF module 1402 includes a frequency translator 1408. The frequency translator 1408 conceptually represents that portion of the UDF module 1402 that performs frequency translation (down conversion).

The UDF module 1402 also conceptually includes an apparent input filter 1406 (also sometimes called an input filtering emulator). Conceptually, the apparent input filter 1406 represents that portion of the UDF module 1402 that performs input filtering.

In practice, the input filtering operation performed by the UDF module 1402 is integrated with the frequency translation operation. The input filtering operation can be viewed as being performed concurrently with the frequency translation operation. This is a reason why the input filter 1406 is herein referred to as an "apparent" input filter 1406.

The UDF module 1402 of the present invention includes a number of advantages. For example, high selectivity at high frequencies is realizable using the UDF module 1402.

This feature of the invention is evident by the high Q factors that are attainable. For example, and without limitation, the UDF module 1402 can be designed with a filter center frequency $f_c$ on the order of 900 MHZ, and a filter bandwidth on the order of 50 KHz. This represents a Q of 18,000 (Q is equal to the center frequency divided by the bandwidth).

It should be understood that the invention is not limited to filters with high Q factors. The filters contemplated by the present invention may have lesser or greater Qs, depending on the application, design, and/or implementation. Also, the scope of the invention includes filters where Q factor as discussed herein is not applicable.

The invention exhibits additional advantages. For example, the filtering center frequency $f_c$ of the UDF module 1402 can be electrically adjusted, either statically or dynamically.

Also, the UDF module 1402 can be designed to amplify input signals.

Further, the UDF module 1402 can be implemented without large resistors, capacitors, or inductors. Also, the UDF module 1402 does not require that tight tolerances be maintained on the values of its individual components, i.e., its resistors, capacitors, inductors, etc. As a result, the architecture of the UDF module 1402 is friendly to integrated circuit design techniques and processes.

The features and advantages exhibited by the UDF module 1402 are achieved at least in part by adopting a new technological paradigm with respect to frequency selectivity and translation. Specifically, according to the present invention, the UDF module 1402 performs the frequency selectivity operation and the frequency translation operation as a single, unified (integrated) operation. According to the invention, operations relating to frequency translation also contribute to the performance of frequency selectivity, and vice versa.

According to embodiments of the present invention, the UDF module generates an output signal from an input signal using samples/instances of the input signal and/or samples/instances of the output signal.

More particularly, first, the input signal is under-sampled. This input sample includes information (such as amplitude, phase, etc.) representative of the input signal existing at the time the sample was taken.

As described further below, the effect of repetitively performing this step is to translate the frequency (that is, down-convert) of the input signal to a desired lower frequency, such as an intermediate frequency (IF) or baseband.

Next, the input sample is held (that is, delayed).

Then, one or more delayed input samples (some of which may have been scaled) are combined with one or more delayed instances of the output signal (some of which may have been scaled) to generate a current instance of the output signal.

Thus, according to a preferred embodiment of the invention, the output signal is generated from prior samples/instances of the input signal and/or the output signal. (It is noted that, in some embodiments of the invention, current samples/instances of the input signal and/or the output signal may be used to generate current instances of the output signal.). By operating in this manner, the UDF module 1402 preferably performs input filtering and frequency down-conversion in a unified manner.

Further details of unified down-conversion and filtering as described in this section are presented in U.S. Pat. No. 6,049,706, entitled "Integrated Frequency Translation And Selectivity," filed Oct. 21, 1998, and incorporated herein by reference in its entirety.

3. Example Down-Converter Embodiments of the Invention

As noted above, the UFT module of the present invention is a very powerful and flexible device. Its flexibility is illustrated, in part, by the wide range of applications and combinations in which it can be used. Its power is illustrated, in part, by the usefulness and performance of such applications and combinations.

Such applications and combinations include, for example and without limitation, applications/combinations comprising and/or involving one or more of: (1) frequency translation; (2) frequency down-conversion; (3) frequency up-conversion; (4) receiving; (5) transmitting; (6) filtering; and/or (7) signal transmission and reception in environments containing potentially jamming signals. Example receiver, transmitter, and transceiver embodiments implemented using the UFT module of the present invention are set forth below.

3.1 Receiver Embodiments

In embodiments, a receiver according to the invention includes an aliasing module for down-conversion that uses a universal frequency translation (UFT) module to down-convert an EM input signal. For example, in embodiments, the receiver includes the aliasing module 300 described above, in reference to FIG. 3A or FIG. 3G. As described in more detail above, the aliasing module 300 may be used to down-convert an EM input signal to an intermediate frequency (IF) signal or a demodulated baseband signal.

In alternate embodiments, the receiver may include the energy transfer system 401, including energy transfer module 404, described above, in reference to FIG. 4. As described in more detail above, the energy transfer system 401 may be used to down-convert an EM signal to an intermediate frequency (IF) signal or a demodulated baseband signal. As also described above, the aliasing module 300 or the energy transfer system 401 may include an optional energy transfer signal module 408, which can perform any of a variety of functions or combinations of functions including, but not limited to, generating the energy transfer signal 406 of various aperture widths.

In further embodiments of the present invention, the receiver may include the impedance matching circuits and/or techniques described herein for enhancing the energy transfer system of the receiver.

3.1.1 In-Phase/Quadrature-Phase (I/Q) Modulation Mode Receiver Embodiments

FIG. 15 illustrates an exemplary I/Q modulation mode embodiment of a receiver 1502, according to an embodiment of the present invention. This I/Q modulation mode embodiment is described herein for purposes of illustration, and not limitation. Alternate I/Q modulation mode embodiments (including equivalents, extensions, variations, deviations, etc., of the embodiments described herein), as well as embodiments of other modulation modes, will be apparent to persons skilled in the relevant art(s) based on the teachings contained herein. The invention is intended and adapted to include such alternate embodiments.

Receiver 1502 comprises an I/Q modulation mode receiver 1538, a first optional amplifier 1516, a first optional filter 1518, a second optional amplifier 1520, and a second optional filter 1522.

I/Q modulation mode receiver 1538 comprises an oscillator 1506, a first UFD module 1508, a second UFD module 1510, a first UFT module 1512, a second UFT module 1514, and a phase shifter 1524.

Oscillator 1506 provides an oscillating signal used by both first UFD module 1508 and second UFD module 1510 via the phase shifter 1524. Oscillator 1506 generates an "I" oscillating signal 1526.

"I" oscillating signal 1526 is input to first UFD module 1508. First UFD module 1508 comprises at least one UFT module 1512. First UFD module 1508 frequency down-converts and demodulates received signal 1504 to down-converted "I" signal 1530 according to "I" oscillating signal 1526.

Phase shifter 1524 receives "I" oscillating signal 1526, and outputs "Q" oscillating signal 1528, which is a replica of "I" oscillating signal 1526 shifted preferably by 90 degrees.

Second UFD module 1510 inputs "Q" oscillating signal 1528. Second UFD module 1510 comprises at least one UFT module 1514. Second UFD module 1510 frequency down-converts and demodulates received signal 1504 to down-converted "Q" signal 1532 according to "Q" oscillating signal 1528.

Down-converted "I" signal 1530 is optionally amplified by first optional amplifier 1516 and optionally filtered by first optional filter 1518, and a first information output signal 1534 is output.

Down-converted "Q" signal 1532 is optionally amplified by second optional amplifier 1520 and optionally filtered by second optional filter 1522, and a second information output signal 1536 is output.

In the embodiment depicted in FIG. 15, first information output signal 1534 and second information output signal 1536 comprise a down-converted baseband signal. In embodiments, first information output signal 1534 and second information output signal 1536 are individually received and processed by related system components. Alternatively, first information output signal 1534 and second information output signal 1536 are recombined into a single signal before being received and processed by related system components.

Alternate configurations for I/Q modulation mode receiver 1538 will be apparent to persons skilled in the relevant art(s) from the teachings herein. For instance, an alternate embodiment exists wherein phase shifter 1524 is coupled between received signal 1504 and UFD module 1510, instead of the configuration described above. This and other such I/Q modulation mode receiver embodiments will be apparent to persons skilled in the relevant art(s) based upon the teachings herein, and are within the scope of the present invention.

4. DC Offset and Circuit Gain Considerations and Corrections

Various embodiments related to the method(s) and structure(s) described herein are presented in this section (and its subsections). Exemplary WLAN receiver channel circuits are provided below, and circuits used to reduce or eliminate problems of DC offset in the WLAN receiver channel circuits are described. The embodiments of the present invention are applicable to any WLAN receiver circuit, such as IEEE 802.11 WLAN standard compliant receivers, including the IEEE 802.11a and 802.11b extensions, and to other communication standards.

These embodiments are described herein for purposes of illustration, and not limitation. The invention is not limited to these embodiments. Alternate embodiments (including equivalents, extensions, variations, deviations, etc., of the embodiments described herein) will be apparent to persons skilled in the relevant art(s) based on the teachings contained herein. The invention is intended and adapted to include such alternate embodiments. Furthermore, the invention is applicable to additional communication system environments. For instance, although for convenience the invention is described herein in terms of WLAN, the invention as disclosed herein is applicable to any type of communication system receiver, such as, but not limited to, wireless personal area network (WPAN) receivers (including the Bluetooth standard), wireless metropolitan area network (WMAN) receivers, code division multiple access (CDMA) receivers (including wideband CDMA receivers), Global System for Mobile Communications (GSM) standard compatible receivers, and $3^{rd}$ Generation (3G) network receivers.

4.1 Overview of DC Offset

Receivers, and other electronic circuits, may suffer from problems of DC offset and re-radiation. Generally, "DC offset" refers to an undesired DC voltage level that is added to a signal of interest by related circuitry. The related circuitry creates the DC offset voltage through a variety of mechanisms that are well known. Some of these mechanisms are discussed in further detail below. "Re-radiation" is an undesired phenomenon where an unwanted signal is generated by circuitry, such as by an oscillator, and is transmitted by an antenna. The unwanted signal may then be received by circuitry, to interfere with the signal of interest. Such re-radiation may also lead to unwanted DC offset voltages.

If a DC offset voltage value is significant, it can degrade the quality of the signal of interest. In a receiver, for example, the signal of interest may be a down-converted signal. Unless reduced or eliminated, the added DC offset voltage level may undesirably change the voltage value of the down-converted signal. As a result, the desired voltage value of the down-converted signal may be difficult to ascertain by downstream processing.

For example, unwanted DC offset voltages created by receiver channel amplifiers may be inserted into the receiver channel signal path. FIG. 18 shows a DC offset voltage 1802 present in an example model of an operational amplifier gain stage. DC offset voltage 1802 is internally generated in operational amplifier 1804, and may be considered to be a voltage inserted between the amplifier inputs. Typically, DC offset voltage 1802 is a differential input voltage resulting from the mismatch of the input stages of operational amplifier 1804. Due to DC offset voltage 1802 ($V_{IO}$), an unwanted output voltage offset ($V_{OO}$) will appear in output voltage 1808. $V_{IO}$ is amplified by the circuit closed loop gain to create $V_{OO}$. For example, in the configuration shown in FIG. 18, $V_{OO}$ may be calculated according to the following equation:

$$V_{\infty} = \left(\frac{R2}{R1} + 1\right)V_{IO}$$

This unwanted output DC offset voltage is input to subsequent amplifiers in the receiver channel and is accordingly amplified. If it becomes significant, it may cause outputs of the subsequent amplifiers to reach their voltage rails. In any event, DC offset voltages present in the receiver channel amplifiers may lead to an erroneous output signal.

Frequency down-converters may input DC offset voltages into the receiver channel. Embodiments of the UFT module may be used in many communications applications, including embodiments of the UFD module, to frequency down-convert signals in receivers. For some of these applications, the signal space may include waveforms with near DC content. Hence, it may be advantageous to limit the amount of artificial DC insertion or DC offsets contributed by the UFD module or its complimentary demodulation architecture.

There are at least three significant categories of offsets related to operation of the UFD module, which are listed as follows:

1. Clock Excitation or Charge Injected
2. Re-radiation Offsets
3. Intermodulation Distortion Each category possesses its own mechanisms. Further description of these categories of offsets in relation to the UFD module are provided in U.S. Ser. No. 09/526,041, titled "DC Offset, Re-radiation, and I/Q Solutions Using Universal Frequency Translation Technology," filed Mar. 14, 2000, the disclosure of which is incorporated by reference herein in its entirety. These sources of DC offset may lead to erroneous receiver channel output signals.

Example methods and systems are provided in the subsections below for reducing or eliminating unwanted DC offsets. Such methods and systems may be used separately, or in any combination, to address offset issues.

4.2 Exemplary Communications System Receiver Channel

FIG. 16 shows an exemplary receiver channel 1600 in which embodiments of the present invention may be implemented. Receiver channel 1600 may be used to receive WLAN signals, or other signal types.

Receiver channel 1600 includes an optional low noise amplifier 1602, a second automatic gain control (AGC) amplifier 1604, a down-converter 1606, a first optional amplifier/filter section 1608, a first AGC amplifier 1610, a second optional amplifier/filter section 1612, and an antenna 1614. The present invention is also applicable to further receiver channel embodiments than receiver channel 1600, with fewer or more elements than shown in FIG. 16. Furthermore, the elements of receiver channel 1600 are not necessarily required to be arranged in the order shown in FIG. 16. For example, when first amplifier/filter section 1612 is present, some or all of it may be implemented upstream from down-converter 1606. Further embodiments for receiver channel 1600 will be apparent to persons skilled in the relevant art(s) from the teachings herein.

In an embodiment, more than one receiver channel 1600 may be required to receive a particular input signal. In the case of an I/Q modulated input signal, for example, a first receiver channel 1600 may be used to down-convert the I-channel, and a second receiver channel 1600 may be used to down-convert the Q-channel. Alternatively, for example, receiver channel 1600 may be divided into two channels (an I and Q channel) following LNA 1602 or second AGC amplifier 1604.

Antenna 1614 receives an input RF signal 1616. LNA 1602 (when present) receives and amplifies input RF signal 1616.

Second AGC amplifier 1604 receives input RF signal 1616 and receives a second AGC signal 1620. Second AGC amplifier 1604 amplifies input RF signal 1616 by an amount controlled by second AGC signal 1620, and outputs amplified RF signal 1618. Typically, second AGC signal 1620 is generated by downstream circuitry that detects the level of the receiver channel signal at a given location (not shown), and then determines by what amount the signal level of the receiver channel needs to be amplified, i.e., increased or decreased, to produce an acceptable receiver channel signal level.

Down-converter 1606 receives amplified RF signal 1618. Down-converter 1606 frequency down-converts, and optionally demodulates amplified input RF signal 1618 to a down-converted signal 1622. For example, in an embodiment, down-converter 1606 includes a conventional down-converter, such as a superheterodyne configuration. In another embodiment, down-converter 1606 may include a UFD module (e.g., UFD module 114 shown in FIG. 1C, aliasing module 300 shown in FIG. 3A) for frequency down-conversion/demodulation. Down-converted signal 1622 may be an intermediate frequency signal or baseband signal.

When present, first amplifier-filter section 1608 amplifies and/or filters down-converted signal 1622. First amplifier-filter section 1608 includes one or more amplifiers, such as operational amplifiers, and filter circuits for conditioning down-converted signal 1622. Any filter circuits that are present may have low-pass, high-pass, band-pass, and/or band-stop filter characteristics, for example. The filters may be active or passive filter types.

First AGC amplifier 1610 receives the optionally amplified/filtered down-converted signal 1622 and receives a first AGC signal 1626. First AGC amplifier 1610 amplifies down-converted signal 1622 by an amount controlled by first AGC signal 1626, and outputs amplified down-converted signal 1624. Similarly to second AGC signal 1620, first AGC signal 1626 is generated by circuitry that detects the level of the receiver channel signal at a given location (not shown), and then determines by what amount the signal level of the receiver channel needs to be amplified, i.e., increased or decreased, to produce an acceptable receiver channel signal level.

When present, second amplifier-filter section 1612 amplifies and/or filters amplified down-converted signal 1624. Second amplifier-filter section 1612 includes one or more amplifiers, such as operational amplifiers, and filter circuits for conditioning amplified down-converted signal 1624. Any filter circuits that are present may have low-pass, high-pass, band-pass, and/or band-stop filter characteristics, for example. The filters may be active or passive filter types. Second amplifier-filter section 1612 outputs an output signal 1628. Output signal 1628 may be an intermediate frequency signal that is passed on to further down-converters if needed, or a baseband signal that is passed to subsequent baseband signal processor circuitry.

Each element of receiver channel 1600 may introduce DC offsets, as described above, into the signal passing through receiver channel 1600. The following subsections further describe some of these sources of DC offset, and describe embodiments of the present invention for reducing or eliminating unwanted DC offset in a receiver channel, such as receiver channel 1600.

4.3 Filter module Embodiments of the Present Invention

As described above, DC offset voltages may be introduced by elements of a receiver channel. DC offset voltages due to a down-converter, such as a UFD module, are briefly described in section 4.1 above, as are DC offset voltages due to an operational amplifier. These DC offset voltages can lead to erroneous receiver channel output signals. Hence, it would be desirable to reduce or eliminate DC offset voltages due to these and other elements of the receiver channel.

A filter module is used to reduce DC offset voltages in a receiver channel, according to embodiments of the present invention. Furthermore, the filter module is applicable to communications environments such as IEEE 802.11, where short preamble packets may be received while a preferred antenna diversity is being established. For example, the preamble for an input RF 802.11 signal may be received while two or more antennas are being switched at regular intervals to determine which antenna can best receive the input signal. Hence, an input signal must be received in a short period of time. Furthermore, receiver channel DC offsets must be sufficiently reduced during each interval so as to not interfere with reception of the input signal. The filter module of the present invention, as described below, reduces DC offset voltages while allowing diversity switching and selection, and reception of the 802.11 input signal preamble.

FIG. 26 illustrates a conventional high-pass resistor-capacitor (RC) filter 2600. RC filter 2600 includes a capacitor 2602 and a resistor 2604. For RC filter 2600:

$$i = \frac{V_{in}}{R} e^{-t/RC}$$

$$V_R = V_L = iR = V_{in} e^{-t/RC}$$

$$V_C = V_{in}(1 - e^{-\alpha})$$

Where:
$V_{in}$=an input voltage 2606
C=a value of capacitor 2602
R=a value of resistor 2604
i=current through capacitor 2602 and resistor 2604
$V_C$=voltage across capacitor 2602
$V_R$=voltage across resistor 2604
$V_L = V_R$=an output voltage 2608

$$\alpha = \frac{1}{RC} \qquad \text{Equation 1}$$

The voltage $V_C$ represents a low pass function transient, while the voltage $V_L$ represents a high pass function transient.

A high pass filter such as RC filter 2600 may be used to remove a DC signal component introduced by baseband analog circuits, as described above. However, a low corner frequency of the high pass filter competes with a settling time of the filter. For example, a low corner frequency of near 10 kHz can prevent such a filter from settling within 5 μsec. When such a filter is modified to settle within 5 μsec or less, the filter introduces distortions into the AC response of the filter transfer function. Thus, with a filter such as RC filter 2600 shown in FIG. 26, it is difficult to establish a suitable solution which simultaneously satisfies both AC response and transient response requirements.

One way to avoid the DC offset removal/settling time conflict is to use multiple RC filter time constants. Filter time constants can be sequentially cycled in during an acquisition period to adjust the input signal to a point of convergence at some suitable time, near 5 μsec for example. A final time constant may be selected once DC offset removal and gain have jointly been acquired to a desired accuracy. The final time constant cycled in may allow the filter to possess a transfer function that minimizes input signal distortion. This approach, however, is cumbersome and complex, and may introduce transient errors due to charge injection during time constant switch periods. The present invention overcomes these difficulties through the use of a filter that is continuously variable over the acquisition period.

FIG. 17A shows an example filter module 1702, according to an single-ended receiver channel embodiment of the present invention. Filter module 1702 reduces a DC offset voltage in a communication system, while allowing for diversity switching and selection. As shown in FIG. 17A, filter module 1702 includes a capacitor 1706 and a variable resistor 1704. Because variable resistor 1704 is variable, the time constant for filter module 1702, and therefore the transfer function for filter module 1702, is variable.

For example, as shown in Equation 1 above, in a transfer function for RC filter 2600, α is a constant. According to filter module 1702 of the present invention, α varies with time:

$$\alpha(t) = \frac{1}{R(t)C} \qquad \text{Equation 2}$$

Where:

R(t)=value of variable resistor 1704 over time.
Hence:

$$V_L = V_{in}e^{-t/R(t)C} = V_{in}e^{-\alpha(t)t} \qquad \text{Equation 3}$$

Hence, the frequency response for filter module 1702 may be controlled to allow for DC offset reduction, while minimizing input signal distortion.

Capacitor 1706 is coupled between an input signal 1716 and an output signal 1718. Filter module 1702 can be located in a receiver channel, such as receiver channel 1600 shown in FIG. 16. Hence, input signal 1716 and output signal 1718 may be signals in a receiver channel path. For example, filter module 1702 may be located in a baseband portion of the receiver channel, and input signal 1716 and output signal 1718 may be baseband receiver channel signals.

Variable resistor 1704 is coupled between output signal 1718 and a reference voltage 1714. In an embodiment, variable resistor 1704 is an active variable resistor, or a resistor formed of one or more active components. For example, this allows for incorporation of variable resistor 1704 into an integrated circuit (IC), such as a CMOS IC. However, in alternative applications, variable resistor 1704 can be made from non-active components. Variable resistor 1704 receives a control signal 1710. Control signal 1710 controls the value of variable resistor 1704. Control signal 1710 is varied in order to vary the frequency response of, and therefore the rate of DC offset reduction caused by filter module 1702 in the receiver channel. In embodiments, control signal 1710 can be a waveform that repeats each time diversity is switched.

Reference voltage 1714 may be a ground signal, or other reference voltage for the receiver channel in which filter module 1702 is incorporated.

FIG. 31 shows a graph 3100 of responses to an input unit step function for a conventional RC filter such as RC filter 2600 shown in FIG. 26, and for various configurations for filter module 1702, according to embodiments of the present invention. The input voltage to each filter is 1 V. As shown in FIG. 31, a first curve 3102 represents the response for RC filter 2600, and second, third, and fourth curves 3104, 3106, and 3108 represent responses for various embodiments of filter module 1704. For curve 3102, α is a constant. For curves 3104, 3106, and 3108, α varies with time according to the present invention. In FIG. 31, γ is an exponential parameter associated with a family of differential equation solutions relating to the transient performance of filter module 1702 when control signal 1710 is a ramp waveform. Control signal 1710 is a ramp waveform, as shown in FIGS. 20A and 20B, and further described below. By selecting γ, acquisition of DC offset can be accelerated or decelerated as desired, while trading off AC signal distortion. As shown in FIG. 31, curve 3104 has γ=0.05, curve 3106 has γ=1, and curve 3108 has γ=1.25. All of curves 3104, 3106, and 3108 converge to 0 V more rapidly during the first 2 μS than does curve 3102. Curve 3108 converges most rapidly, while curve 3104 converges least rapidly out of curves 3104, 3106, and 3108. Hence, filter module 1702 can initially remove DC offset more rapidly than a standard RC filter, such as RC filter 2600, as shown by curves 3104, 3106, and 3108 when compared to curve 3102.

Filter module 1702 of the present invention is adaptable to further configurations. FIG. 17B shows a version of filter module 1702 that may be implemented in a differential receiver channel, according to an embodiment of the present invention. In the differential receiver channel embodiment of FIG. 17B, filter module 1702 includes first capacitor 1706, variable resistor 1704, and a second capacitor 1708. In FIG. 7B, filter module 1702 is coupled in a differential signal path. Filter module 1702 receives a differential input signal 1724, and outputs a differential output signal 1726. For example, receiver channel 1600 may be a differential receiver channel, and differential input signal 1724 and differential output signal 1726 may be signals located therein. For example, filter module 1702 of FIG. 17B may be located in a baseband portion of the receiver channel, and differential input signal 1724 and differential output signal 1726 may be baseband receiver channel signals.

As shown in FIG. 17B, first capacitor 1706 is coupled between a first differential signal input node 1728 and a first differential signal output node 1720. Second capacitor 1708 is coupled between a second differential signal input node 1730 and a second differential signal output node 1722. Differential input signal 1724 is received across first and second differential input signal nodes 1728 and 1730. Differential output signal 1726 is output across first and second differential output signal nodes 1720 and 1722.

Variable resistor 1704 is coupled between first differential signal output node 1720 and second differential signal output node 1722. As described above, variable resistor 1704 is preferably an active variable resistor, which allows for incorporation of variable resistor 1704 into an integrated circuit (IC), such as a CMOS IC. Variable resistor 1704 receives control signal 1710. Control signal 1710 controls the value of variable resistor 1704.

FIG. 17C shows an example filter module 1702, according to a further embodiment of the present invention. As shown in FIG. 17C, filter module 1702 is configured for use in a single-ended receiver channel similar to the embodiment shown in FIG. 17A, with the locations of variable resistor 1704 and capacitor 1706 exchanged. Variable resistor 1704 is coupled between an input signal 1734 and an output signal 1736. Capacitor 1706 is coupled between output signal 1736 and reference voltage 1714. Filter module 1702 as shown in FIG. 17C can be located in a receiver channel, such as receiver channel 1600 shown in FIG. 16. Hence, input signal 1734 and output signal 1736 may be signals in a receiver channel path. For example, filter module 1702 of FIG. 17C may be located in a baseband portion of the receiver channel, and input signal 1734 and output signal 1736 may be baseband receiver channel signals. Note that the present invention is also adaptable to a differential receiver channel version of filter module 1702 shown in FIG. 17C.

Additional fixed resistors may be combined with variable resistor 1704 in filter module 1702 in particular applications, to change/ease restrictions on the required value range for variable resistor 1704, and for other beneficial reasons. For example, FIG. 25A shows filter module 1702, with a fixed resistor 2502 in parallel with variable resistor 1704, according to an embodiment of the present invention. In another example, FIG. 25B shows filter module 1702, with a fixed resistor 2504 in series with variable resistor 1704, according to an embodiment of the present invention. The present invention is applicable to these and other configurations of fixed resistors and other component types with variable resistor 1704, in either single-ended or differential configurations of filter module 1702.

Embodiments of the filter module of the present invention are further described below. Further details of example variable resistors of the present invention are provided. The control signal of the present invention is then further described, and example frequency responses for the filter module are provided. Example receiver channel implementations for the filter module are then provided.

4.3.1 Active Variable Resistor of the Present Invention

Implementing filter module 1702 in a communications environment, such as a WLAN receiver, imposes restrictions on variable resistor 1704. For example, because of the high pass corner frequency typically desired in some applications, and because of practical limitations on capacitance values, the required resistance value for variable resistor 1704 can be relatively large. For instance, in an embodiment for filter module 1702, a 10 KHz pole is used. For this frequency pole, and an example value of 5 pF for capacitor 1706, a value of resistance for variable resistor 1704 is approximately 3.18 MΩ. A poly-type resistor of this resistance value would be very long, and would be impractical to implement in the restricted space of an integrated circuit (IC) chip. Tradeoffs can be made between capacitor area and resistor area. However, the resistor value will remain large for practical implementations. To overcome this problem, active devices, such as MOSFETs, may be used for variable resistor 1704.

Furthermore, in differential signal applications, variable resistor 1704 is desired to be floating, such that DC currents to ground or voltage supply are avoided.

To meet these requirements, in an embodiment, variable resistor 1704 includes two parallel MOS resistors biased by independent $V_{gs}$ (i.e., gate-to-source voltage) generators. In other words, a resistive device is created by a MOSFET operating in the linear region, which is statically biased in this region by a similar device operating in the saturation region. Under these conditions the device operating in the linear region has an equivalent resistance proportional to the inverse of the transconductance of the saturated device. Given that the controlling device (i.e., the device operating in the saturation region) remains in saturation over a range of interest, its transconductance, $g_m$, is provided in Equation 4 (ignoring channel modulation effects):

$$g_m = \frac{W}{L} k'(V_{gs} - V_{th}) \quad \text{Equation 4}$$

Where:

W and L are MOSFET physical dimensional parameters k'=a constant $V_{gs}$=the gate-to-source voltage $V_{th}$=the MOSFET threshold voltage The resistance, $R_{eq}$, of a MOS device in the linear region is provided in Equation 5:

$$R_{eq} = \frac{1}{\frac{W}{L} k'(V_{gs} - V_{th})} \quad \text{Equation 5}$$

FIG. 19 shows an example implementation for variable resistor 1704 that includes MOSFETs, according to an example embodiment of the present invention. As shown in FIG. 19, variable resistor 1704 includes MOSFETs 1902, 1904, 1906, and 1908. MOSFETS 1902 and 1908 are shown as NMOS type MOSFETs, and MOSFETS 1904 and 1906 are shown as PMOS type MOSFETs. Variable resistor 1704 also includes a first current source 1910 and a second current source 1912. The structure and operation of variable resistor 1704 shown in FIG. 19 is further described as follows. Variable resistor 1704 is described below as if implemented in the differential configuration of FIG. 17B, but the implementation of variable resistor 1704 shown in FIG. 19 is also applicable to single-ended configurations.

A reference potential 1914 is coupled to a drain terminal of MOSFET 1902, a drain terminal of MOSFET 1908, a body terminal of MOSFET 1904 and a body terminal of MOSFET 1906.

A gate terminal of MOSFET 1902 is coupled to a source terminal of MOSFET 1904, and a source terminal of MOSFET 1906, and is coupled to node 1722.

A source terminal of MOSFET 1902 is coupled to a body terminal of MOSFET 1902, a gate terminal of MOSFET 1904, and a first terminal of first current source 1910 via a signal 1918.

A gate terminal of MOSFET 1908 is coupled to a drain terminal of MOSFET 1904, and a drain terminal of MOSFET 1906, and is coupled to node 1720.

A source terminal of MOSFET 1908 is coupled to a body terminal of MOSFET 1908, a gate terminal of MOSFET 1906, and a first terminal of second current source 1912 via a signal 1922.

A second terminal of first current source 1910 and a second terminal of second current source 1912 are coupled to a ground potential 1916.

First and second current sources 1910 and 1912 receive control signal 1710. MOSFETs 1902 and 1908 are controlled by first and second current sources 1910 and 1912 to operate in the saturation region, and are used to bias MOSFETs 1904 and 1906. MOSFETs 1904 and 1906 are coupled in parallel, and operate in the linear region.

FIG. 23 shows an example implementation for first and second current sources 1910 and 1912, according to an embodiment of the present invention. As shown in FIG. 23, first and second current sources 1910 and 1912 may each include a MOSFET 2302. MOSFET 2302 is shown as an NMOS type MOSFET for illustrative purposes. A gate terminal of MOSFET 2302 is coupled to control signal 1710 for each of first and second current sources 1910 and 1912. A source terminal of MOSFET 2302 is coupled to a body terminal of MOSFET 2302, and to ground potential 1916 via signals 1920 and 1924 for first and second current sources 1910 and 1912, respectively. A drain terminal of MOSFET 2302 in first current source 1910 is coupled to signal 1918. A drain terminal of MOSFET 2302 in second current source 1912 is coupled to signal 1922. The present invention is applicable to other implementations for first and second current sources 1910 and 1912.

Because a MOS-based active resistor, such as variable resistor 1704, has a limited operating range due to device threshold mechanics and channel modulation effects, it may be desirable to set a practical linear range requirement for an input signal. For example, the linear range requirement for the input signal can be set at twice the expected value of the largest sustained signal amplitude. If the largest sustained signal swing at the input to filter module 1702 is 125 mVpd (millivolts peak differential), the linear range requirement selected for variable resistor 1704 may be 250 mVpd. This linear range requirement is provided for illustrative purposes, and other linear range requirements may be selected depending on the particular application.

Referring to FIG. 19, if the parallel MOSFETs 1904 and 1906 are coupled as shown, then their gate-to-source voltages will be determined by the saturated MOSFETs 1902 and 1908. The gate-to-source voltages of MOSFETs 1902 and 1908 are determined by their respective dimensions, and by bias current, $I_{bias}$, of first and second current sources 1910 and 1912. An example determination of the dimensions of MOSFETs 1902 and 1908 is provided as follows, for a resistance value of 3.18 MΩ for variable resistor 1704, for illustrative purposes.

For purposes of this example determination, it is assumed that a common mode voltage is selected equal to 1.65V, and that $I_{bias}$=10 µA. To provide ample signal swing range, a large overdrive maybe desired for MOSFETs 1902 and 1908. Hence:

$$V_{gs1,2} - V_{thn} = V_{cm}/2 = 1.65V/2 = 0.825V.$$

$$R_{eq} = \frac{1}{\frac{W}{L}k'(V_{gs} - V_{th})} \quad \text{Equation 5}$$

$$\frac{W_{1,2}}{L_{1,2}} = \frac{2 I_{bias}}{k'_n (V_{gs1,2} - V_{thn})^2} = \frac{2 \cdot 10\mu A}{180 \frac{\mu A}{V^2} \cdot 0.825 V^2} = 0.163 \text{ or } \frac{1}{6.14} \quad \text{Equation 6}$$

Where:

$W_{1,2}$ and $L_{1,2}$ are width and length dimensional parameters for MOSFETs 1902 and 1908

$k_n'$=a constant for NMOS $V_{gs1,2}$=a gate-to-source voltage for MOSFETs 1902 and 1908

$V_{thn}$=threshold voltage for NMOS $I_{bias}$=current through first and second current sources 1910 and 1912

Because in FIG. 19, $V_{gs}$ of PMOS is the same as for NMOS, the overdrive for PMOS MOSFETs 1904 and 1906 is equal to:

$$(V_{gs3,4} - V_{thp}) = (V_{gs1,2} - V_{thp}) = 0.825V + 0.55V - 0.54V = 0.815V \quad \text{Equation 7}$$

Then the aspect ratios of MOSFETS 1904 and 1906 are equal to:

$$\frac{W_{3,4}}{L_{3,4}} = \frac{1}{R_{eq} k'_p (V_{gs3,4} - V_{thp})} =$$

$$\frac{1}{3.18 M\Omega \cdot 45 \frac{\mu A}{V^2} \cdot 0.815 V} = 0.0086 \text{ or } \frac{1}{116.7} \quad \text{Equation 8}$$

Where:

$W_{3,4}$ and $L_{3,4}$ are width and length dimensional parameters for MOSFETs 1904 and 1906

$k_p'$=a constant for PMOS $V_{gs3,4}$=a gate-to-source voltage for MOSFETs 1904 and 1906

$V_{thp}$=threshold voltage for PMOS

Using the example ratios indicated in Equations 6 and 8, the following example dimensions can be selected: dimensions for MOSFETs 1902 and 1908, $W_{1,2}$=1 µm, $L_{1,2}$=6.14 µm; and dimensions for MOSFETS 1904 and 1906, $W_{3,4}$=1 µm, and $L_{3,4}$=116.7 µm. FIGS. 27A and 27B show a circuit 2700, that includes variable resistor 1704 using these selected dimensions, according to an example embodiment of the present invention. Circuit 2700 also shows a bias current generator 2702 with power-down function, and a resistor 2704 coupled between output nodes 1720 and 1722. A differential voltage 2706 is equal to the voltage across variable resistor 1704 and also across resistor 2704 (i.e., a voltage at node 1720 minus a voltage at node 1722).

A simulation of circuit 2700 generated a plot 2800 shown in FIG. 28. In plot 2800, a total current through MOSFETs 1904 and 1906 is plotted versus differential voltage 2706 on curve 2802, and a current through resistor 2704 (i.e., an ideal resistor) is plotted versus differential voltage 2706 on curve 2804. On a separate axis is plotted the calculated differential resistance of variable resistor 2704, shown as curve 2806. On curve 2806, a first point 2808 indicates that the resistance value for variable resistor 1704 is very close to 3.18 MΩ at 0V, being approximately equal to 3.1981 MΩ. At a second point 2810 and a third point 2812, curve 2806 has a value of approximately 3.18 MΩ, which is about +/−30 mV from the 0 V center.

Note that in plot 2800, there is a large divergence from the target value of 3.18 MΩ across curve 2806. This may be of concern in certain applications. Hence, one or more dimensions of the MOSFETs of variable resistor 1704 may be changed to improve the performance of variable resistor 1704. For example to reduce this divergence, minor adjustments may be made to the saturated MOSFETs 1902 and 1908, such as selecting a slightly smaller aspect ratio to reduce the divergent function, and doubling the width and length dimensions for uniformity and matching purposes. Similarly, the resistive MOSFETs 1904 and 1906 may be modified by increasing their widths and/or lengths to increase their average resistance over the +/−250 mV range.

An example adjusted circuit realization for circuit 2700 is shown in FIGS. 29A and 29B as circuit 2900, according to an embodiment of the present invention. The following example dimensions were selected: dimensions for MOSFETs 1902 and 1908, $W_{1,2}$=2 µm, $L_{1,2}$=16 µm; and dimensions for MOSFETS 1904 and 1906, $W_{3,4}$=1 µm, and $L_{3,4}$=121.6 µm. A simulation of circuit 2900 generated a plot 3000 shown in FIG. 30. As in plot 2800 of FIG. 28, in plot 3000, a total current through MOSFETs 1904 and 1906 is plotted versus differential voltage 2706 on a curve 3002, and a current through resistor 2704 (i.e., an ideal resistor) is plotted versus differential voltage 2706 on a curve 3004. On a separate axis is plotted the calculated differential resistance of variable resistor 2704, shown as curve 3006. Plot 3000 indicates that the target value of 3.18 MΩ is approximately met at +/−70 mV, indicated by second and third points 3010 and 3012. An average value for variable resistor 2704 over the +/−250 mV range is very close to the target value of 3.18 MΩ. A peak-to-peak value for curve 3006 over the +/−250 mV range is approximately only 70 KΩ or 2.1% of the target value. Furthermore, the variation in variable resistor 1704 increases only slightly over the +/−400 mV range to about 75 KΩ or 2.4% of the target value of 3.18 MΩ.

Hence, as described above, an active variable resistor 1704 can be designed to have a target resistance value for a particular value of control signal 1710. Furthermore, although not shown in FIGS. 28 and 30, as control signal 1710 is varied, so does the resistance value of variable resistor 1704.

It is noted that the various dimensions provided above were provided for illustrative purposes only, and are not limiting.

4.3.2 Control Signal Embodiments

As described above, control signal 1710 is input to variable resistor 1704. The present invention is applicable to various waveform shapes for control signal 1710, according to the particular application. Furthermore, in embodiments, the waveform shape of control signal 1710 may be repeated each time that an antenna is switched while determining diversity, or at other points in time as required. For example, and without limitation, control signal 1710 may include a ramp, triangle, rectangular, and exponential waveform shape, among others. Furthermore, different waveforms shapes may be sequentially combined in control signal 1710.

FIG. 20A shows an example control signal 1710, according to an embodiment of the present invention. Control signal 1710 of FIG. 20A includes a first ramp waveform portion 2022 during a first time period 2002, a second ramp waveform portion 2024 during a second time period 2004, a third ramp waveform portion 2026 during a third time period 2006, a fourth ramp waveform portion 2028 during a fourth time period 2008, and a fifth ramp waveform portion 2030 during a fifth time period 2010.

A variety of mechanisms may be used to generate control signal 1710. For example, a ramp waveform for control signal 1710 may be generated using a resistor-capacitor (R-C) discharge circuit. Other waveform generation techniques may also be used. Such an R-C discharge circuit creates an exponential shape that can approximate a ramp waveform. For example, in an embodiment, an R-C discharge circuit-created ramp waveform may be created that is approximately linear over a particular range of time, such as having a length in microseconds, even up to or greater than 10 microseconds. Over longer intervals, the exponential behavior can become more pronounced. For example, the resulting variable resistor value can become very large after a period of time. Hence, once a diversity antenna is selected, the resulting variable resistor value can become so large that the input signal to the respective filter module 1702 is not substantially affected any longer.

In the present example, the length of time of each time period 2002, 2004, 2006, 2008, and 2010 is equal to a diversity acquisition period. A diversity acquisition period is a period of time provided to acquire a signal input from an antenna that has just been switched into the receiver channel. In the example of FIG. 20A, control signal 1710 includes five ramp waveforms that correspond to five diversity acquisition periods. Note that five ramp waveform cycles are shown for control signal 1710 in FIG. 20A for illustrative purposes, and in embodiments, control signal 1710 may include any number of waveform cycles.

FIG. 20B shows more detail of first ramp waveform portion during first time period 2002. As shown in FIG. 20B, the voltage value of first ramp waveform portion 2022 increases with time. At a first time 2012, ramp waveform 2022 has a lower amplitude than at a second time 2014. The value of ramp waveform portion 2022 at a particular point in time causes variable resistor 1704 to have a corresponding resistance value at that time.

FIG. 21A shows an example plot of resistance versus time for variable resistor 1704 when receiving control signal 1710 shown in FIG. 20A, according to an embodiment of the present invention. As shown in FIG. 21 A, a resistor value waveform includes a first resistor value waveform portion 2112 during first time period 2002, a second resistor value waveform portion 2114 during second time period 2004, a third resistor value waveform portion 2116 during third time period 2006, a fourth resistor value waveform portion 2118 during fourth time period 2008, and a fifth resistor value waveform portion 2120 during fifth time period 2010.

FIG. 21B shows more detail of first resistor value waveform portion 2112 during first time period 2002. As shown in FIG. 21B, a resistance value for first resistor value waveform portion 2112 at time 2012 is less than a resistance value at time 2012. Hence, as ramp waveform portion 2022 of control signal 1710 increases in value over time, the resistance value of variable resistor 1704 correspondingly increases.

As shown above in Equation 3, as the value of variable resistor 1704 varies, so does the frequency response of filter module 1702. FIG. 22 shows an example first frequency response 2202 and an example second frequency response 2204 for filter module 1702. First frequency response 2202 corresponds to second time 2014 shown in FIGS. 20B and 21B. Second frequency response 2204 corresponds to first time 2012 shown in FIGS. 20A and 21A. As shown in FIG. 21B, variable resistor 1704 has a relatively higher resistance value at second time period 2014. Hence, filter module 1702 has a frequency response such as first frequency response 2202 at second time period 2014, with a relatively lower cut-off frequency 2206. Also, as shown in FIG. 21B, variable resistor 1704 has a relatively lower resistance value at first time period 2012. Hence, filter module 1702 has a frequency response such as second frequency response 2204 at first time period 2012, with a relatively higher cut-off frequency 2208.

As shown in FIG. 20A, waveform portions of control signal 1710 can have different amplitude values during different time periods. For example, fourth waveform portion 2028 of control signal 1710 has a lower amplitude than first, second, and third waveform portions 2022, 2024, and 2026. This leads to a correspondingly lower resistance value for variable resistor 1704, shown as fourth resistor value waveform portion 2118 in FIG. 21A, which has a lower amplitude than first, second, and third resistor value waveform portions 2112, 2114, and 2116. Furthermore, for example, fifth waveform portion 2030 of control signal 1710 has a higher amplitude than first, second, and third waveform portions 2022, 2024, and 2026. This leads to a correspondingly higher resistance value for variable resistor 1704, shown as fifth resistor value waveform portion 2120 in FIG. 21A, which has a higher amplitude than first, second, and third resistor value waveform portions 2112, 2114, and 2116.

The different waveform amplitudes and shapes may be used to account for for variations in the length of time of diversity acquisition periods, variations in DC offset between different antennas, and other receiver and/or input signal variations, for example.

4.3.3 Operational Embodiments of the Present Invention

Figure 47A:
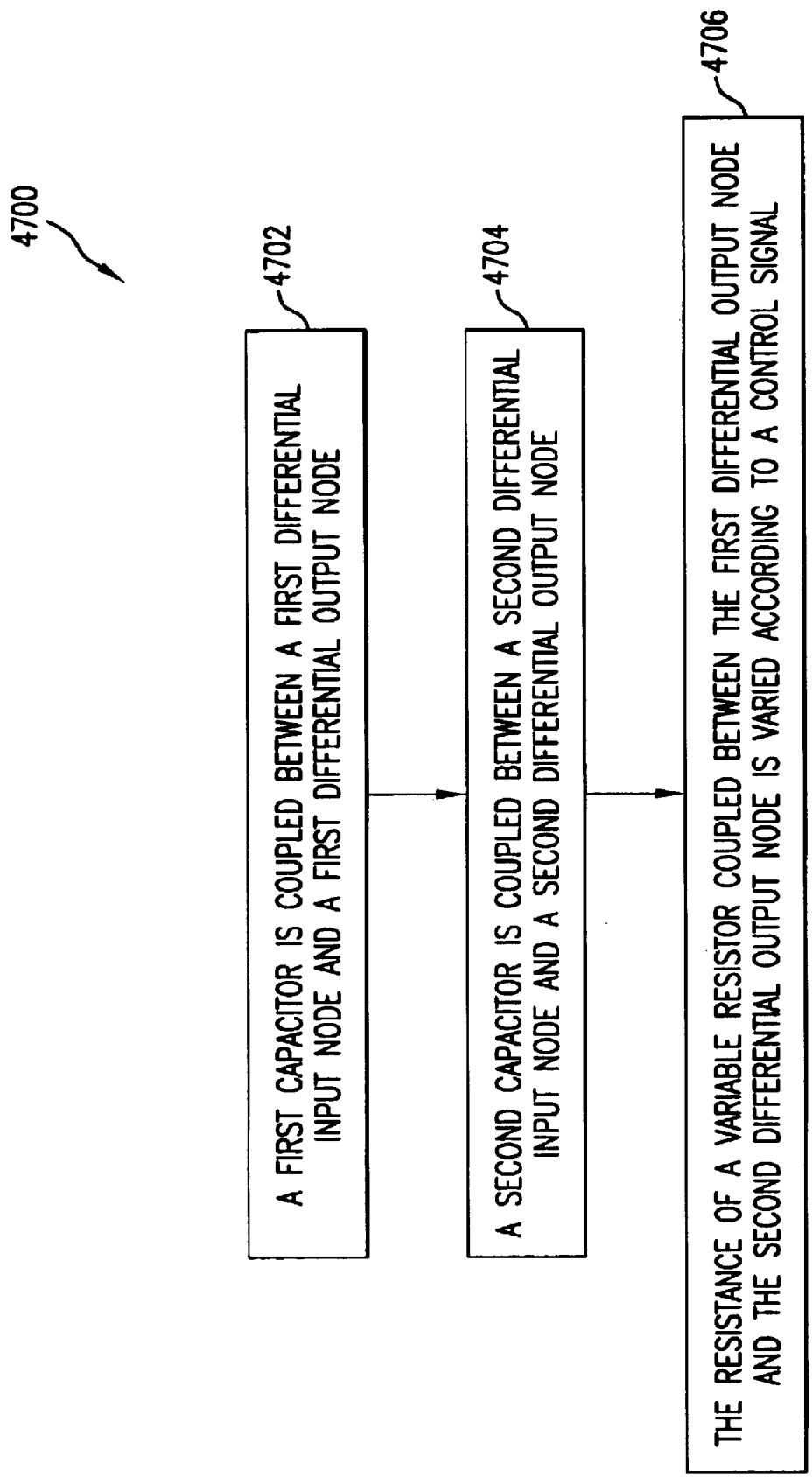
Figure 47B:
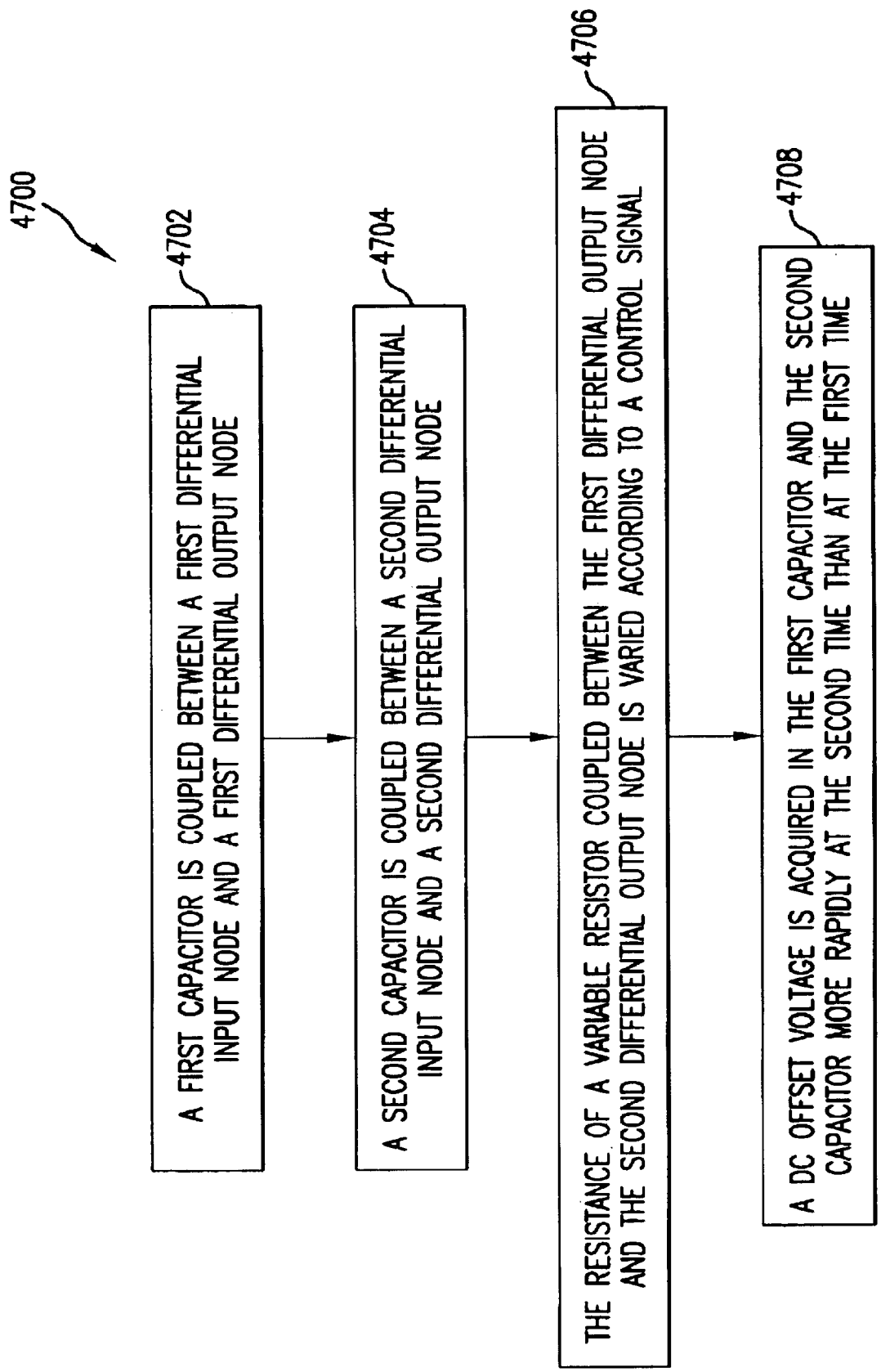
Figure 47C:
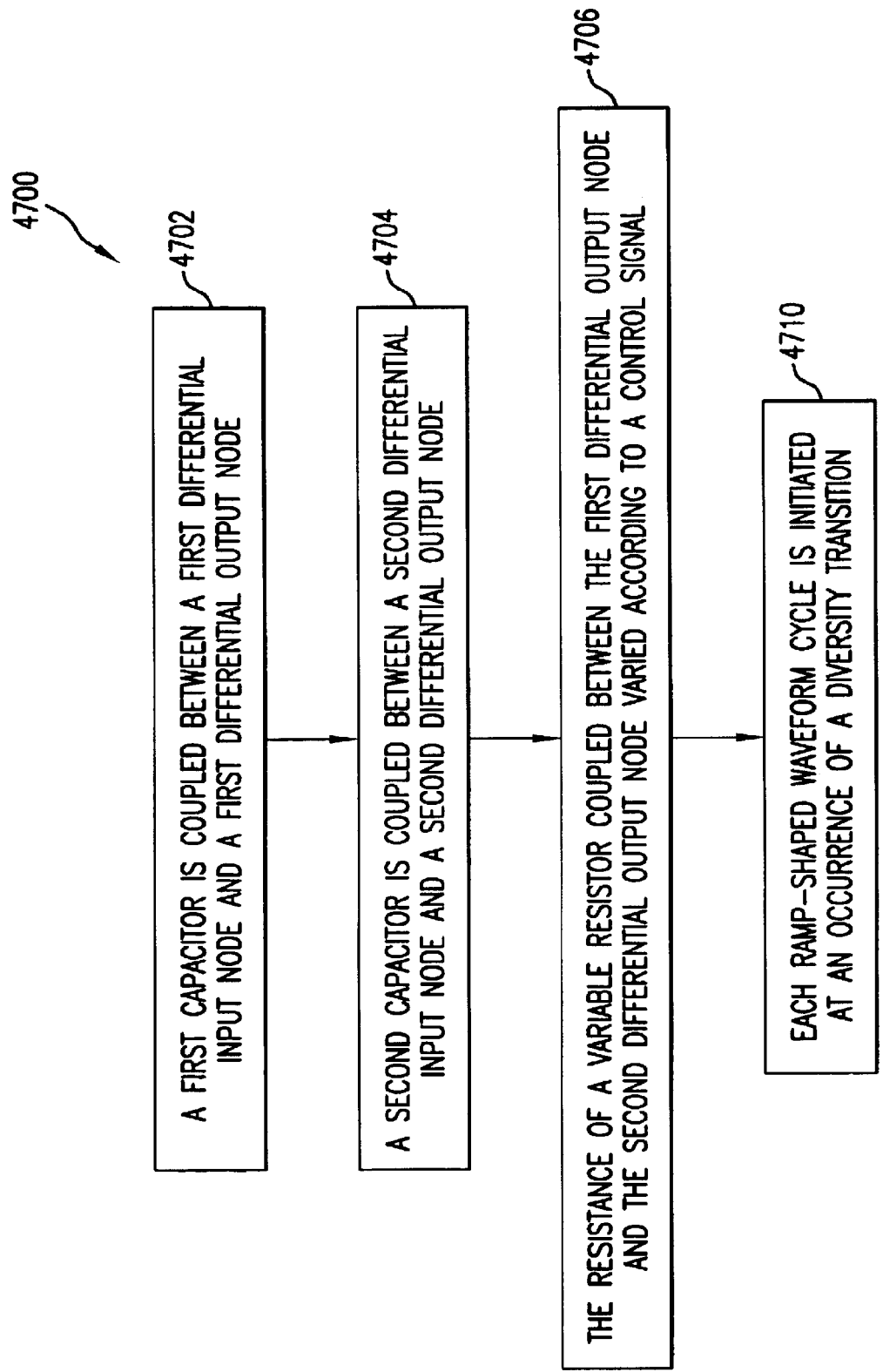
Figure 47D:
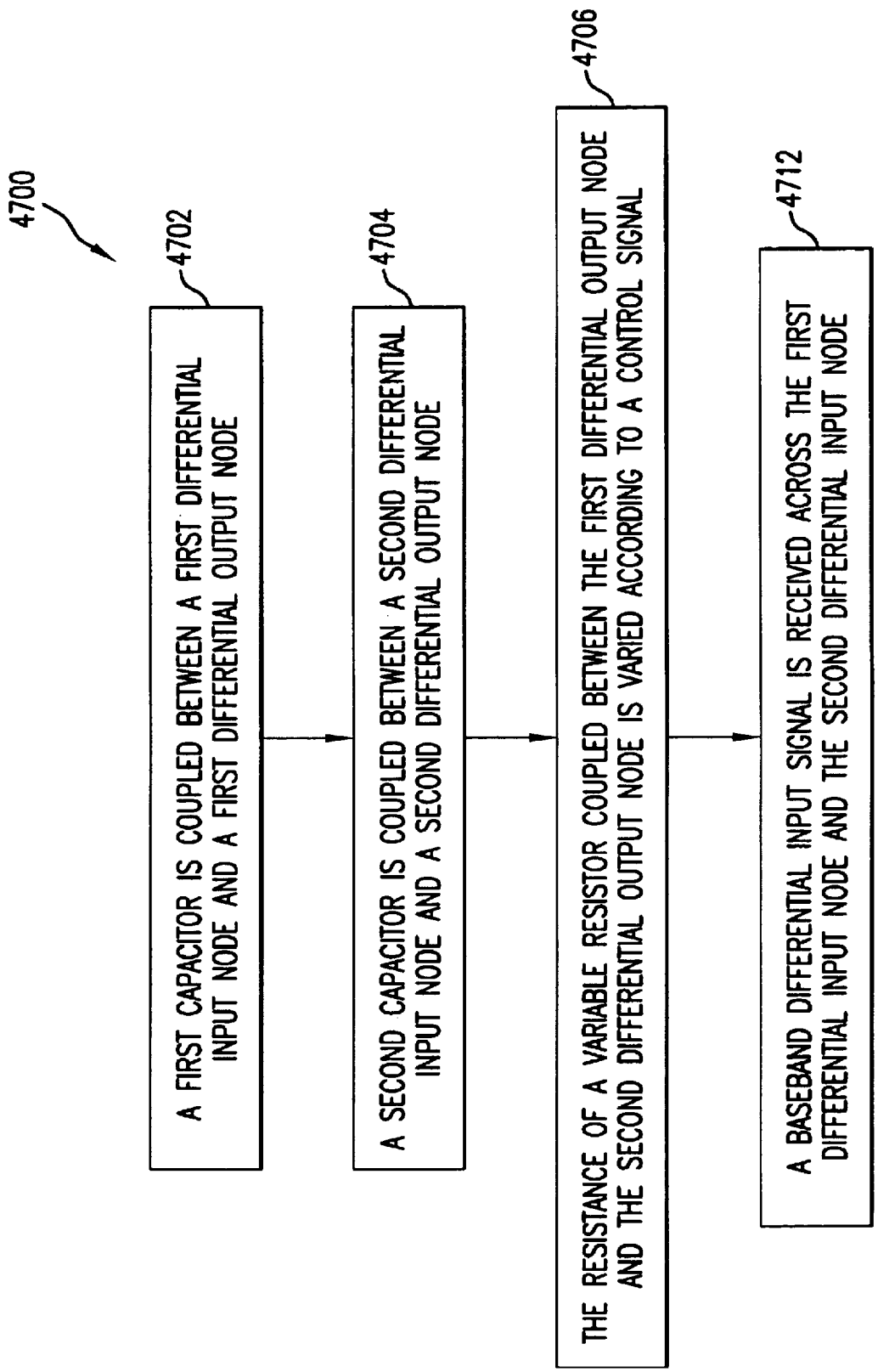

The present invention is directed to operational embodiments for reducing DC offset voltages in single-ended and differential input signals. FIG. 47A shows a flowchart 4700 providing operational steps for reducing or eliminating DC offsets in differential embodiments of the present invention. FIGS. 47B–47D provide additional operational steps for flowchart 4700, according to embodiments of the present invention. The steps shown in FIGS. 47A–47D do not necessarily have to occur in the order shown, as will be apparent to persons skilled in the relevant art(s) based on the teachings herein. Other embodiments will be apparent to persons skilled in the relevant art(s) based on the following discussion. These steps are described in detail below.

As shown in FIG. 47A, flowchart 4700 begins with step 4702. In step 4702, a first capacitor is coupled between a first differential input node and a first differential output node. For example, in an embodiment, the first capacitor is first capacitor 1706 coupled between first differential signal input node 1728 and first differential signal output node 1720, as shown in FIG. 17B.

In step 4704, a second capacitor is coupled between a second differential input node and a second differential output node. For example, in an embodiment, the second capacitor is second capacitor 1708 coupled between second differential signal input node 1730 and second differential signal output node 1722, as shown in FIG. 17B.

In step 4706, the resistance of a variable resistor coupled between the first differential output node and the second differential output node is varied according to a control signal. For example, in an embodiment, the variable resistor is variable resistor 1704, coupled between first differential signal output node 1720 and second differential signal output node 1722, as shown in FIG. 17B. The resistance of variable resistor 1704 is varied according to control signal 1710.

In an embodiment, step 4706 may include the step wherein a substantially ramp-shaped waveform cycle is received on the control signal. For example, the substantially ramp-shaped waveform cycle may be first ramp waveform portion 2022, as shown in FIG. 20B.

In an embodiment, step 4706 may further include the steps wherein the variable resistor is caused to have a first resistance value at a first time during the ramp-shaped waveform cycle, and the variable resistor is caused to have a second resistance value at a second time during the ramp-shaped waveform cycle. For example, FIG. 21B shows example plot of resistance versus time for variable resistor 1704 during first ramp waveform portion 2022 of control signal 1710. As shown in FIG. 21B, variable resistor 1704 is caused to have a first resistance value at a first time 2012, and to have a second resistance value at a second time 2014.

In an embodiment, step 4706 may further include the step wherein the second resistance value is caused to be greater than the first resistance value. For example, as shown in FIG. 21B, the second resistance value of first resistor value waveform portion 2112 at second time 2014 is greater than the first resistance value at first time 2012. Note that in alternative embodiments, the second resistance value may be equal to or less than the first resistance value, depending on the particular application.

In an embodiment, step 4706 may further include the step where a cutoff frequency at the first time is caused to be a higher frequency than a cutoff frequency at the second time. For example, as shown in FIG. 22, filter module 1702 has a frequency response such as first frequency response 2202 at second time 2014, with a relatively lower cut-off frequency 2206, and a second frequency response 2204 at first time 2012, with a relatively higher cut-off frequency 2208. Note that in alternative embodiments, the cutoff frequency at the second time may be higher than or equal to the cutoff frequency at the first time.

FIG. 47B shows flowchart 4700 with an additional step 4708, according to an embodiment of the present invention. In step 4708, a DC offset voltage is acquired in the first capacitor and the second capacitor more rapidly at the second time than at the first time. For example, a DC offset voltage in differential input signal 1724 shown in FIG. 17B is acquired in first and second capacitors 1706 and 1708 more rapidly at second time 2014 than at first time 2012. In an alternative embodiment, the DC offset voltage may be acquired more rapidly at first time 2012 than at second time 2014.

In an embodiment, step 4706 may include the step where a second substantially ramp-shaped waveform cycle is received on the control signal. For example, the second substantially ramp-shaped waveform cycle may be any one of third, fourth, and fifth ramp waveform portions 2026, 2028, and 2030 shown in FIG. 20A, or other ramp-shaped waveform cycle. In an embodiment, step 4706 may include the further step where an amplitude of the second substantially ramp-shaped waveform is caused to be different from an amplitude of the first substantially ramp-shaped waveform. For example, the amplitude of fourth and fifth ramp waveform portions 2028 and 2030 are different from an amplitude of first ramp waveform portion 2022. Note that the amplitude of the second ramp-shaped waveform may also be equal to the amplitude of the first ramp-shaped waveform.

FIG. 47C shows flowchart 4700 with an additional step 4710, according to an embodiment of the present invention. In step 4710, each ramp-shaped waveform cycle is initiated at an occurrence of a diversity transition. For example, in an embodiment, the length of time periods 2002, 2004, 2006, 2008, and 2010 corresponding to cycles of control signal 1710 is equal to a diversity acquisition period. As described above, a diversity acquisition period is a period of time provided to acquire a signal input from an antenna that has just been switched into the receiver channel. Antennas may be switched into the receiver channel at the transitions between time periods 2002, 2004, 2006, 2008, and 2010.

FIG. 47D shows flowchart 4700 with an additional step 4712, according to an embodiment of the present invention. In step 4712, a baseband differential input signal is received across the first differential input node and the second differential input node. For example, differential input signal 1724, as shown in FIG. 17B, may be a baseband signal. In alternative embodiments, differential input signal 1724 may be an intermediate frequency or radio frequency signal.

Figure 48A:
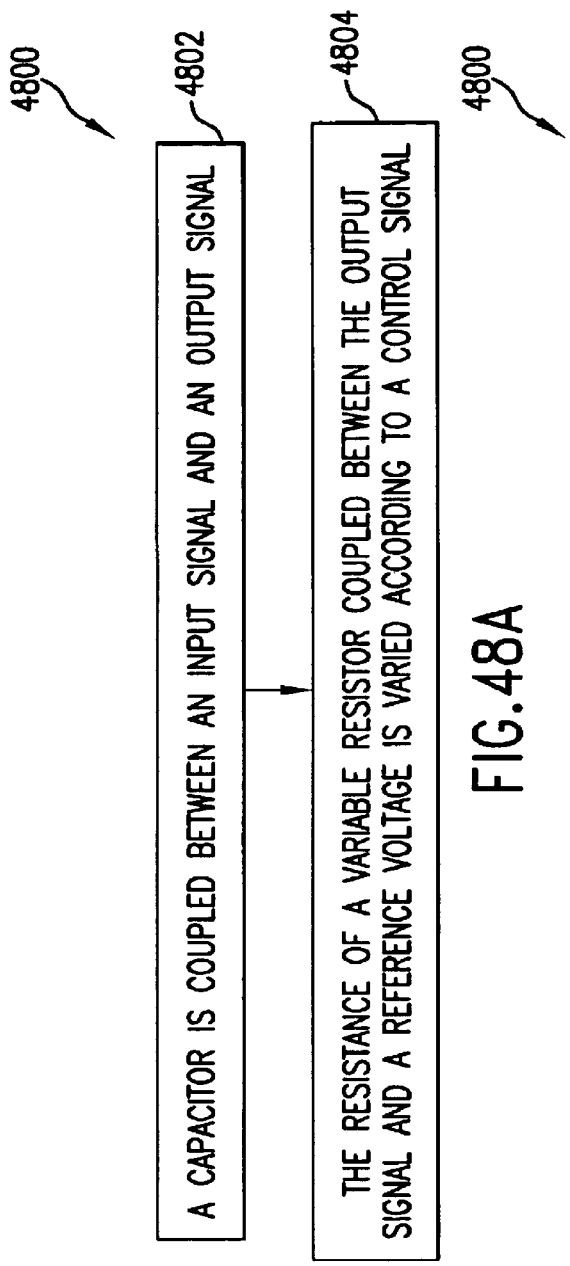
Figure 48B:
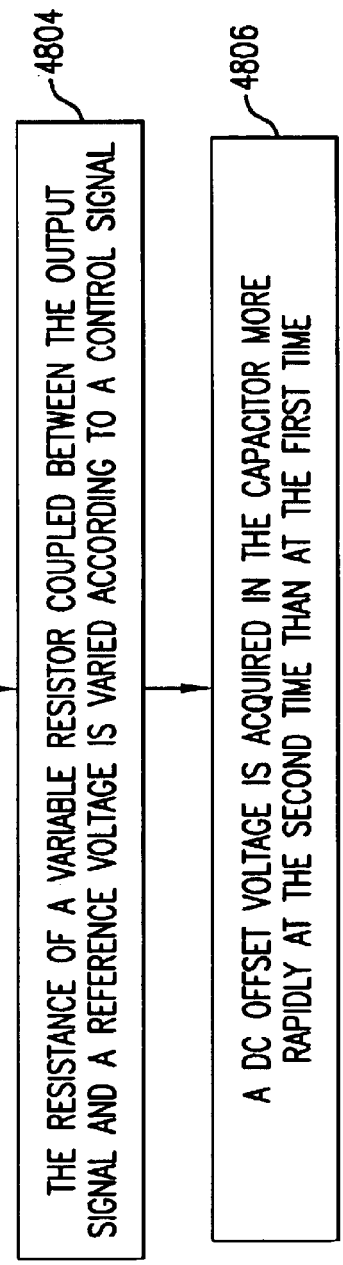
Figure 48C:
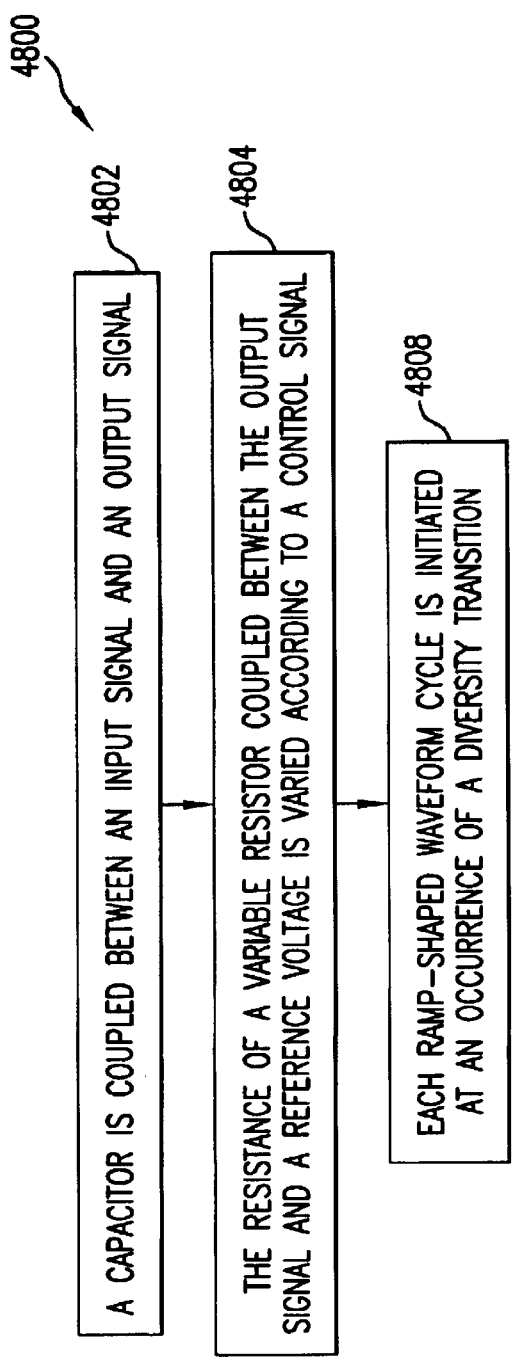
Figure 48D:
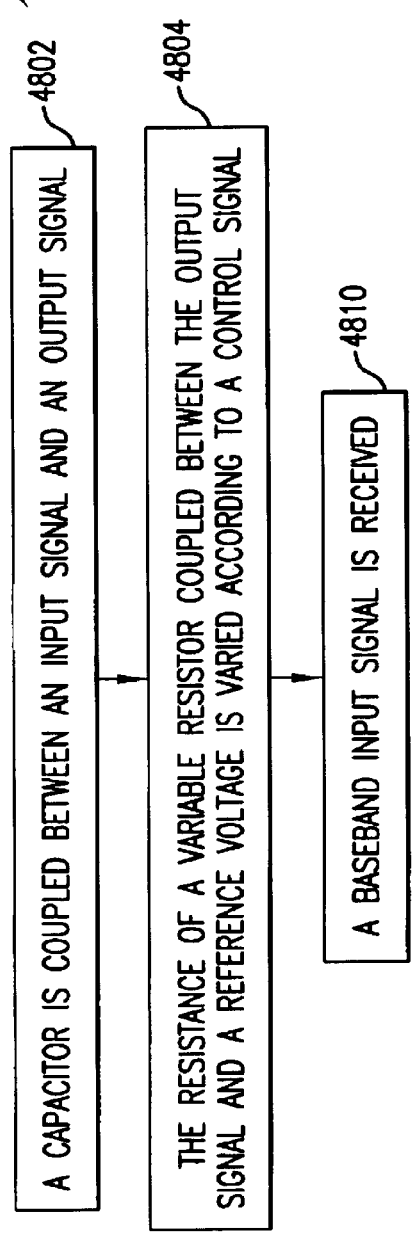

FIG. 48A shows a flowchart 4800 providing operational steps for reducing or eliminating DC offsets in single-ended embodiments of the present invention. FIGS. 48B–48D provide additional operational steps for flowchart 4800, according to embodiments of the present invention. The steps shown in FIGS. 48A–48D do not necessarily have to occur in the order shown, as will be apparent to persons skilled in the relevant art(s) based on the teachings herein. Other embodiments will be apparent to persons skilled in the relevant art(s) based on the following discussion. These steps are described in detail below.

As shown in FIG. 48A, flowchart 4800 begins with step 4802. In step 4802, a capacitor is coupled between an input signal and an output signal. For example, in an embodiment, the capacitor is first capacitor 1706 coupled between input signal 1716 and output signal 1718, as shown in FIG. 17A.

In step 4804, the resistance of a variable resistor coupled between the output signal and a reference voltage is varied according to a control signal. For example, in an embodiment, the variable resistor is variable resistor 1704, which is coupled between output signal 1718 and reference voltage 1714, as shown in FIG. 17A. The resistance of variable resistor 1704 is varied according to control signal 1710.

In an embodiment, step 4804 may include the step wherein a substantially ramp-shaped waveform cycle is received on the control signal. For example, the substantially ramp-shaped waveform cycle may be first ramp waveform portion 2022, as shown in FIG. 20B.

In an embodiment, step 4804 may further include the steps wherein the variable resistor is caused to have a first resistance value at a first time during the ramp-shaped waveform cycle, and the variable resistor is caused to have a second resistance value at a second time during the ramp-shaped waveform cycle. For example, FIG. 21B shows example plot of resistance versus time for variable resistor 1704 during first ramp waveform portion 2022 of control signal 1710. As shown in FIG. 21B, variable resistor 1704 is caused to have a first resistance value at a first time 2012, and to have a second resistance value at a second time 2014.

In an embodiment, step 4804 may further include the step where the second resistance value is caused to be greater than the first resistance value. For example, as shown in FIG. 21B, the second resistance value at second time 2014 is greater than the first resistance value at first time 2012. Note that in alternative embodiments, the second resistance value may be equal to or less than the first resistance value, depending on the particular application.

In an embodiment, step 4706 may further include the step where a cutoff frequency at the first time is caused to be a higher frequency than a cutoff frequency at the second time. For example, as shown in FIG. 22, filter module 1702 has a frequency response such as first frequency response 2202 at second time period 2014, with a relatively lower cut-off frequency 2206, and a second frequency response 2204 at first time period 2012, with a relatively higher cut-off frequency 2208. Note that in alternative embodiments, the cutoff frequency at the second time may be higher than or equal to the cutoff frequency at the first time.

FIG. 48B shows flowchart 4800 with an additional step 4806, according to an embodiment of the present invention. In step 4806, a DC offset voltage is acquired in the capacitor more rapidly at the second time than at the first time. For example, a DC offset voltage in input signal 1716 shown in FIG. 17A is acquired in capacitor 1706 more rapidly at second time 2014 than at first time 2012. In an alternative embodiment, the DC offset voltage may be acquired more rapidly at first time 2012 than at second time 2014.

In an embodiment, step 4804 may include the step where a second substantially ramp-shaped waveform cycle is received on the control signal. For example, the second substantially ramp-shaped waveform cycle may be any one of third, fourth, and fifth ramp waveform portions 2026, 2028, and 2030 shown in FIG. 20A, or other ramp-shaped waveform cycle. In an embodiment, step 4804 may include the further step where an amplitude of the second substantially ramp-shaped waveform is caused to be different from an amplitude of the first substantially ramp-shaped waveform. For example, the amplitude of fourth and fifth ramp waveform portions 2028 and 2030 are different from an amplitude of first ramp waveform portion 2022. Note that the amplitude of the second ramp-shaped waveform may also be equal to the amplitude of the first ramp-shaped waveform.

FIG. 48C shows flowchart 4800 with an additional step 4808, according to an embodiment of the present invention. In step 4808, each ramp-shaped waveform cycle is initiated at an occurrence of a diversity transition. For example, in an embodiment, the length of time periods 2002, 2004, 2006, 2008, and 2010 corresponding to cycles of control signal 1710 is equal to a diversity acquisition period. As described above, a diversity acquisition period is a period of time provided to acquire a signal input from an antenna that has just been switched into the receiver channel. Different antennas may be switched into the receiver channel at the transitions between time periods 2002, 2004, 2006, 2008, and 2010.

FIG. 48D shows flowchart 4800 with an additional step 4810, according to an embodiment of the present invention. In step 4810, a baseband input signal is received. For example, input signal 1716 may be a baseband signal. In alternative embodiments, input signal 1716 may be an intermediate frequency or radio frequency signal.

4.3.4 Example Filter Module Applications

The filter module of the present invention may be used in a variety of communication system applications to reduce DC offset voltages. For example, the filter module of the present invention may be used to reduce DC offset in a receiver channel, and also may be used to reduce DC offset in an AGC feedback loop. These example applications are further described below. Note that the filter module of the present invention is applicable to these and other applications that will be known to persons skilled in the relevant art(s) from the teachings herein.

4.3.4.1 Example Receiver Channel Application

In embodiments, filter module 1702 may be implemented in a receiver channel, such as receiver channel 1600 shown in FIG. 16. FIG. 24A shows an example application of filter module 1602 in a receiver channel portion 2400, according to an embodiment of the present invention. Receiver channel portion 2400 may be a baseband portion of a receiver channel, or other portion. Receiver channel portion 2400 includes amplifier-filter section 1608 and AGC amplifier 1610. Filter module 1702 is coupled between amplifier-filter section 1608 and AGC amplifier 1626. Filter module 1702 receives a signal 2402 from amplifier-filter section 1608. Signal 2402 may include a DC offset voltage due to components in amplifier-filter section 1608, and/or prior components in the receiver channel. Filter module 1702 reduces or eliminates the DC offsets in signal 2402. Filter module 1702 outputs a DC offset-reduced signal 2404.

In embodiments, a plurality of filter modules 1702 are distributed within a receiver architecture to facilitate DC offset acquisition. FIG. 32 shows an example application of a receiver channel 3200 that includes a plurality of filter modules 1702a, 1702b, and 1702c, according to an embodiment of the present invention. Receiver channel 3200 also includes first and second AGC amplifiers 3202 and 3204, an RF low noise amplifier (LNA) 3206, an RF AGC amplifier 3208, a driver 3210, a down-converter 3212, a baseband LNA 3214, and a filter 3216. Receiver channel 3200 is applicable to a WLAN communication system, for example. As shown in FIG. 32, filter modules 1702a, 1702b, and 1702c are intermixed with AGC amplifiers 3202 and 3204, and other components of receiver channel 3200.

Advantages of the filter module of the present invention include the following:

A. DC offset reduction can be accomplished over a wide dynamic range with or without local loops and estimators.

B. DC offset reduction does not require input sampling techniques for auto-calibration.

C. DC offset reduction may be continuous over all time.

D. DC offset reduction may be accomplished without signal blanking.

E. DC offset reduction circuits may be first order, or greater.

F. Techniques utilized for rapid DC convergence may also be applied to the concurrent AGC operation.

G. Flicker noise is reduced due to high pass corner.

Advantages A–G may be accomplished with low circuit complexity and modest control interface requirements.

FIG. 33 illustrates a WLAN receiver circuit 3300 using a single filter module 1702, according to an embodiment of the present invention. Circuit 3300 includes a data source 3302, a baseband low noise amplifier (LNA) 3304, a WLAN filter 3306, filter module 1702, and an AGC amplifier 3308. FIGS. 34–40 illustrate waveforms from an example application of circuit 3300, where a DC offset voltage is summed into circuit 3300 at the input of baseband LNA 3306. These conditions simulate a severe problem with a DC offset voltage, for illustrative purposes.

A data source 3302 provides an input signal 3310. In the present example application, input signal 3310 includes randomized Barker codes. Data source 3302 varies discretely in magnitude on 10 μsec boundaries, to simulate diversity switching in the receiver front end. The dynamic signal range between diversities is 48 dB and the difference in offset between diversities is permitted to vary 40% (which is pathological). FIG. 34 illustrates input signal 3310. First and third time periods 3402 and 3406 correspond to a first diversity A, and second and fourth time periods 3404 and 3408 correspond to a second diversity B.

Note that on the scale provided in FIG. 34, for diversity B during second and fourth time periods 3404 and 3408, input signal 3310 appears to be essentially equal to 0 V. Actually, input signal 3310 is very small (~100 μV peak) during these time periods so that input signal 3310 for diversity A (~28 mV peak) during first and third time periods 3402 and 3406 appears much larger.

An input offset 3312 is summed with input signal 3310, and input as DC offset input signal 3314 to baseband LNA 3304. FIG. 35 illustrates DC offset input signal 3314, showing the unique DC offsets assigned to diversities A and B. A DC offset voltage of +25 mV is assigned to diversity A during first and third time periods 3402 and 3406, while +15 mV is assigned to diversity B during second and fourth time periods 3404 and 3408.

In the present example, baseband LNA 3304 and WLAN filter 3306 process DC offset input signal 3314, possessing a combined gain of approximately 11.8 (21.4 dB). The output of WLAN filter 3306 is signal 3316, which is illustrated in FIG. 36.

In the present example, signal 3316 should be ideally centered at 1.65 V. However, because both signal and offset are amplified in baseband LNA 3304 and/or WLAN filter 3306, a significant DC shift in signal 3316 occurs, that must be reduced. The DC shift is approximately 295 mV for diversity A and approximately 177 mV for diversity B. Furthermore, signal 3316 possesses a 48 dB dynamic variance between diversity A and B as well.

Signal 3316 is input to filter module 1702. Filter module 1702 outputs a filter module output signal 3318. FIG. 37 illustrates filter module output signal 3318. As shown in FIG. 37, during each of time periods 3402, 3404, 3406, and 3408, filter module 1702 allows for rapid convergence to the proper center voltage of 1.65 V. FIG. 38 provides a 'zoomed' scale view of filter module output signal 3318 on the voltage axis, relative to FIG. 37. As shown in FIGS. 37 and 38, DC offset is removed from filter module output signal 3318, while signal data is rapidly acquired. FIG. 39 shows further detail of filter module output signal 3318 during the transition from diversity A to B, during portions of third and fourth time periods 3406 and 3408. FIG. 39 illustrates that data quality is very well preserved during signal acquisition from diversity B, as data pulses are visible. Although not shown, in FIG. 39, the larger scale data of diversity A is also well preserved.

The gain disparity between diversities A and B can be alleviated by the use of automatic gain control, such as by AGC amplifier 3308. It is well known that concurrently estimating DC offset and signal energy/amplitude for AGC purposes is difficult. For example, conventional energy estimators tend to erroneously detect DC offset as well, which appears as an interference or corruption in the AGC process. Therefore, it is preferable for DC offset to be removed so that the AGC system will substantially acquire only the desired signal. For packet switched systems such as WLAN communication systems, AGC and DC offset acquisition are frequently required to converge concurrently to reduce processing overhead, which is very difficult to accomplish. The present invention provides a solution for more rapidly handling both AGC and DC offset acquisition. Embodiments for applying the filter module of the present invention to AGC loops are provided in the following subsection.

As described above, control signal 1710 may have different variable time constants during different time periods, to cause different values for variable resistor 1704 during those time periods. FIG. 44 shows a resistance waveform 4402 for an example variable resistor 1704, having different time constants that correspond to different diversity time periods. In a filter module example, variable resistor 1704 has the two following resistor characteristic equations:

$$R_{adj2}(A)=100,000(1-e^{-\alpha_1 t}) \qquad \text{Equation 9}$$

$$R_{adj2}(B)=100,000(1-e^{-\alpha_2 t}) \qquad \text{Equation 10}$$

Where:

$R_{adj2}(A)$=Resistance during Diversity A (Time periods 3402 and 3406)

$R_{adj2}(B)$=Resistance during Diversity B (Time periods 3404 and 3408)

$\alpha_1=\alpha$ for Diversity A $\alpha_2=\alpha$ for Diversity B

Both resistor characteristic Equations 9 and 10 are exponential, but are approximately linear over the range of interest. The slopes of the two $R_{adj5}(A, B)$ responses shown in FIG. 44 are roughly scaled 2:1 with respect to one another and indicate a robust range of adjustment characteristics with good system response. In embodiments, $R_{adj5}$ can be scaled according to input signal level and/or another measured statistic to provide particular acquisition advantages.

In another example, FIG. 45 illustrates a signal 4502 output from a filter module 1702, with reduced DC offset. In this extreme case, a 200 mV DC offset voltage is present on the input signal to filter module 1702 for diversity A, and the signal energies between diversity A and B are different by 20 dB. A shown in FIG. 45, filter module 1702 is still very robust and effective even with unusually high input DC offset. FIG. 46 shows an AGC output signal 4602 resulting from AGC amplification of signal 4502.

4.3.4.2 Example AGC Feedback Path Applications

In embodiments, filter module 1702 may be implemented in an AGC feedback loop, such as an AGC feedback loop 2420 shown in FIG. 24B. AGC feedback loop 2420 provides feedback from a node 2410 in a receiver channel to AGC amplifier 1610 located upstream in the receiver channel. In this manner, the gain of AGC amplifier 1610 is adjusted as needed to keep an output signal within an appropriate amplitude range. Feedback loop 2420 includes an optional rectifier 2412 and filter module 1702.

Rectifier 2412 is optional. An input to rectifier 2412 is coupled to receiver channel node 2410. Rectifier 2412 outputs a rectified signal 2414. When present, rectifier 2412 may be a half-wave or full-wave rectifier, or other rectifier type as appropriate for the particular application.

Filter module 1702 receives rectified signal 2414, and outputs AGC control signal 2416. AGC control signal 2416 is input to an AGC control input of AGC amplifier 1610. In AGC feedback loop 2420, filter module 1702 is used to remove DC offset voltages, such that a more accurate AGC gain control signal 2416 is generated.

The filter module of the present invention may be used in a variety of AGC applications. Furthermore, one or more filter modules may be used in a particular AGC feedback loop for DC offset reduction. For example, FIG. 40 shows an example AGC response 4002 that converges simultaneously with DC offset acquisition. FIG. 41 shows an example simulation AGC circuit 4100 that generates AGC response 4002, according to an embodiment of the present invention. For example, AGC circuit 4100 may be used with AGC amplifier 3308 shown in FIG. 33, in the context of the example application described in the preceding subsection. AGC circuit 4100 includes AGC amplifier 3308, and an AGC feedback loop 4102. AGC feedback loop 4102 includes rectifier 2412, first filter module 1702a, an error node 4108, and a second filter module 1702b. First filter module 1702a includes a first variable resistor 1704a and a first capacitor 1706a. Second filter module 1702b includes a second variable resistor 1704b and a second capacitor 1706b. In the present example, first capacitor 1706a has a value of 400 pF, and second capacitor 1706b has a value of 25 pF. The values for first and second capacitors 1706a and 1706b will depend on the particular application, and may vary from the values provided herein.

In the present example, AGC amplifier 3308 has a transfer characteristic given by:

$$V_{gain} = -V_{err2}(control)*1360 \text{ in dB}$$

Where:

$V_{err2}$=AGC control feedback signal 4110

$V_{gain}$=AGC output signal 4112

Error node 4108 compares the output of filter module 1702a to a 0.1 volt reference signal. FIG. 42 illustrates AGC control feedback signal 4110. Each transition from diversity A to B, and B to A in AGC control feedback signal 4110 is accompanied by a discontinuity in the response of AGC feedback loop 4102, which is moderated by rectifier 2412. The attack time for large signals possesses a classical under damped response while the decay time for a small signal response is virtually critically damped with a 5 μsec time out.

AGC circuit 4100 possesses a nonlinear transfer characteristic by design. This is an example of a type 1 AGC with half wave energy detect. For purposes of illustration, AGC feedback loop 4102 is filtered by two filter modules 1702a and 1702b, which aid in rapid joint acquisition of gain and DC offset. In embodiments, AGC feedback loop 4102 may be digitally controlled for WLAN applications. Filter modules 1702a and 1702b may be implemented with analog circuitry, by digital means, or by a hybrid scheme.

Variable resistors 1704a and 1704b are each shown in parallel with a fixed resistor in FIG. 41. Variable resistor 1704a is in parallel with a 1 MΩ resistor, and variable resistor 1704b is in parallel with a 5 MΩ resistor. The presence of the fixed resistors, and their values, are optional, depending on the particular application. Variable resistors 1704a and 1704b have a variable resistance $R_{adj5}$, with a transfer function shown below:

$$R_{adj5} = 100,000(1-e^{-\alpha}) + R_0 \qquad \text{Equation 11}$$

FIG. 43 illustrates a resistance waveform 4302 for variable resistors 1704a and 1704b. The value of $R_{adj5}$ is reset at each new diversity transition, and then sweeps according to the exponential of Equation 11. Hence, the time constants of AGC feedback loop 4102 sweep from extremely short to moderate values over several microseconds while AGC feedback loop 4102 is acquiring. Within 5 μs, filter module 1702a has a bandwidth of 10 kHz. Normally, a first order fixed loop filter of this bandwidth would settle on the order of 100 μs after a step input. If the filter module time constant is selected correctly, AGC feedback loop 4102 will settle extremely rapidly, and the AC response or transfer function will possess a low frequency high pass corner after only a few microseconds. This is counter intuitive in that a low frequency corner is required to preserve signal quality, yet the low frequency corner usually demands a long settling time for DC offset removal. By correctly selecting filter module parameters, the input signal amplitude is acquired rapidly, while DC offset diminishes. An excellent AC response is delivered in orders of magnitude more rapidly than by conventional systems.

5. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. An automatic gain control (AGC) feedback loop, comprising:

a rectifier that receives a first receiver channel signal and outputs a rectified signal;

a filter module that receives the rectified signal and outputs an AGG signal; and an AGC amplifier that receives a second receiver channel signal and the AGC signal, and outputs a third receiver channel signal;

wherein said filter module includes a capacitor coupled between said rectified signal and said AGC signal, and an active variable resistor coupled between said AGC signal and a reference voltage, wherein said active variable resistor receives an analog control signal.

2. The AGC feedback loop of claim 1, wherein said rectifier is a full wave rectifier.

3. The AGC feedback loop of claim 1, wherein said rectifier is a half wave rectifier.

4. The AGC feedback loop of claim 1, wherein said control signal is a periodic substantially ramp-shaped waveform.

5. The filter module of claim 4, wherein said substantially ramp-shaped waveform is an exponential waveform.

6. The AGC feedback loop of claim 4, wherein at a first time during a cycle of said ramp-shaped waveform, said control signal causes said active variable resistor to have a first resistance value, and at a second time during said cycle of said ramp-shaped waveform, said control signal causes said active variable resistor to have a second resistance value, wherein said second time is after said first time.

7. The AGC feedback loop of claim 6, wherein said second resistance value is greater than said first resistance value.

8. The AGC feedback loop of claim 6, wherein a cutoff frequency of the filter module at the first time is a higher frequency than a cutoff frequency of the filter module at the second time.

9. The AGC feedback loop of claim 8, wherein said capacitor acquires a DC offset voltage in an input signal more rapidly at the second time than at the first time.

10. The AGC feedback loop of claim 6, wherein an amplitude of the ramp-shaped waveform is greater at the second time than at the first time.

11. The AGC feedback loop of claim 4, wherein a first cycle of said ramp-shaped waveform has a substantially different maximum amplitude than a second cycle of said ramp-shaped waveform.

12. The AGC feedback loop of claim 4, wherein a cycle of said ramp waveform has a duration of 10 $\mu$S.

13. The AGC feedback loop of claim 4, wherein each cycle of said ramp waveform is initiated at an occurrence of a diversity transition.

14. The AGC feedback loop of claim 1, further comprising a second resistor coupled between said output signal and said first reference voltage.

15. The AGC feedback loop of claim 1, further comprising a second resistor coupled in series with said active variable resistor between said output signal and said first reference voltage.

* * * * *

UNITED STATES PATENT AND TRADEMARK OFFICE
CERTIFICATE OF CORRECTION

PATENT NO.    : 6,975,848 B2
DATED         : December 13, 2005
INVENTOR(S)   : Rawlins et al.

It is certified that error appears in the above-identified patent and that said Letters Patent is hereby corrected as shown below:

Title page,
Item [56], References Cited, FOREIGN PATENT DOCUMENTS,
replace "GB 2 324 949 A" with -- GB 2 324 919 A --.
replace "WO 0 795 955 A2" with -- EP 0 795 955 A2 --.

Column 27,
Lines 20-24, delete.

Signed and Sealed this

Sixth Day of June, 2006

JON W. DUDAS
*Director of the United States Patent and Trademark Office*